US009295123B2

(12) United States Patent
Williams et al.

(10) Patent No.: US 9,295,123 B2
(45) Date of Patent: Mar. 22, 2016

(54) SERIAL LIGHTING INTERFACE WITH EMBEDDED FEEDBACK

(75) Inventors: Richard K. Williams, Cupertino, CA (US); Kevin D'Angelo, Carmel, CA (US); David A. Brown, San Jose, CA (US)

(73) Assignee: ADVANCED ANALOGIC TECHNOLOGIES INCORPORATED, Santa Clara, CA (US)

( * ) Notice: Subject to any disclaimer, the term of this patent is extended or adjusted under 35 U.S.C. 154(b) by 512 days.

(21) Appl. No.: 13/347,668

(22) Filed: Jan. 10, 2012

(65) Prior Publication Data

US 2013/0147371 A1   Jun. 13, 2013

Related U.S. Application Data

(63) Continuation of application No. 13/346,659, filed on Jan. 9, 2012.

(60) Provisional application No. 61/568,545, filed on Dec. 8, 2011.

(51) Int. Cl.
*G09G 3/10* (2006.01)
*H05B 33/08* (2006.01)
*H05B 37/02* (2006.01)

(52) U.S. Cl.
CPC .......... *H05B 33/0827* (2013.01); *H05B 33/086* (2013.01); *H05B 33/083* (2013.01);
(Continued)

(58) Field of Classification Search
CPC ............. H05B 33/0827; H05B 33/083; H05B 33/0842; H05B 37/0254
USPC ....... 315/185 R, 294, 297, 312, 169.1, 169.2, 315/169.3, 192, 250, 363; 345/690, 90, 98, 345/204; 341/120
See application file for complete search history.

(56) References Cited

U.S. PATENT DOCUMENTS 6,175,193 B1   1/2001   Kishita et al.
6,700,560 B2   3/2004   Sumiya
(Continued)

FOREIGN PATENT DOCUMENTS

EP   1589517 A2   10/2005
GB   2459009 A    10/2009
(Continued)

OTHER PUBLICATIONS

International Search Report from corresponding PCT/US2012/068194 dated Mar. 14, 2013.

*Primary Examiner* — Minh D A
*Assistant Examiner* — Borna Alaeddini
(74) *Attorney, Agent, or Firm* — Lando & Anastasi, LLP

(57) ABSTRACT

A system for controlling multiple strings of LEDs includes a group of LED driver IC's, each of which includes a current sense feedback (CSFB) sample latch for storing a digital representation of the forward-voltage drop across a controlled LED string. Each CSFB latch is coupled to a register within a serial lighting interface (SLI) bus that both originates and terminates at an interface IC. As the data on the SLI bus is shifted into the interface IC, the interface IC selects the CSFB word that represents the highest forward-voltage drop of any of the controlled LED strings, which is then used by the interface IC to generate a CSFB signal for setting the appropriate supply voltage for the controlled LED strings.

15 Claims, 30 Drawing Sheets

(52) U.S. Cl.
CPC ......... *H05B33/0815* (2013.01); *H05B 33/0836* (2013.01); *H05B 37/0254* (2013.01); *Y02B 20/325* (2013.01)

(56) References Cited

U.S. PATENT DOCUMENTS

| | | |
|---|---|---|
| 6,754,784 B1 | 6/2004 | North et al. |
| 7,777,704 B2 | 8/2010 | S et al. |
| 7,956,824 B2 | 6/2011 | Li Volsi |
| 8,344,661 B2 | 1/2013 | Hsu et al. |
| 2001/0005319 A1 | 6/2001 | Ohishi et al. |
| 2006/0125757 A1 | 6/2006 | Kang et al. |
| 2006/0186820 A1 | 8/2006 | Yang |
| 2006/0214898 A1 | 9/2006 | Woo et al. |
| 2008/0180040 A1 | 7/2008 | Prendergast et al. |
| 2008/0292344 A1 | 11/2008 | Nagumo |
| 2009/0079362 A1 | 3/2009 | Shteynberg et al. |
| 2009/0128053 A1 | 5/2009 | Dhayagude et al. |
| 2009/0134817 A1 | 5/2009 | Jurngwirth et al. |
| 2009/0153075 A1* | 6/2009 | Li et al. ............... 315/294 |
| 2009/0251071 A1 | 10/2009 | Gater et al. |
| 2009/0284445 A1 | 11/2009 | Kuo et al. |
| 2009/0309502 A1 | 12/2009 | Trattler |
| 2010/0026190 A1 | 2/2010 | Hsu |
| 2010/0052558 A1 | 3/2010 | Lee et al. |
| 2010/0053129 A1 | 3/2010 | Morita |
| 2010/0191308 A1* | 7/2010 | Meister .................. 607/57 |
| 2010/0194308 A1* | 8/2010 | Zhao et al. ............. 315/297 |
| 2010/0201279 A1 | 8/2010 | Zhao |
| 2011/0012519 A1 | 1/2011 | Zhao |
| 2011/0043545 A1 | 2/2011 | Huang |
| 2011/0096099 A1* | 4/2011 | Yamamoto et al. ........... 345/690 |
| 2011/0121755 A1 | 5/2011 | Han |
| 2011/0249036 A1 | 10/2011 | Kim |
| 2012/0098456 A1 | 4/2012 | Tseng |
| 2013/0099681 A1 | 4/2013 | Williams et al. |
| 2013/0099682 A1 | 4/2013 | Williams et al. |
| 2013/0099701 A1 | 4/2013 | Williams et al. |
| 2013/0099702 A1 | 4/2013 | Williams et al. |
| 2013/0147370 A1 | 6/2013 | Williams et al. |
| 2013/0147371 A1* | 6/2013 | Williams et al. ......... 315/185 R |
| 2013/0147372 A1 | 6/2013 | Williams et al. |
| 2013/0147375 A1 | 6/2013 | Williams et al. |
| 2013/0193852 A1 | 8/2013 | Frattini et al. |

FOREIGN PATENT DOCUMENTS

| | | |
|---|---|---|
| JP | 2001188498 A | 7/2001 |
| RU | 2103839 C1 | 1/1998 |
| RU | 2256305 C2 | 7/2005 |
| RU | 2007142404 A | 5/2009 |
| RU | 2385553 C2 | 3/2010 |
| RU | 2427109 C2 | 8/2011 |
| SU | 549795 A1 | 3/1977 |
| SU | 1709351 A1 | 1/1992 |
| TW | 201108863 A | 3/2011 |
| TW | 201110809 A | 3/2011 |

\* cited by examiner

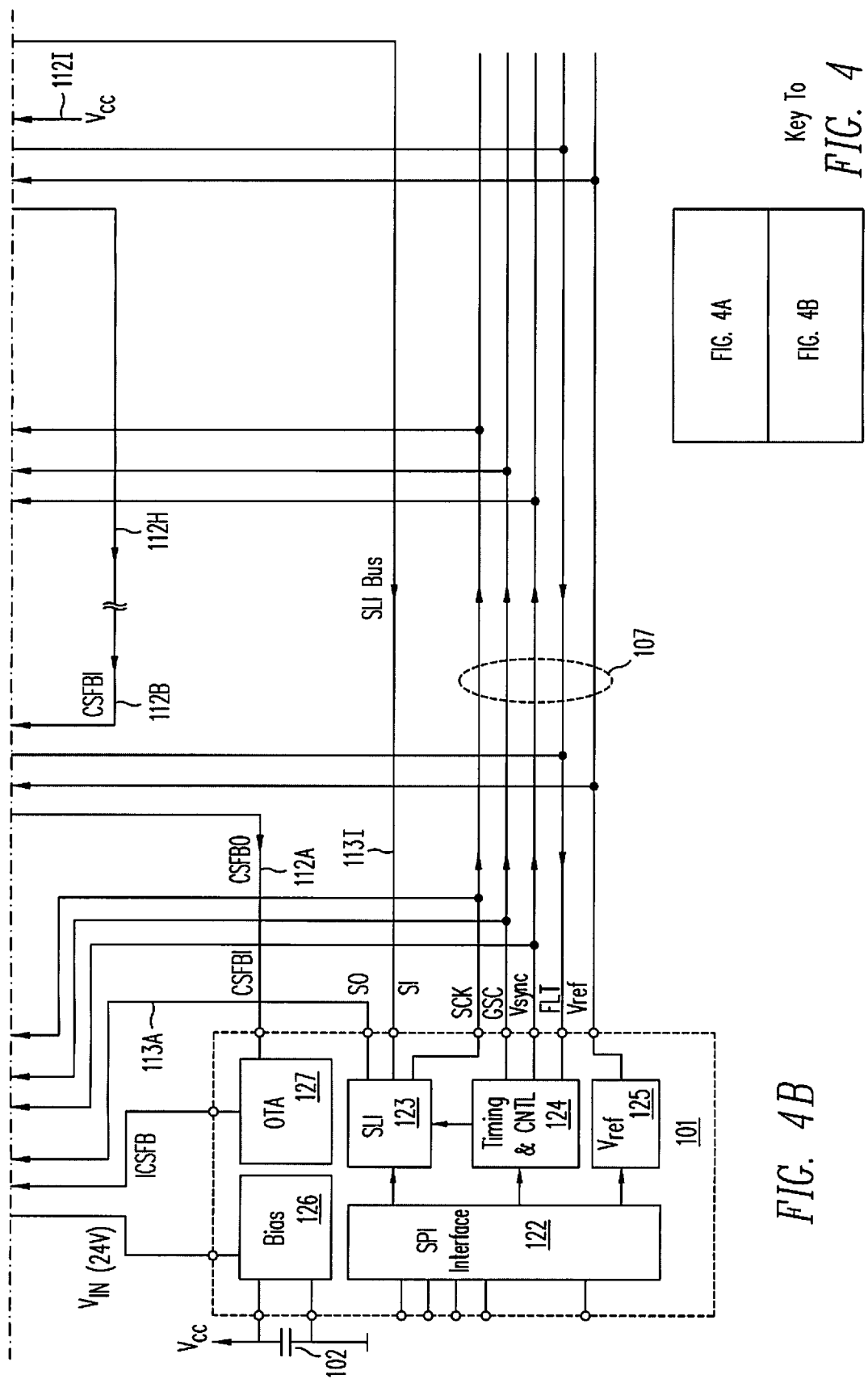

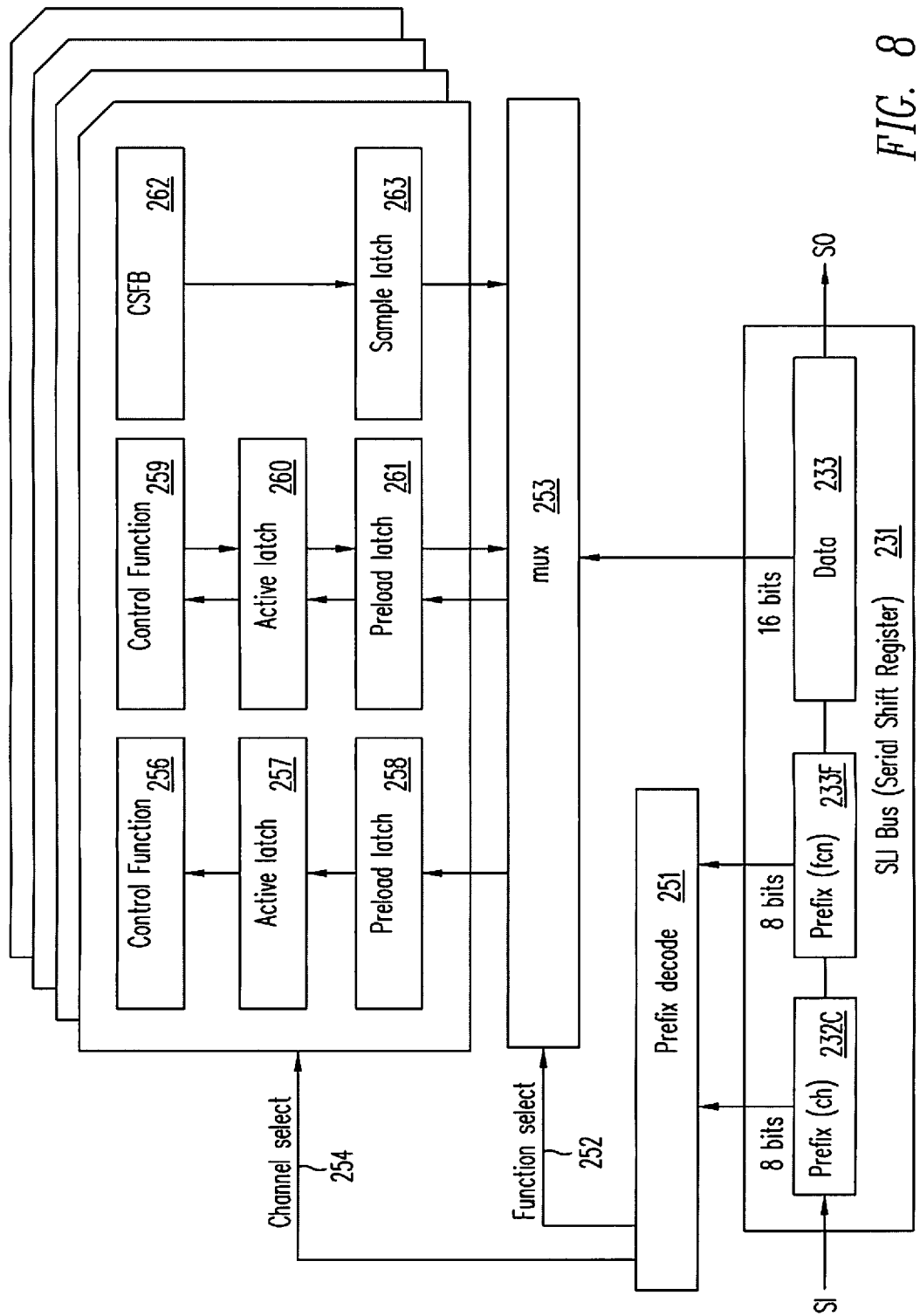

SERIAL LIGHTING INTERFACE WITH EMBEDDED FEEDBACK

CROSS-REFERENCE TO RELATED APPLICATIONS

This application is a continuation of application Ser. No. 13/346,659, filed Jan. 9, 2012, which claims the priority of Provisional Application No. 61/568,545, filed Dec. 8, 2011, each of which is incorporated herein by reference in its entirety.

This application is related to the following applications, each of which is incorporated herein by reference in its entirety: application Ser. No. 13/346,625, filed Jan. 9, 2012 entitled Low Cost LED Driver with Integral Dimming Capability; application Ser. No. 13/346,647, filed Jan. 9, 2012, entitled. Low Cost LED Driver with Improved Serial Bus.

BACKGROUND OF THE INVENTION

This invention relates to semiconductor devices and circuits and methods for driving LEDs in lighting and display applications.

LEDs are increasingly being used to replace lamps and bulbs in lighting applications including providing white light as a backlight in color liquid crystal displays (LCD) and high definition televisions (HDTV). To backlight a color LCD panel, the LED strings may comprise white LEDs or combinations of red, green, and blue LEDs adjusted to produce white light with controllable color temperature. While these LEDs may be used to uniformly light the entire display, the performance, contrast, reliability, and power efficiency of the display are improved by employing multiple strings of LEDs, each driven to different current and brightness levels corresponding to that portion of the display the particular LED string illuminates. The term "local dimming." refers to backlighting systems capable of such non-uniform backlight brightness. Power saving can be as high as 50% over that of LCDs employing uniform backlighting. Using local dimming, LCD contrast ratios can approach that of plasma TVs.

To control the brightness and uniformity of the light emitted from each string of LEDs, special electronic driver circuitry must be employed, to precisely control the LED current and voltage. For example, a string of "m" white LEDs connected in series requires a voltage equal to approximately 3.1 to 15 (typically 3.3) times "m" to operate consistently. Supplying this requisite voltage to a LED string generally requires a step-up or step-down voltage converter and regulator called a DC-to-DC converter or switch-mode power supply (SMPS). When a number of LED strings are powered from a single SMPS, the output voltage of the power supply must exceed the highest voltage required by any of the strings of LEDs. Since the highest forward voltage required cannot be known a priori, the LED driver IC must be intelligent enough to dynamically adjust the power supply voltage using feedback. If two or more power supply voltages are required, more than one feedback signal is required.

In the case of RGB backlighting, the voltage feedback requirement is even more complex because red, green and blue LEDs have significantly different forward voltages and cannot share a common power supply rail. Instead, RGB LED strings require three different supply voltages, $+V_{RLED}$, $+V_{GLED}$, and $+V_{BLED}$, respectively, each with separate feedback signals to dynamically adjust their respective power supply voltages to the proper level. For example, a string of 30 red LEDs in series requires a supply over 66V to operate properly, while 30 blue LEDs may require a supply over 96V, and 30 green LEDs requires a supply of more than 108V.

In addition to providing the proper voltage to the LED strings, the backlight driver must precisely control the current $I_{LED}$ conducted in each string to a tolerance of ±2%. Accurate current control is necessary because the brightness of an LED is proportional to the current flowing through it, and any substantial string-to-string current mismatch will be evident as a variation in the brightness of the LCDs. Aside from controlling the current, local dimming requires precise pulse control of LED illumination, both in timing and duration, in order to synchronize the brightness of each backlight region, zone, or tile to the corresponding image in the LCD screen.

Another complication is that the color temperature of white LEDs varies with current. As an example, a string of white LEDs conducting 30 mA for 100% of the time is ideally equivalent in brightness to the same LED string carrying 60 mA pulsed on and off at a 50% duty factor. Even at the same brightness, however, the color temperature will not be the same. So accurately setting and maintaining current in each string is critical to achieving a uniform white backlight for a color LCD panel.

In the case of RGB backlighting, balancing current is even more complex, since the luminosity, i.e. the light output or brightness, of red, blue and green LEDs differs substantially. Red LEDs, for example, produce less light for the same LED current than blue LEDs. The difference is understandable since the semiconductor materials and the manufacturing process used to make LEDs of different colors differ significantly.

As will be shown in this background section, the known solutions to local dimming limit display brightness and suffer from high solution costs. For example, early attempts to integrate LED driver control circuitry with multiple channels of high-voltage current sink transistors were problematic because a mismatch in the forward-voltage of the LED strings resulted in excessive power dissipation and overheating. Attempts to minimize power dissipation by lowering LED currents and limiting the number of LEDs in a string (for better channel-to-channel voltage matching) proved uneconomical, requiring more LEDs and a greater number of channels of LED drive. As a result, the fully integrated approach to LED backlight drive has been limited to small display panels or very expensive "high-end" HDTV's.

Subsequent attempts to reduce overall display backlight costs using multichip approaches have sacrificed necessary features, functionality, and even safety.

For example, the multichip solution to driving LEDs shown in FIG. 1 comprises an interface IC 6 driving multiple discrete current sink DMOSFETs 4 and high-voltage protection devices 3. The backlight system comprises sixteen LED strings 2A-2Q (referred to collectively as LED strings 2) with each of LED strings 2A-2Q containing "m" series-connected LEDs, ranging in length from 2 to sixty LEDs. (Note that the letter "O" has been omitted in the series 2A-2Q to avoid confusion with the number zero.) Each LED string has its current controlled by one of discrete current sink DMOSFETs 4A-4Q, respectively. Interface IC 6 sets the current in each LED string in response to instructions from a backlight microcontroller (μC) 7 communicated through a high speed, expensive. SPI bus interface 11. Microcontroller μC 7 receives video and image information from a scalar IC 8 in order to determine the proper lighting levels needed for each LED string.

As shown, every LED string 2A-2Q is powered by a common LED power supply rail 12, generated by a switch-mode power supply (SMPS) 9, having a voltage $+V_{LED}$ generated in response to a current-sense feedback (CSFB) signal 10 through feedback from interface IC 6. Supply voltages vary with the number of LEDs "m" connected in series and may range from 35 volts for ten LEDs up to 150 volts for strings of 40 LEDs. SMPS 9 may be powered from the AC mains or alternatively from another input such as a +24V input.

SMPS 9 typically comprises a flyback converter operating in hard switching or in quasi-resonant mode. Forward converters and Cuk converters, while applicable, are generally too expensive and unnecessarily complex to serve the cost-sensitive display and TV markets. In the event, that SMPS 9 is powered from a +24V input, its operation depends on the number of LEDs connected in series. If the forward voltage of the LED string is less than 24V, e.g. a series connection of less than 7 LEDs, SMPS 9 can be realized using a Buck-type switching regulator. Conversely, if the forward voltage of the LED string is greater than 24V, e.g. a series connection of more than 8 LEDs, then SMPS 9 can be realized using a boost-type switching regulator.

Regardless of its input voltage, the proper generation of the CSFB signal 10 is critical to achieving reliable operation for a display's LED backlight. If the feedback signal is incorrect, the LED supply voltage $+V_{LED}$ may be too high or too low. If the LED supply voltage is too high, excess power dissipation will occur in the current sink DMOSFETs 4A-4Q. If the LED supply voltage is too low, the LED strings requiring the highest current will not illuminate at the prescribed level, if at all.

To implement the CSFB function, accurate monitoring of a LED string's forward-voltage requires electrical access to the drain of the current sink DMOSFETs 4A-4Q, which for multichip implementations can be particularly problematic, resulting in additional package pins and added component cost.

Current sink DMOSFETs 4A-4Q are realized using discrete DMOSFETs to avoid overheating. Additional discrete MOSFETs 3A-3Q, typically high voltage discrete MOSFETs, are optionally employed to clamp the maximum voltage present across the current sink DMOSFET 4, especially for operation at higher voltages, e.g. over 100V.

Each of components 3A-3Q is a discrete device in a separate package, requiring its only pick-place operation to position and mount it on its printed circuit board. A current sink DMOSFET, a clamping MOSFET (if any), and its associated LED string are commonly referred to as a "channel."

Each set of discrete MOSFETs 3A-3Q and DMOSFETs 4A-4Q, along with its corresponding string of white LEDs, is repeated "n" times for an n-channel LED driver system. For example, in addition to SMPS module 9, a 16-channel backlight system requires 34 components, namely a microcontroller, a high-pin-count LED interface IC, and 32 discrete MOSFETs, to facilitate local dimming in response to video information generated from scalar IC 8. The solution is complex and expensive.

In some cases, it is desirable to split LED power into more than one power supply, e.g. to reduce the power dissipation in any one supply and its components, but prior art LED interface ICs cannot support multiple independent feedback signals. In the case of RGB backlit displays, the solution is even more complex and expensive. Since existing and prior art LED drivers and controllers include only a single CSFB signal per integrated circuit, independently regulating three different power supplies requires three separate LED interface ICs along with three separate power supplies, making today's RGB backlighting solutions prohibitively expensive.

In either case, the assembly of a large number of discrete components, i.e. a high build of materials (BOM) count, results in expensive PCB assembly, further exacerbated by the high package cost of high pin count package 6. The need for such a large number of pins is illustrated in FIG. 2A, illustrating greater circuit detail for an individual channel of an LED drive system. As shown, each channel includes a string of "m" series connected LEDs 21, a cascode-clamp MOSFET 22 with an integral high-voltage diode 23, a current sink MOSFET 24, and a current-sensing I-Precise gate driver circuit 25.

The active current sink MOSFET 24 is a discrete power MOSFET, preferably a vertical DMOSFET, having a gate, source and drain connection. I-Precise gate driver circuit 25 senses the current in current sink MOSFET 24 and provides it with the requisite gate drive voltage to conduct a precise amount of current. In normal operation, current sink MOSFET 24 operates in its saturated mode of operation, controlling a constant level of current independent of its drain-to-source voltage. As a result of the simultaneous presence of drain voltage and current, power is dissipated in MOSFET 24.

Continuous measurement of the drain voltage of current sink MOSFET 24 is required for two purposes—to detect the occurrence of shorted LEDs in an LED fault circuit 27 and to facilitate feedback to the system's SNIPS through CSFB circuit 26. The signal generated by CSFB circuit 26 is critical to dynamically adjust $+V_{LED}$ to the proper voltage, high enough to guarantee every LED string is illuminated but low enough to avoid excess voltage impressed upon the current sink DMOSFET 24 resulting in unwanted power dissipation. With only one CSFB signal, it is not possible to power the LEDs from more than one power supply, i.e. to split the power requirements in two to reduce the size, cost and heating in the SMPS.

Current sink MOSFET 24 requires three connections to the control IC, specifically the source for current measurement, the gate for biasing the device, and the drain for fault and feedback sensing. These three connections per channel are depicted crossing the discrete-to-IC interface 28. Even in FIG. 2B where a cascode clamp MOSFET 22 is eliminated and current sink MOSFET 24 must sustain high voltages, illustrated by HIV integral diode 23, each channel still requires three pins per channel crossing interface 28. This three-pin per channel requirement explains the need for high-pin count interface IC 6 shown in FIG. 1. For a sixteen-channel driver, the need for three pins per channel uses 48 pins for the outputs. Including the SPI bus interface, analog functions, power supplies and more, a costly 64 or 72-pin package is necessary. Worse yet, many TV printed circuit board assembly houses are incapable of soldering packages with a pin pitch any smaller than 0.8 or 1.27 mm. A 72-pin package with a 0.8 mm pin pitch requires a 14×14 mm plastic body to accommodate the peripheral linear edge needed to fit all the pins.

One significant issue with the multichip structure shown in FIG. 1 is that temperature sensing circuitry in interface IC 6 can only detect the temperature of the interface IC itself, where no significant power dissipation is occurring. Unfortunately, the significant heat is being generated in discrete current sink DMOSFETs 4, where no temperature sensing is possible. Without temperature sensing, any one of the current sink MOSFETs 4A-4Q could overheat without the system being able to detect or remedy the condition.

In summary, today's implementations for LED backlighting of LCD panels with local dimming capability suffer from numerous fundamental limitations in cost, performance, features, and safety.

Highly integrated LED driver solutions require expensive large area dice packaged in expensive high pin count packages, and concentrate heat into a single package, limiting the driver to lower currents, due to power dissipation resulting from the linear operation of the current sink MOSFETs, and lower voltages, due to power dissipation resulting from LED forward-voltage mismatch, exacerbated for greater numbers of series connected LEDs.

Multi-chip solutions combining an LED controller with discrete power MOSFETs require BUM counts and even higher-pin-count packaging. Having nearly triple the pin count of fully integrated LED drivers, a sixteen channel solution can require 33 to 49 components and a 72 pin package as large as 14 mm×14 mm. Moreover, discrete MOSFETs offer no thermal sensing or protection against overheating. With only one feedback signal, these LED drivers cannot power two or more LED power supplies without including additional interface ICs, adding cost and complexity.

Similarly, expanding the use of these existing LED driver and interface ICs to RGB backlighting requires even a higher BUM count, including three large high-pin count packages and all the associated discrete MOSFETs.

What is needed for a cost effective and reliable backlight system for TV's with local dimming is a new semiconductor chip set that eliminates discrete MOSFETs provides a low overall package cost, minimizes the concentration of heat within any component, facilitates over-temperature detection and thermal protection, protects low voltage components from high voltages and against shorted LEDs, flexibly scales to accommodate different size displays, and maintains precise control of LED current and brightness.

Ideally, a flexible solution would be scalable to accommodate a varying number of channels, feedback signals, power supplies, and display panels of different sizes without requiring custom integrated circuits.

BRIEF SUMMARY GE THE INVENTION

A system according to this invention comprises an interface integrated circuit (IC) that transmits a current sense feedback (CSFB) signal to a switch-mode power supply (SMPS) module for setting a single supply voltage for a plurality of light-emitting diode (LED) strings. A plurality of LED driver ICs control the currents in and provide other functions for the LED strings.

Each LED driver IC controls at least two LED strings (channels) and comprises a serial lighting interface (SLI) bus shift register which is functionally linked to latches in the LED driver IC. The latches are used to store digital data which controls the currents in the LED strings and which can be used to control or monitor other functions with respect to the LED strings, such as detecting short- and open-circuits in the LED string and excessive temperatures in the LED driver IC.

In accordance with the invention, each LED driver IC comprises circuitry which periodically samples the forward-voltage drop across each controlled LED string and a CSFB sample latch for storing a digital representation of such samples. The CSFB latch may store a digital representation of the highest forward-voltage drop in any of the LED strings that are controlled by the LED driver IC. Each CSFB latch is coupled to a register within the SLI bus shift register of the LED driver IC. In some embodiments, the forward-voltage drop across an LED string is detected by sensing the voltage at a current sink MOSFET which controls the current through an LED string.

The respective SLI bus shift registers in the LED driver ICs are connected together serially by SLI bus lines in a "daisy chain" arrangement, thereby forming an SLI bus which both originates and terminates at the interface IC. Thus data bits shifted out of the interface IC move serially through the SLI bus shift registers and the SLI bus lines connecting them and return to the interface IC, in the process pushing, data bits that were previously stored in SLI bus registers back to the interface IC in a serial manner.

In some embodiments, the SU bus shift register contains a dedicated CSFB register that stores the CSFB data received from the CSFB latch within the LED driver IC. Similarly, the SLI bus shift register may contain other dedicated registers that are linked in a one-to-one relationship with other functional and sampling, latches within the LED driver IC.

Alternatively, in a preferred embodiment, the SLI bus shift register in each LED driver IC comprises a prefix register and a data register, i.e., the one-to-one relationship between the registers in the SLI bus register and the latches in the LED driver IC. The CSFB latch and other latches in the LED driver IC are identified by a digital word (address) in the prefix register, allowing the data stored in the CSFB latch to be copied into the data register. This structure saves valuable semiconductor "real estate" on the LED driver IC and thereby reduces costs significantly.

In either embodiment, a digital word representing the highest forward-voltage of any LED string controlled by the LED driver IC can be read into and stored in a register within the driver IC's SLI bus shift register.

The interface IC contains circuitry that is capable of receiving the CSFB data stored in the SLI bus shift registers and selecting there from the CSFB word that represents the highest forward-voltage drop of any of the LED strings controlled by the LED. This word is then used by the interface IC to generate a CSFB signal which the SMPS module uses to set the appropriate supply voltage for all of the controlled LED strings.

The sampling of CSFB data in the LED driver ICs is carried out at predetermined intervals, after each of which the data is again shifted to the interface IC, which then sends a new SCFB signal to the SNIPS module, allowing the supply voltage to be adjusted appropriately based on the new highest forward-voltage drop among the controlled LED strings.

This arrangement allows flexibility and scalability for systems that contain different numbers of LED strings and other parameters.

The arrangement also allows an LED drive system to easily be partitioned into different groups of LED strings that are supplied by different SNIPS modules at different supply voltages. This is useful, for example, when a display contains separate strings of red, green and blue LEDs, which typically require different supply voltages. In this situation the interface IC contains circuitry that is capable of separating the CSFB words that relate to the red, green and blue LED strings, respectively, and sending appropriate CSFB signals to separate SNIPS modules that provide supply voltages for the different LED strings. In embodiments wherein the SLI bus shift registers contain dedicated SCFB registers the separation process can be performed by counting the number of bits received to identify which of the LED strings the CSFB data relates to. In embodiments wherein the SLI shift registers contain prefix and data registers, the prefix can be used to identify which of the LED strings the CSFB data relates to.

BRIEF DESCRIPTION OF THE SEVERAL VIEWS OF THE DRAWING

FIGS. 4A and 4B illustrate a diagram of a multi-channel LED backlight system using intelligent LED drivers without cascode-clamp MOSFETs and comprising an SLI serial bus control.

FIG. 8 is a block diagram illustrating a multi-function prefix multiplexed SLI bus register with a corresponding three-tiered register-latch architecture including, preload and active latches and embedded CSFB capability.

DETAILED DESCRIPTION OF THE INVENTION

As described in the background section, existing backlight solutions for TVs and large screen LCDs are complex, expensive and inflexible. To reduce the cost of backlight systems for LCD's with local dimming without sacrificing safe and reliable operation clearly requires a completely new architecture that in the very least eliminates discrete MOSFETs, minimizes the concentration of heat within any component, facilitates over-temperature detection and thermal protection, and protects low voltage components from high voltages. While meeting these objectives may alone be insufficient to achieve a truly cost-effective solution able to meet the demanding cost targets of the home consumer electronics market, such an improvement is a necessary first step toward such a goal toward realizing low-cost local dimming.

Figure 1:
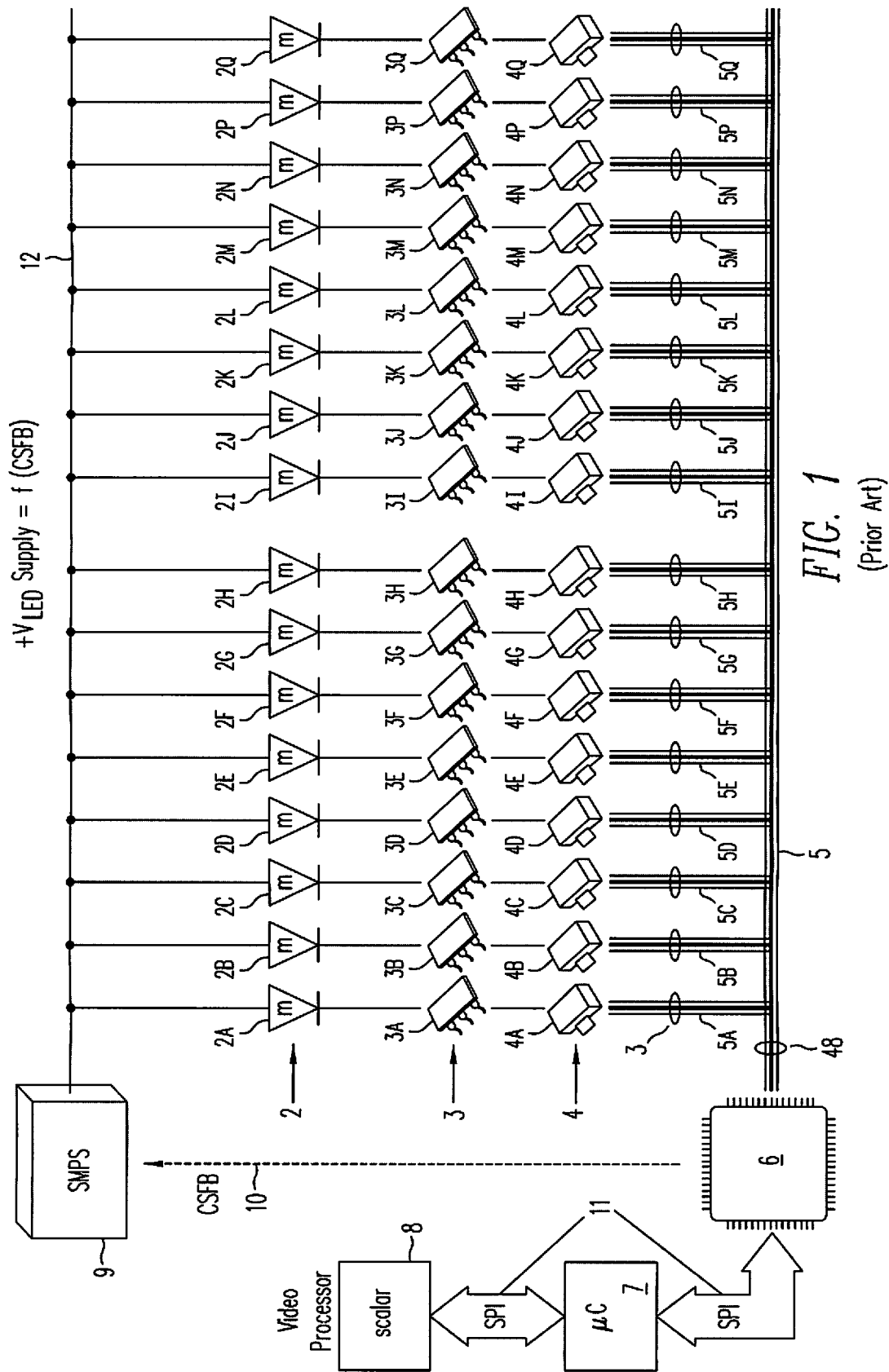
FIG. 1 is a diagram of a prior-art multi-channel LED drive system for LCD backlighting using discrete DMOSFETs as integrated current sinks and protective voltage clamps.
Figure 2A:
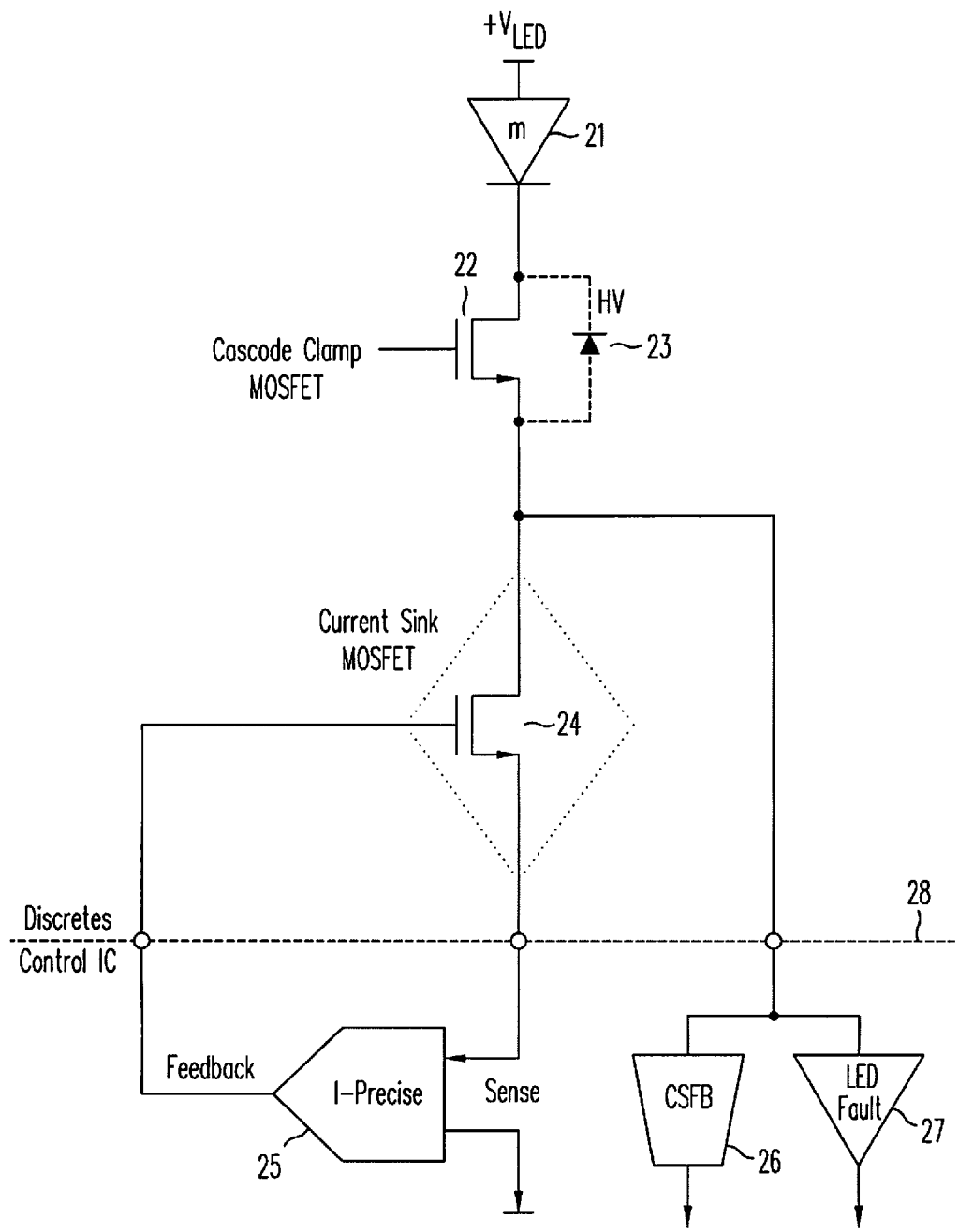
FIG. 2A is a schematic diagram of an individual LED drive channel using discrete current sink DMOSFETs and protective high-voltage cascode clamp DMOSFETs.
Figure 2B:
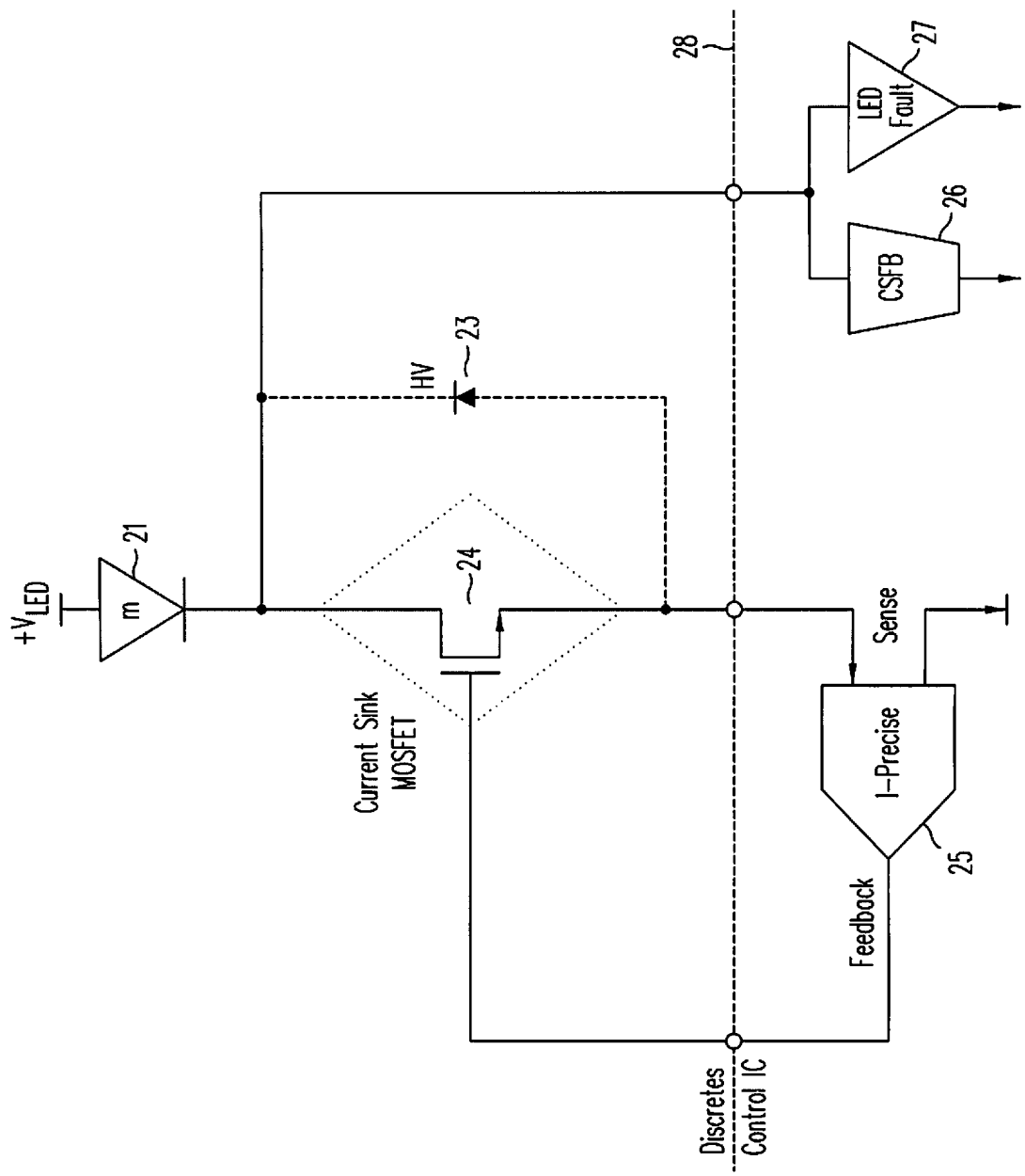
FIG. 2B is a schematic diagram of an individual LED drive channel using discrete high-voltage current sink DMOSFETs without cascode clamp MOSFETs.

This invention described herein enables a new cost-efficient and scalable architecture for realizing safe and economically viable LED backlighting systems for large-screen LCDs and TVs with energy efficient local dimming capability. The new LED drive system, functional partitioning, and architecture, disclosed herein, completely eliminate the aforementioned problems in cost, functionality and the need for high pin count packages. The new architecture is based on certain fundamental premises including 1. The analog control, sensing, and protection of the current sink MOSFETs should be functionally integrated together with their associated current sink MOSFETs, not separated into another IC
2. Basic dimming, phase delay functions, LED current control and channel specific functions should be functionally integrated together with the current sink MOSFETs they control, not separated into another IC
3. System timing, system μC host negotiations, and other global parameters and functions not unique to a specific channel should not be functionally integrated together with the current sink MOSFETs
4. The number of integrated channels, i.e. current sink MOSFETs, per packaged device should be optimized for thermal management to avoid overheating while meeting specified LED current, supply voltage and LED forward-voltage mismatch requirements 5. Communication with and control of multi-channel LED drivers should employ a low-pin count method, ideally requiring no more than three package pins in total on the central interface IC as well as on each LED driver IC. The communication method should constitute only a small fraction of the driver IC's die area and cost.
6. The level of functional integration in the interface and driver ICs should be balanced to facilitate the use of low-cost and low-pin count packages compatible with single layer PCB assembly
7. Ideally, the system should flexibly scale to any number of channels without requiring significant redesign of the ICs The conventional architecture of FIG. 1, i.e. a centralized controller driving a number of discrete power MOSFETs, fails to meet even one of the above goals, primarily because it requires a central point of control, or "command center", for all digital and analog information processing. Necessarily, the command center IC must communicate with its µC host as well as directly sensing and driving every current sink MOSFET. This high degree of component connectivity demands a large number of input and output lines, necessitating high pin count packaging.

Distributed LED Drive Architecture Overview

In sharp contrast to the prior art, the above design criteria describe, if not mandate, a "distributed" system, one lacking the need for central control. In the disclosed distributed system, an interface IC translates information obtained from the host µC into a simple serial communications protocol, sending instructions digitally to any number of intelligent LED driver "satellite" ICs connected to the serial bus.

The implementation of an LED driver facilitating the above criteria is described in application Ser. No. 13/346,625, to Williams et al., entitled "Low Cost LED Driver with Integral Dimming Capability" by Williams et al., which is incorporated herein by reference in its entirety. An alternative version of an LED driver is described in application Ser. No. 13/346, 647, to Williams et al., entitled "Low Cost LED Driver with Improved Serial Bus" by Williams et al., which is also incorporated herein by reference in its entirety.

The main concepts of these applications are reiterated here, including a hardware description of the interface and LED driver ICs, and the operation of several versions of an inventive "serial lighting interface" or SLI bus—serial communication protocols containing parameters specifically relevant to controlling LED lighting. Each driver IC, in response to its SLI bus digital instructions, performs all the necessary LED driver functions such as dynamic precision LED current control, PWM brightness control, phase delay, and fault detection, focally, without the assistance of the interface IC. When connected in a "daisy-chain" back to the interface IC, fault conditions such as an open LED, a shorted LED, or an over-temperature fault occurring in any of the driver ICs can also communicated back to the interface IC and ultimately to the host µC.

While the basic architecture disclosed in the two above-referenced applications is similar, their realization of the SLI bus protocol and physical interface differs. In the "fat" SLI bus protocol described in the first application, long digital words are employed to load all the control parameters into every LED driver IC in a single SLI bus broadcast, i.e. all the data for every register of every driver IC is shifted out of the interface IC onto the SLI bus at once. In the alternative version described in the second application, the inventive "prefix multiplexed" SLI bus protocol, smaller digital words are directed toward specific functional latches using multiple SLI bus broadcasts.

Regardless of the SLI bus protocol employed, each LED driver IC includes an analog, current sense feedback (CSFB) input and output pins (CSFBI and CSFBO), connected in a daisy chain with CSFBI and CSFBO pins of the other driver ICs and with the interface IC to provide feedback to the high-voltage switch-mode power supply (SMPS), dynamically regulating the voltage powering the LED strings. The analog CSFB signals require two package pins on every LED driver IC. Each LED driver IC outputs only a single CSFB signal regardless the number of integrated channels.

Through the SLI bus, every satellite LED driver-IC communicates with a central companion interface IC, interpreting SPI bus commands from a video/graphics processor or scalar IC and translating, the SPI bus information it receives into SLI bus commands. Along with its translation responsibilities, this interface IC supplies a reference voltage to all the LED-driver ICs needed to insure good current matching, generates Vsync and grey scale clock (GSC) pulses to synchronize their operation, and monitors every LED driver IC for potential faults. It also facilitates voltage-to-current translation of the analog voltage CSFB signal into an analog current CSFB signal, using an on-chip operational transconductance amplifier (OTA). The analog CSFB signals require two package pins (CSFBI and ICSFB) on the interface IC, the CSFBI pin to receive the voltage CSFB signal from the LED driver ICs and the ICSFB pin to transmit the current CSFB signal to the SMPS.

So by repartitioning the functions of a LED backlight system such that precision current control and dimming, fault detection and CSFB sensing and feedback are integrated with the high voltage current sink DMOSFETs and not in the system interface IC, high pin count packages can be eliminated and a scalable distributed system is realized.

LED Drivers with Integral Dimming, Fault Detection and CSFB Feedback

The implementation of an inventive LED driver IC 51 with SLI bus communication is shown in FIG. 34 comprising a dual-channel driver with integrated current sink DMOSFETs 55A and 55B, cascode clamp DMOSFETs 57A and 57B with integral high-voltage diodes 58A and 58B, i-precise gate driver circuits 56A and 56B for accurate current control, an analog control and sensing circuit 60, and a digital control and timing circuit 59. An on-chip bias supply and regulator 62 powers the IC.

LED driver IC 51 provides complete control of two channels of 250 mA LED drive with 150V blocking capability and ±2% absolute current accuracy, 12 bits of PWM brightness control, 12 bits of PWM phase control, 8 bits of current control, fault detection for LED open and LED short conditions and over-temperature detection, all controlled through a high-speed SLI bus, and synchronized to other drivers by a common Vsync and grey-scale clock (GSC) signal. While the specific example shown illustrates cascode clamp DMOSFETs 57A and 57B rated at 150V blocking capability, the devices can be sized for operation from 100V to 300V as needed. The driver IC's current rating of 250 mA is set by the power dissipation of the package and the mismatch in forward voltage in the two LED strings 52A and 52B.

In operation, LE) driver IC 51 receives a stream of data on its serial input SI pin which is fed into the input of an SLI bus shift register 61. The data is clocked at a rate set by a serial clock SCK signal supplied by the interface IC (not shown). The maximum clock rate for the data depends on the CMOS technology used to implement shift register 61, but operation at 10 MHz is achievable even using 0.5 µm line-width processes and wafer fabs. As long as the SCK signal continues to run, data will shift into shift register 61 and ultimately exit the serial out pin SO on its way to the next LED driver IC in the serial daisy chain.

After the data intended for the driver IC 51 arrives in shift register 61, the SCK signal is momentarily stopped by the interface IC sending the data. Using the "fat" SLI bus protocol, all the serial data used to control the LED driver IC parameters are shifted into SLI bus shift register 61 at one time, i.e., the data is shifted into the shift register 61 in every driver IC in the daisy chain. Even if only one parameter must be changed, all the data is rewritten into the shift registers 61. Thereafter, a Vsync pulse latches the data from the shift register 61 into latches contained within the digital timing and control (DC&T) circuit 59 and into latches contained within analog control and sensing AC&S circuit 60, these latches comprising flip flops or static RAMs. Also at the time of the Vsync pulse, any data previously written into the fault latches contained within AC&S circuit 60 will be copied into the appropriate bits of SLI bus shift register 61.

A resumption of the serial clock signal SCK will move the read and the write bits within shift register 61 on through the daisy chain into the next IC. In a preferred embodiment, the daisy chain forms a loop connecting back to the interface IC. Sending new data into the daisy chain ultimately pushes the existing data residing in the shift registers on through the loop and ultimately back to the interface IC. In this manner the interface IC can communicate with the individual LED driver ICs setting LED string brightness and timing, and the individual driver ICs can communicate individual fault conditions back to the interface IC.

Using this clocking scheme, data can be shifted through a large number of driver ICs at a high speed without affecting the LED current or causing flicker, because the current and timing controlling the current sink DMOSFETs 55A and 55B only change upon each new Vsync pulse. Vsync may vary from 60 Hz to 960 Hz with the grey scale clock frequency scaling proportionately, typically 4096 times the Vsync frequency. Since Vsync is slow, under 1 kHz, when compared to the SLI bus clock SCK frequency, the interface IC has flexibility to modify and resend the data, or query the fault latch multiple times within a given vertical-sync pulse duration.

Commencing on the Vsync pulse, the DC&T circuit 59 generates two PWM pulses to toggle the output of I-Precise gate driver circuits 56A and 56B on and off after the proper phase delay and for the proper pulse-width duration, or duty factor D. I-Precise gate driver circuits 56A and 56B sense the current in current sink MOSFETs 55A and 55B respectively and provide the proper gate drive voltage to maintain a target current during the time each current sink MOSFET is enabled, by the PWM pulse provided by each I-Precise gate driver circuit. Operation of the I-Precise gate driver circuit is therefore that of a "strobed" amplifier, being pulsed on and off digitally but controlling the current in the LEDs as an analog parameter.

The peak current is set globally for all the LED driver ICs by the Vref signal and by the value of an Iset resistor 54. The Vref signal is, in a preferred embodiment, generated by the interface IC, or it may be supplied as an auxiliary output from the SMPS.

The specific current in any one LED string can be further controlled through the SLI bus by the Dot latch, comprising an 8 to 12 bit word, that adjusts the current sink MOSFET's current to a percentage from 0% to 100% of the peak current value in either 256 to 4096 different steps, respectively. In this manner, precise digital control of the LED current, emulating the function of a current mode digital-to-analog converter or "current DAC", is possible using the newly disclosed architecture. In LCD backlighting applications this feature can be used for calibrating the backlight brightness, for improving backlight uniformity, or for operating in 3D mode.

As shown, the current flowing through LED string 52A is controlled by current sink DMOSFET 55A and corresponding I-Precise gate driver circuit 56A. Similarly, the current flowing through LIED string 52B is controlled by current sink DMOSFET 55B and corresponding I-Precise gate driver circuit 56B. The maximum voltage impressed upon current sink DMOSFETs 55A and 55B is limited by cascode clamp DMOSFETs 57A and 57. So long as the number of LEDs "m" is not too large, the voltage $+V_{LED}$ will not exceed the breakdown voltage of PN diodes 58A and 58B, and the maximum voltage on the current sink MOSFETs will be limited to around 10V, one threshold voltage below the gate bias impressed on cascode clamp DMOSFETs 57A and 58B by bias circuit 62. Bias circuit 62 also generates the five-volt Vcc supply to operate its internal circuitry from the 24V VIN input using a linear voltage regulator and filter capacitor 53.

The drain voltages on current sink DMOSFETs 55A and 55B are also monitored by AC&S circuit 60 and compared to an over-voltage value stored in its SLED register from SLI bus shift register 61. If the drain voltage is below the programmed value, the LED string is operating normally. If, however, the voltage rises about the prescribed value, one or more LED is shorted and a fault is detected and recorded for that specific channel. Likewise, if the I-Precise gate driver circuit cannot maintain the required current, i.e. the LED string is operating "undercurrent", it means an LED has failed open and the circuit continuity is lost. The channel is then turned off, its CSFB signal is ignored, and the fault is reported. Sensing this "undercurrent", can be performed by monitoring the current sink DMOSFET for a saturation condition, meaning that the I-Precise gate driver circuit is driving the gate of the current sink DMOSFET as "full on" as it can, or alternatively by monitoring the voltage drop across the input terminals of I-Precise gate driver circuit. When the voltage at the input terminals of the T-Precise gate driver circuit drops too low, the undercurrent condition has occurred, thereby indicating an open-LED fault.

If an over-temperature condition is detected, a fault is reported and the channel is left on and conducting unless the interface IC sends a command to shut down that channel. If, however, the temperature continues to rise to dangerous levels, AC&S circuit 60 will disable the channel independently and report the fault. Regardless of the nature of a fault, whether shorted LED, open LED, or over-temperature, whenever a fault occurs an open drain MOSFET within AC&S circuit 60 will activate and pull the FLT pin low, signaling to the host µC that a fault condition has occurred.

AC&S circuit 60 also includes an analog current sense feedback (CSFB) signal which reflects the voltages at the drains of the two current sink DMOSFETs 55A and 55B and at the CSFBI input pin to determine which of the three voltages is lowest and passing that voltage to the CSFBO output pin. In this way the lowest current sink MOSFET source voltage, and hence the LED string with the highest forward-voltage drop is passed to the input of the next driver IC and ultimately back to the interface IC, which responsively generates an CSFBI signal which the SMPS uses to supply the correct $+V_{LED}$ to the supply rail for the LED strings. The integrated current sense feedback function uses two pins (CSFBI and CSFBO) on each LED driver IC and outputs only one analog signal on the CSFBO pin, regardless of the number of channels integrated in LED driver IC 51.

In the manner described, an LED driver IC 51 with integral dimming and fault detection capability can be realized without the need of a central interface IC.

Figure 3A:
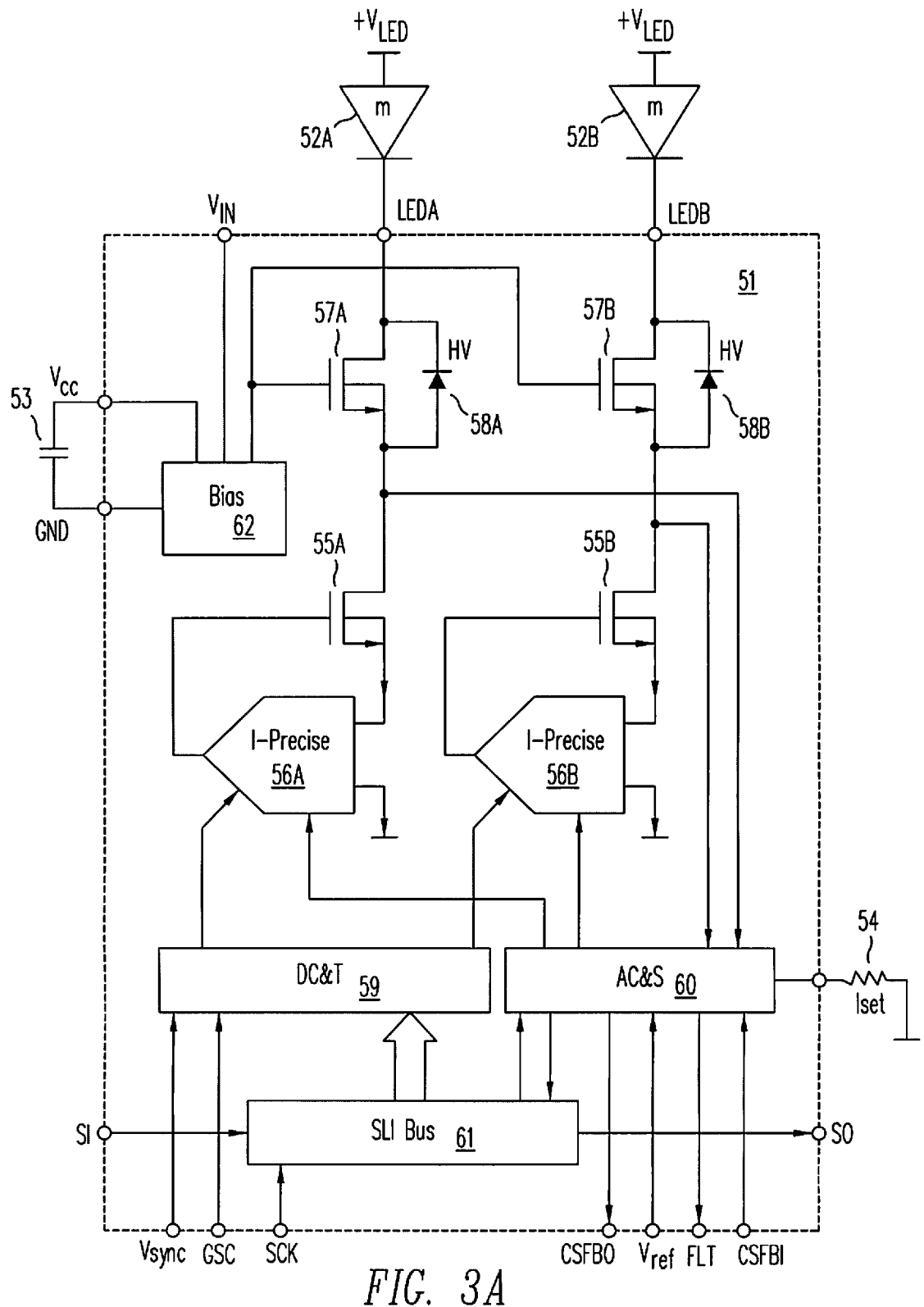
FIG. 3A is a schematic diagram of a dual-channel high-voltage intelligent LED driver with serial bus control with protective high-voltage cascode clamp DMOSFETs and a fat SLI bus interface.
Figure 3B:
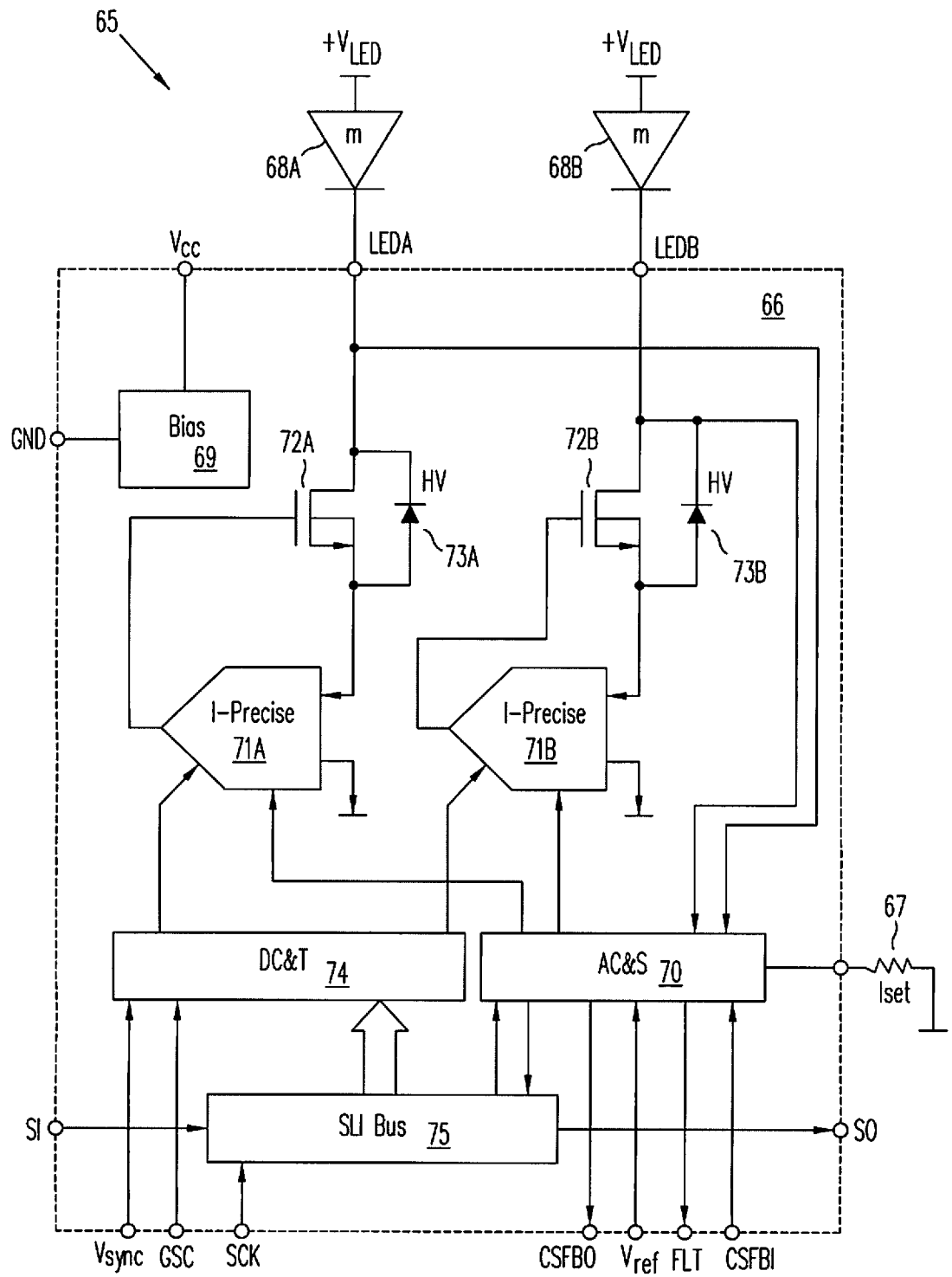
FIG. 3B is a schematic diagram of a dual-channel high-voltage intelligent LED driver with serial bus control using high-voltage current sink MOSFETs without cascode clamp MOSFETs and fat SLI bus interface.

An alternate implementation of an LED driver 65 meeting the above criteria is shown in FIG. 3B. LED driver 65, which is integrated in an LED driver IC 66, is a dual-channel driver with integrated current sink DMOSFETs but without cascode clamp MOSFETs. Instead current sink DMOSFETs 72A and 72B contain integral high-voltage diodes 73A and 73B that are designed to sustain high-voltages in when DMOSFETs 72A and 72B are in an off condition. Typically, such a design is most applicable to operation below 100V, but it can be extended to 150V if required. As in the LED driver C 51 of FIG. 3A, I-precise gate driver circuits 71A and 71B facilitate accurate current control, controlled by an analog control and sensing circuit 70, and a digital control and timing circuit 74. An on-chip bias supply and regulator 69 powers the LED driver IC 66, in this case from Vcc, not from the 24V input as in driver IC 51. Aside from lacking cascode clamp DMOSFETs, driver IC 66 operates similar to driver IC 50, controlled through its SLI bus 75.

LED driver IC 66 includes an integrated current sense feedback function using two pins and outputs only one analog signal CSFBO regardless of the number of channels integrated.

Figure 3C:
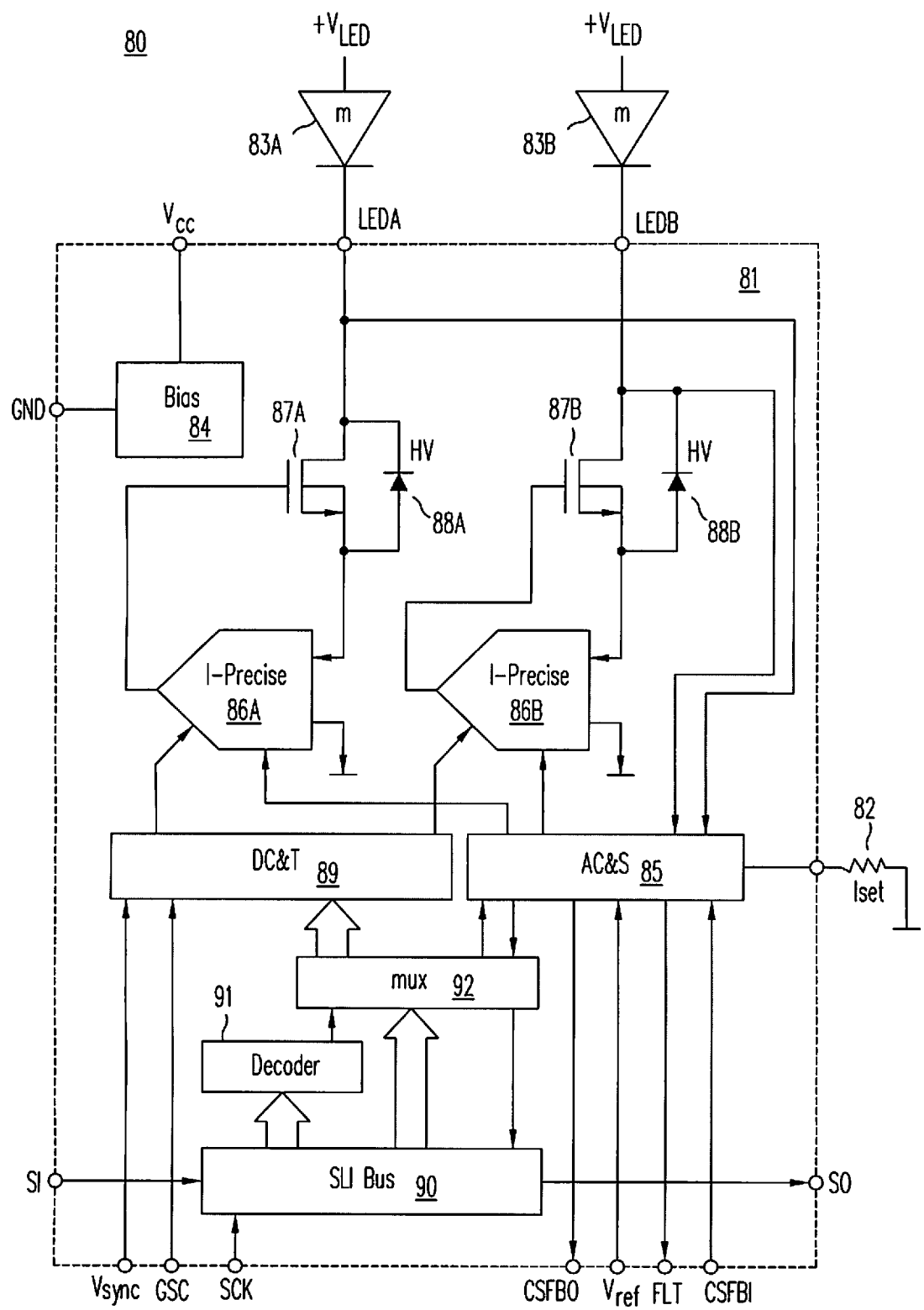
FIG. 3C is a schematic diagram of a dual-channel high-voltage intelligent LED driver with serial bus control using high-voltage current sink MOSFETs without cascode clamp MOSFETs and comprising a prefix multiplexed SLI bus interface.

An implementation of an inventive LED driver 80 using a prefix-multiplexed SLI bus is shown in FIG. 3C. LED driver 80 is a dual channel driver and is formed on an LED driver IC 81. LED driver includes current sink DMOSFET 87A and 87B with integral high-voltage diodes 88A and 88B, I-precise gate driver circuits 86A and 86B, an analog control and sensing (AC&S) circuit 85, and a digital control and timing (DC&T) circuit 89. An on-chip bias supply and regulator 84 powers the LED driver IC 81 from a. Vcc input.

LED driver 80 provides complete control of two channels of 250 mA LED drive with 150V blocking capability and ±2% absolute current accuracy, 12 bits of PWM brightness control, 12 bits of PWM phase control, 8 bits of current control, fault detection for LED open and LED short conditions and over-temperature detection, all controlled through a high-speed SLI bus, and synchronized to other drivers by a common Vsync and grey-scale clock (GSC) signal. While the specific example shown illustrates current sink DMOSFETs rated at 150V blocking capability, the devices can be sized for operation from 100V to 300V as needed. The device's current rating of 250 mA is set by the power dissipation of the package and the mismatch in forward voltage in the two LED strings being driven. Above a 100V rating, it is advantageous to integrate high voltage cascode clamp DMOSFETs (not shown) in series with current sink DMOSFETs 87A and 87B, whereby current sink MOSFETs 87A and 87B do not require operation above the clamp voltage, i.e. above 12V.

In operation, LED driver IC 81 receives a stream of data on its serial input SI pin and fed into the input of prefix multiplexed SLI bus shift register 90. The data is clocked at a rate set by serial clock SCK signal supplied by the interface IC, not shown. The maximum clock rate for the data depends on the CMOS technology used to implement shift register 90, but operation at 10 MHz is achievable even using 0.5 µm line-width processes and wafer fabs. As long as SCK signal continues to run, data will shift into shift register 90 and ultimately exit the serial out pin SO on its way to the next device in the serial daisy chain.

After the data corresponding to the specific driver IC arrives in shift register 90, the SCK signal is momentarily stopped by the interface IC sending the data. A decoder 91 interprets the functional latch and channel to be controlled and directs multiplexer 92 to connect the data register within SLI bus interface 90 to the appropriate functional latch within digital control and timing (DC&T) circuit 89 or analog control and sensing (AC&S) circuit 85.

Thereafter, a Vsync pulse latches the data from the data shift register in SLI bus 90 into latches contained within either DC&T circuit 89 or AC&S circuit 85, the latches comprising flip flops or static RAM. In the event that the decoder instructs the SLI bus to interrogate the fault latch within AC&S circuit 85, then at the time of the Vsync pulse, any data previously written into the fault latches contained within AC&S circuit 85 will be copied into the appropriate bits of SLI bus shift register 90.

A resumption of the serial clock SCK signal moves the read and the write bits within shift register 90 on through the daisy chain into the next IC. In a preferred embodiment, the daisy chain forms a loop connecting back to the interface IC sending the data. Sending new data into the daisy chain ultimately pushes the existing data residing in the shift registers on through the loop and ultimately back to the interface IC. In this manner the interface IC can communicate to the individual LED driver ICs setting LED string brightness and timing, and the individual driver ICs can communicate individual fault conditions back to the interface IC.

Using this clocking scheme, data can be shifted through a large number of driver ICs at a high speed without affecting the LED current or causing flicker, because the current and timing controlling the current sink DMOSFETs 87A and 87B only changes upon each new Vsync pulse. Vsync may vary from 60 Hz to 960 Hz with the grey scale clock frequency scaling proportionately, typically 4096 times the Vsync frequency. Since Vsync is slow, under 1 kHz, when compared to the frequency of the serial clock SCK signal, the interface IC has flexibility to modify and resend the data, or query the fault latch multiple times in the interval, between successive Vsync pulses.

Because in the prefix multiplexed or "slim" SLI bus protocol the data register within SLI bus interface 90 is not large enough to write to all the functional latches within DC&T circuit 89 and AC&S circuit 85 from a single SLI bus word or data packet, then the interface IC must send multiple SLI bus packets to the driver ICs to load all the latches. This condition arises at start-up when all the functional latches are first initiated, or when the data in more than one functional latch must be changed contemporaneously. If the data controlling the I-Precise gate driver circuits 86A and 86B is allowed to change gradually in multiple steps over several Vsync periods, e.g. first changing the φ latch, then changing the D latch, then changing the Dot latch, etc., a viewer may be able to discern the step changes as flicker or noise in the video image. Several inventive solutions to circumvent this potential problem are disclosed in the section "Simultaneously Loading Multiple Functional Latches" in the above-mentioned application Ser. No. 13/346,647, by Williams et al., entitled "Low Cost LED Driver with Improved Serial Bus".

After the functional latch data has been loaded, commencing on the next Vsync pulse, DC&T circuit 89 generates two PWM pulses to toggle the output of I-Precise gate driver circuits 86A and 86B on and off after the proper phase delay and for the proper pulse width duration, or duty factor D. I-Precise gate driver circuits 86A and 86B sense the current in current sink MOSFETs 87A and 87B respectively and provide the proper gate drive voltage to maintain a target current during the time current sink MOSFETs 87A and 87B are is enabled by the PWM pulses from 1-Precise gate driver circuits 86A and 86B. Operation of the I-Precise gate driver circuits is therefore similar to that of a "strobed" amplifier, being pulsed on and off digitally but controlling the current in the LEDs as an analog parameter.

The peak current in all the LED driver circuits is set globally by the Vref signal and by the value of Iset resistor 82. The Vref signal is, in a preferred embodiment, generated by the interface IC, or may be supplied as an auxiliary output from the SMPS. In an alternative embodiment channel-specific Dot correction can be eliminated, and Vref can be modulated to facilitate global current control of the LED currents.

In drivers capable of channel-specific Dot correction, the current in any one LED string can be controlled through the SLI bus by the Dot latch, preferably comprising an 8 to 12 bit word, that adjusts the current in the current sink MOSFET's to a percentage from 0% to 100% of the peak current value in either 256 to 4096 different steps respectively. In this manner, precise digital control of the LED currents, emulating the function of a current mode digital-to-analog converter or "current DAC", is possible using the newly disclosed architecture. In LCD backlighting applications this feature can be used for calibrating the backlight brightness, for improving backlight uniformity, or for operating in 3D mode.

The structure and operation of I-Precise gate driver circuits 86A and 86B as well as AC&S circuit 85 are discussed in detail in the above-referenced application Ser. No. 13/346,625, to Williams et al., entitled "Low Cost LED Driver with Integral Dimming Capability".

As shown, the current flowing through LED string 83A is controlled by current sink DMOSFET 87A and corresponding I-Precise gate drive circuit 86A. Similarly, the current flowing through LED string 83B is controlled by current sink DMOSFET 87B and corresponding I-Precise gate drive circuit 86B. Without cascode clamp MOSFETs, the maximum voltage impressed upon current sink DMOSFETs 87A and 87B is limited to operation below the breakdown voltage of high-voltage diodes 88A and 88B. Bias circuit 84 generates internal chip bias voltage from a 5V Vcc input.

The drain voltages on current sink DMOSFETs 87A and 87B are also monitored by AC&S circuit 85 and compared to an over-voltage value stored in its SLED register from SLI bus 90. If the drain voltage is below the programmed value, the LED string is operating normally. If, however, the voltage rises about the prescribed value, one or more LED is shorted and a fault is detected and recorded for that specific channel. Likewise if the 1-Precise gate driver circuit cannot maintain the required current, i.e. the LED string is operating "undercurrent", it means an LED has failed open and the circuit continuity is lost. The channel is then turned off, its CSFB signal is ignored, and the fault is reported. Sensing this "undercurrent", can be performed by monitoring the current sink DMOSFET for a saturation condition, meaning that the I-Precise gate driver circuit is driving the gate of the current sink DMOSFET as "full on" as it can, or alternatively by monitoring the voltage drop across input terminals of the I-Precise gate driver circuit. When the voltage at the input terminals of the I-Precise gate driver circuit drops too low, the undercurrent condition has occurred, thereby detecting an open LED fault.

If an over-temperature condition is detected a fault is reported and the channel is left on and conducting unless the interface IC sends a command to shut down that channel. If however, the temperature continues to rise to dangerous levels, AC&S circuit 85 will disable the channel independently and report the fault. Regardless of the nature of a fault, whether shorted LED, open LED, or over-temperature, whenever a fault occurs an open drain MOSFET within AC&S circuit 85 will activate and pull the FLT pin low, signaling to the host µC that a fault condition has occurred.

AC&S circuit 85 also includes an analog current sense feedback (CSFB) signal which reflects the voltages at the drains of the two current sink DMOSFETs 87A and 871B and at the CSFBI input pin to determine which of the three voltages is lowest and passing that voltage to the CSFBO output pin. In this way, the lowest current source voltage, and hence the LED string with the highest forward-voltage drop is passed to the input of the next LED driver and ultimately back to the SNIPS to power the $+V_{LED}$ supply rail. The integrated current sense feedback function integrated in LED driver IC 81 uses two pins and outputs only one analog signal CSFBO regardless of the number of channels integrated.

In the manner described, a two-channel LED driver with integral dimming and fault detection capability 81 can be realized without the need of a central interface IC.

SLI Bus Interface IC and System Application

Figure 4A:
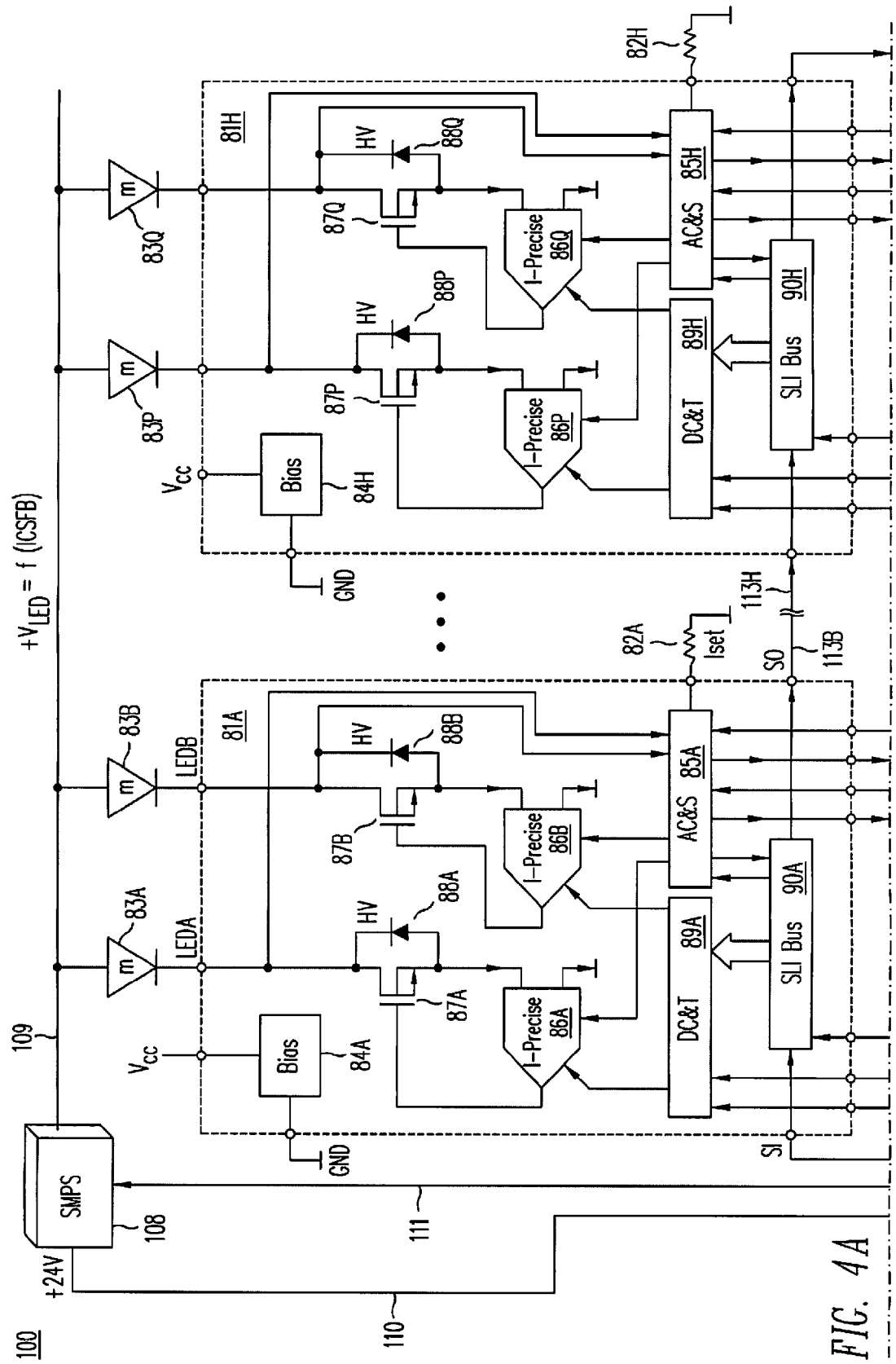

System 100 in FIG. 4 illustrates the application of a distributed system for LED backlighting with local dimming implemented in the manner prescribed by this disclosure. The figure illustrates an interface IC 101, driving a series of LED driver ICs 81A-81H with integral dimming and fault detection powered by a common SMPS 108.

Each of LED driver ICs 81A-81H (sometimes referred to herein individually as LED driver IC 81) may comprise the device shown in FIG. 3C employing the prefix-multiplexed SLI bus protocol or may alternatively employ a fat bus protocol such as the devices shown in FIG. 3A and FIG. 3B. Each driver IC 81 may likewise incorporate a high-voltage current sink DMOSFET as shown in FIGS. 3B and 3C or alternatively may integrate a cascode clamp protected current sink DMOSFET such as shown in FIG. 3A. In the system 100, LED driver IC 81 is illustrated without multiplexer 92 and decoder 91 (shown in FIG. 3C) with the understanding that such functions are embedded within SLI Bus interface 90 as needed, i.e. whenever a prefix multiplexed SLI bus protocol is utilized.

Five common signal lines 107, comprising three digital, clock signals, one digital fault signal, and one analog reference voltage connect interface IC 101 to every driver IC 81. A timing and control circuit 124 generates the Vsync and GSC signals in sync with data from A host µC (not shown) received through an SPI bus interface 122. Timing and control circuit 124 also monitors the FLT interrupt line to immediately detect a potential problem. A reference voltage source 125 provides a reference voltage to the system globally in order to insure good channel-to-channel current matching. A bias supply circuit 126 powers interface IC 101 from a $V_{IN}$ voltage supplied by a fixed +24V supply rail 110 generated by SMPS 108. Bias supply circuit 126 also generates a regulated supply voltage Vcc, preferably 5V, to power LED drivers 81A-81H. The Vcc supply voltage is filtered by a capacitor 102.

In this example, each LED driver 81A-81H comprises two channels of high-voltage current control including current sink DMOSFETs 87A-87Q with integral HV diodes 88A-88Q, I-Precise gate driver circuits 86A-86Q, DC&T circuits 89A-89IH, AC&S circuits 85A-85H and serial SLI bus interface shift registers 90A-90H. While the LED driver ICs 81, like the driver IC 66 shown in FIG. 3B, lack a cascode clamp, the system configuration works equally well with LED driver IC 51 shown in FIG. 3A, except that the 24V VIN supply, rather than Vcc, is used to power the LED driver ICs and bias the gates of the cascode clamp DMOSFETs.

An SLI bus 113, comprising lines 113A-113I connecting the LED drivers 81, comprises a daisy chain, in the example shown where the SO serial output of SLI circuit 123 within interface IC 101 connects via line 113A to the SI input of LED driver 81A, the SO output of LED driver 81A connects via line 113B to the SI input of LED driver 81B (not shown) and so on. SLI bus line 113H connects to the SI input of last LED driver 81H shown in system 100. The SO output of LED driver 81H, in turn, connects via line 113I to the SI input of SLI circuit 123 within interface IC 101. In this manner SLI bus lines 113A-113I (collectively referred to as SLI bus 113) form a complete loop emanating from the interface IC 101, running through each of LED driver ICs 81A-81H (collectively referred to as LED driver IC 81) and back to itself. Shifting data out of the SO pin of interface IC 101 concurrently returns an equal length bit string back into the SI pin of interface IC 101.

SLI circuit 123 generates the SLI bus serial clock SCK signal as required. Because the LED driver ICs 81 have no chip addresses, the number of bits clocked through the SLI bus 113 must be properly correlated to the number of devices being driven. The number of devices being driven, and hence the number of bits clocked through the SLI bus 113, may be adjusted through software programming the data exchange in SPI bus interface 122, or by a hardware modification to interface IC 101. In this manner, the number of channels within system. 100 can be varied flexibly to match the size of the display. The number of bits shifted through the SI bus 113, i.e. broadcasted on the bus 113, depends on the SLI bus protocol employed and the total number of bits in the SLI bus shift registers 90A-90H. For example, the "fat" SLI bus protocol requires 72 to 88 bits per dual-channel LED driver, while the prefix multiplexed SLI bus is substantially smaller, e.g. a fixed 32 bits per LED driver IC, regardless of the number of channels integrated into each driver IC.

When using a hardware interface IC 101 to control SLI bus communication, modifying the registers in SLI bus circuit 123 to shift out fewer or more bits requires a modification in the manufacturing or design of interface IC 101. An alternative approach involves replacing interface IC 101 with a programmable interface IC using software to adjust the driver for accommodating fewer or more LED driver ICs in the daisy chain.

The current sense feedback (CSFB) signal delivered to SMPS 108 is generated by an analog daisy chain, with the CSFBI input pin on LED driver IC 81H tied via line 112I to Vcc, the CSFBO output pin of LED driver IC 112H connected via line 113H to the CSFBI input pin of LED driver 81G, and so on, with each driver IC comprising one CSFBI input pin and one CSFBO output pin. Lastly, line 112B connects the CSFBO) output pin of LED driver IC 811B to the CSFBI input pin of LED driver IC 81A, which in turn has its CSFBO output pin connected through line 112A to the CSFBI input pin of interface IC 101. The CSFB signal drops in voltage whenever it passes through a driver IC driving an LED string that has a higher forward-voltage drop Vf than the preceding strings.

As a daisy chain, there is no one common line having one specific voltage, but rather the CSFBI voltage cascades from the first to the last LED driver IC in the chain, the CSFB voltage on the last line 112A representing the LED string with the highest Vf in the entire LED array. An operational transconductance amplifier OTA 127 converts the final CSFB signal on line 112A into the current sense feedback (CSFB) signal at the ICSFB pin of interface IC 101, which via line 111 is delivered to SMPS 108. In response to the CSFB signal. SMPS 108 drives $+V_{LED}$ voltage on supply rail 109 to the optimum voltage for flicker free lighting without excess power dissipation.

In system 100, only a single value of CSFB signal 111 is generated by interface IC 101 and the CSFB daisy chain 112A-L 121 to drive SMPS 108. In systems where more than one $+V_{LED}$ supply voltage is required, e.g. larger higher current backlit displays, or displays with RGB backlighting, more than one interface IC 101 is required to power more than one SMPS. For example, by repeating the entire system 100 for LEDs of different colors, i.e. one system for red LEDs, one for blue LEDs, and a third for green LEDs, the present architecture can be extended to multiple SMPS solutions, albeit at a relative high cost. As such the three instantiations of interface IC 101 would collectively communicate to a common backlight μC and scalar IC via a shared SPI bus, but would otherwise operate independently. Unfortunately such an approach also triplicates the number of interconnecting wires, greatly complicating PCB design.

Figure 5:
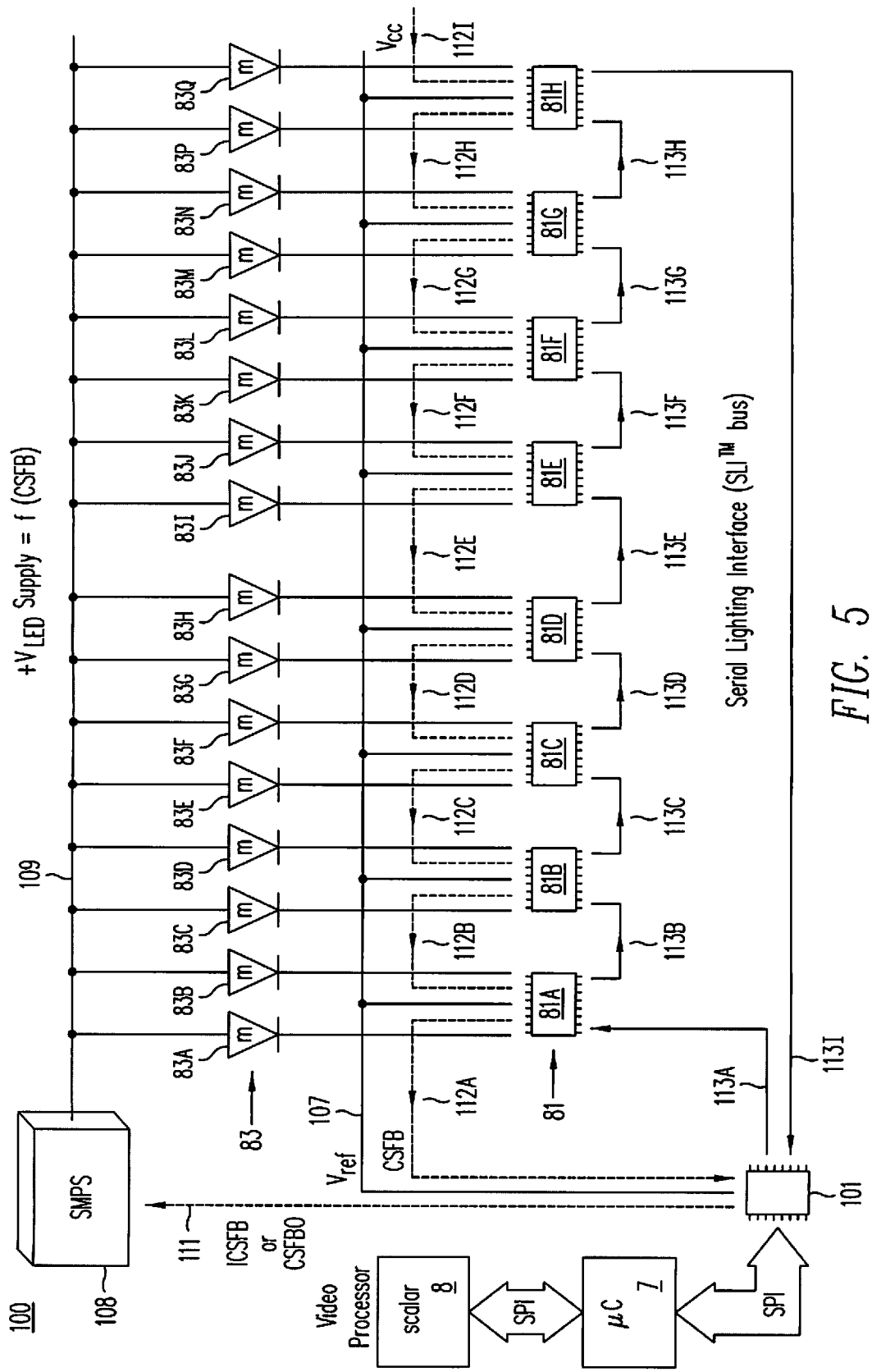
FIG. 5 is a simplified schematic diagram of the system shown in FIG. 4, illustrating the significantly reduced build-of-materials.

FIG. 5 is a simplified block diagram of system 100, illustrating the significantly reduced build-of-materials using intelligent LED drivers with SL serial bus control and eliminating high pin-count package interface IC. As shown, sixteen strings of LEDs 83A-83Q are driven by only eight small LED driver ICs 81A-81H, all controlled by interface IC 101- SLI bus lines 113A-113I in response to host μC 7 and scalar IC 8. Compared to FIG. 1 comprising 32 discrete MOSFETs and a 72-pin interface IC, the system cost is greatly reduced by the new architecture. With significantly fewer components the system reliability is also enhanced.

System 100 is also easy to deploy, since the SLI bus protocol is used only between interface IC 101 and the satellite LED drivers 81A-81H. Communication between the μC 7 and the interface IC 1.01 or the scalar IC 8 still use the more complex higher-overhead SPI bus to communicate. In some systems, the interface IC 101, microcontroller 7 and the intermediate SPI bus interface can be eliminated, and instead algorithmic control can be moved into the scalar IC 8 to facilitate a fully scalable system entirely under software control.

As shown, only two analog signals are present in system 100, a common Vref on one of lines 107, and the daisy-chained CSFB signal on lines 113A-113I, with either the analog feedback voltage CSFB or optionally the analog feedback current ICSFB signal controlling the $+V_{LED}$ output of SMPS 108. In cases where SMPS 108 requires an analog current rather than a voltage for its feedback input, interface IC 101 is required to convert the analog feedback voltage at its CSFBI pin into an analog feedback current ICSFB signal on line 111. An operational transconductance amplifier or OTA—a specialized precision analog circuit integrated within mixed signal interface IC 101, performs this function. With few analog signals and no discrete DMOSFETs with high impedance inputs, system 100 is relatively immune to noise.

Employing a single CSFB signal supplied via interface IC 101 derived from the CSFB signal on lines 112A-112I to control SMPS 108 in system 100, interface IC 101 is limited to operate in conjunction with a single SMPS 108. With only a single power supply and feedback signal, the maximum power of the backlight module is limited to the power handling capability of SMPS 108. At high power levels, it becomes desirable to "split" the power supply up into multiple supplies in order to maintain higher converter efficiency and cooler operation. In the configuration shown, it is not possible to provide multiple ICSFB signals without increasing the number of interface ICs 101 to equal the number of switch-mode power supplies used.

Moreover, limited to a single $+V_{LED}$ supply, the statistical range in voltage mismatch of the LED strings increases with the number of strings, leading to higher power dissipation in the LED driver ICs 81A-81H, higher delivered power required from SMPS 108, greater heating, and lower overall backlight system efficiency.

The single CSFB signal in system 100 also prevents its application in RGB backlight modules unless the entire system is triplicated, one system for driving strings of red LEDs, another for driving strings of green LEDs, and a third system for blue LEDs.

Even with single CSFB line 11 to SMPS 108, every, LED driver IC 81A-81H still must dedicate two of its sixteen pins to the analog CSFBI and CSFBO signals, reducing the number of package pins otherwise available for increasing the number of LED driver channels, for incorporating new features, or available to use for lowering the package's thermal resistance.

What is needed is a means by which to support multiple CSFB signals as needed and beneficially to eliminate the two pins dedicated to the CSFB function on every LED driver IC.

LED Backlighting, System with SLI Bus Embedded CSFB

To reiterate, system 100 shown in FIG. 5 illustrates that the current sense feedback signals on lines 112A-112I connect LED driver ICs 81 to interface IC 101 and ultimately through line 111 to SMPS 108. The function of current sense feedback, or CSFB, is to measure the voltage across every LED string 83 determine which string has the highest forward-voltage, and to control the +$V_{LED}$ output one supply rail 109 powering all the LED strings to insure that +$V_{LED}$ is sufficient for every string to operate at a specified and constant level of current.

One disadvantage of this approach is the analog CSFB signal requires two pins on every LED driver IC, which on a 16 pin package wastes one-eighth of the pins—pins that could be devoted to improving thermal resistance, adding functionality, or increasing the number of channels in the driver. Another disadvantage of using the analog CSFB signal is there is no convenient means to facilitate supporting several CSFB signals for RGB and multiple SMPS backlight systems.

Since the signal on the SLI bus 113 also interconnects the same LED driver ICs 81 to interface IC 101, the CSFB signal can be embedded digitally in the SLI bus signal, eliminating the need for the analog CSFB signals on lines 112A-112H. The benefits of doing this are disclosed herein.

Figure 6:
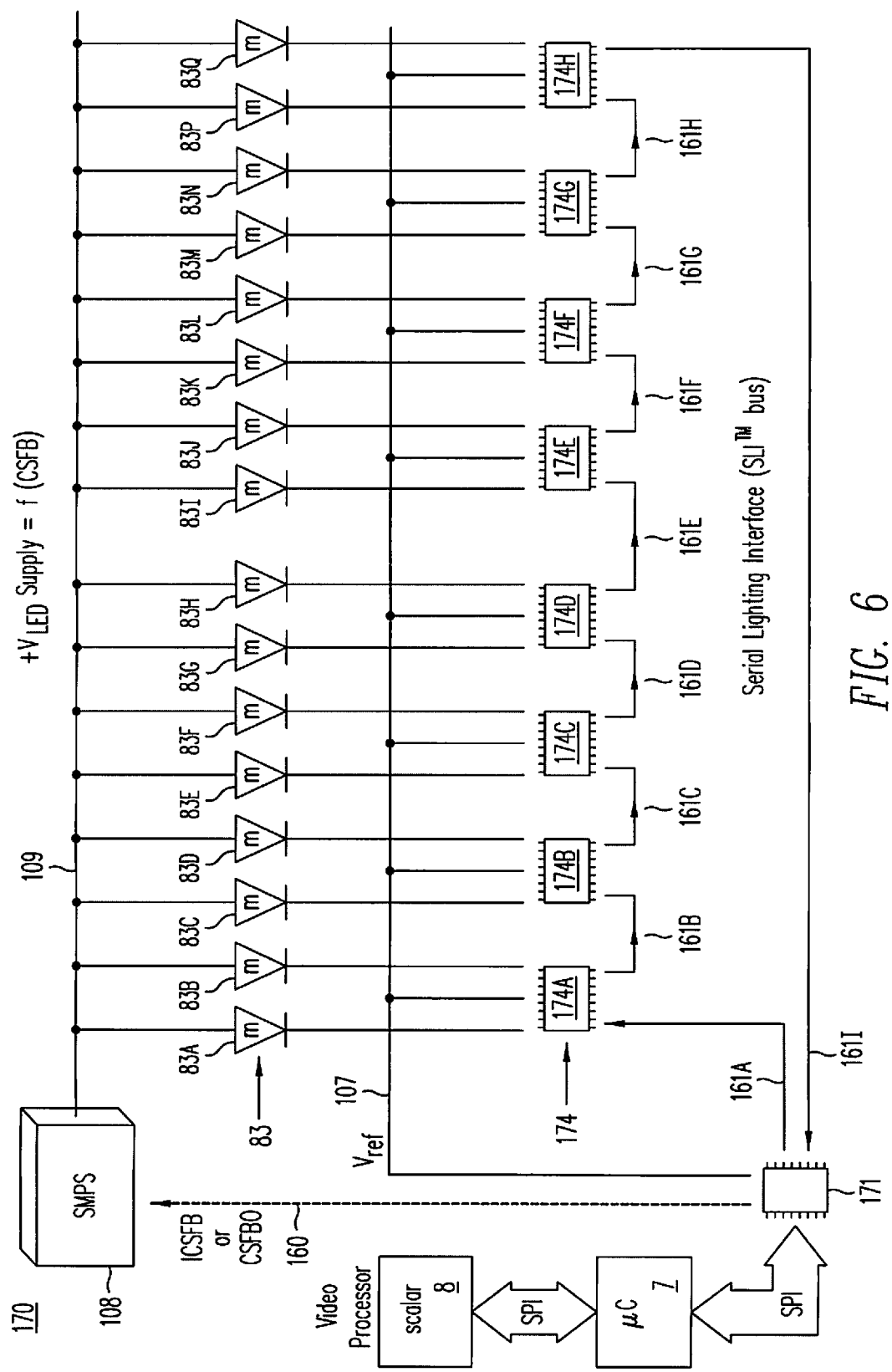
FIG. 6 is a schematic diagram illustrating SLI bus-based control of an intelligent backlighting system with embedded SLI bus control.

FIG. 6 illustrates LED backlight system 170 with embedded CSFB. Compared to system 100, described previously, the only components requiring change to embed the CSFB signal into the SLI bus are the LED driver ICs 174H-174H (sometimes referred to herein as driver ICs 174) and the interface IC 171. As such, LED driver ICs 174 include an analog-to-digital converter to convert the voltage feedback into a digital equivalent and to embed the information within the SLI bus data stream 161. This embedded CSFB signal within the digital SLI bus protocol is subsequently converted back into an analog signal by a DAC or digital-to-analog converter contained within interface IC 171. As such, the CSFB function embedded within the SLI bus protocol and interface beneficially eliminates the need for analog CSFB signals and dedicated package pins.

As described, the embedded CSFB function is implemented to control a single SMPS and +$V_{LED}$ supply rail. The inventive embedded CSFB method can readily be modified to control multiple power supplies for higher power backlight systems or for RGB backlighting applications. This alternative embodiment of the invention is described later in this application.

It should also be noted that in other embodiments of this invention, interface IC 171 may be eliminated and its functionality redistributed into other components within the system. For example, the digital functions of dimming, phase control, dot correction, and fault management can be performed within μC 7 or within scalar IC 8 while the analog Vref may be generated within SMPS 108, added into μC 7, or provided by a small discrete IC. Likewise the conversion of the digital representation of the CSFB signal on the SLI bus 161 to an analog CSFB feedback signal on line 160 can be integrated into SMPS 108, added into μC 7 or provided by a small discrete IC, possibly also integrating an operational transconductance amplifier and Vref within the same small IC, e.g. within an 8-pin package.

To embed the CSFB signal into the SLI bus 161, different SLI bus protocols may be employed. One such protocol, the so-called "fat" SLI bus protocol and hardware involves a relatively long digital word containing all of the parametric information for every channel and every function in every SLI bus transmission. A second protocol, herein referred to as a "prefix-multiplexed" SLI bus reduces the size of the SL bus command to a fixed length, e.g. 32 bits, and facilitates updating only those parameters that change without the need to rebroadcast all the parametric data for every channel and function each time a specific update is required. The two SLI bus protocols and the implementation of SLI bus embedded CSFB functionality in each version is described in the following section.

Implementing Embedded CSFB into Fat SLI Bus Protocol & Interface

Figure 7A:
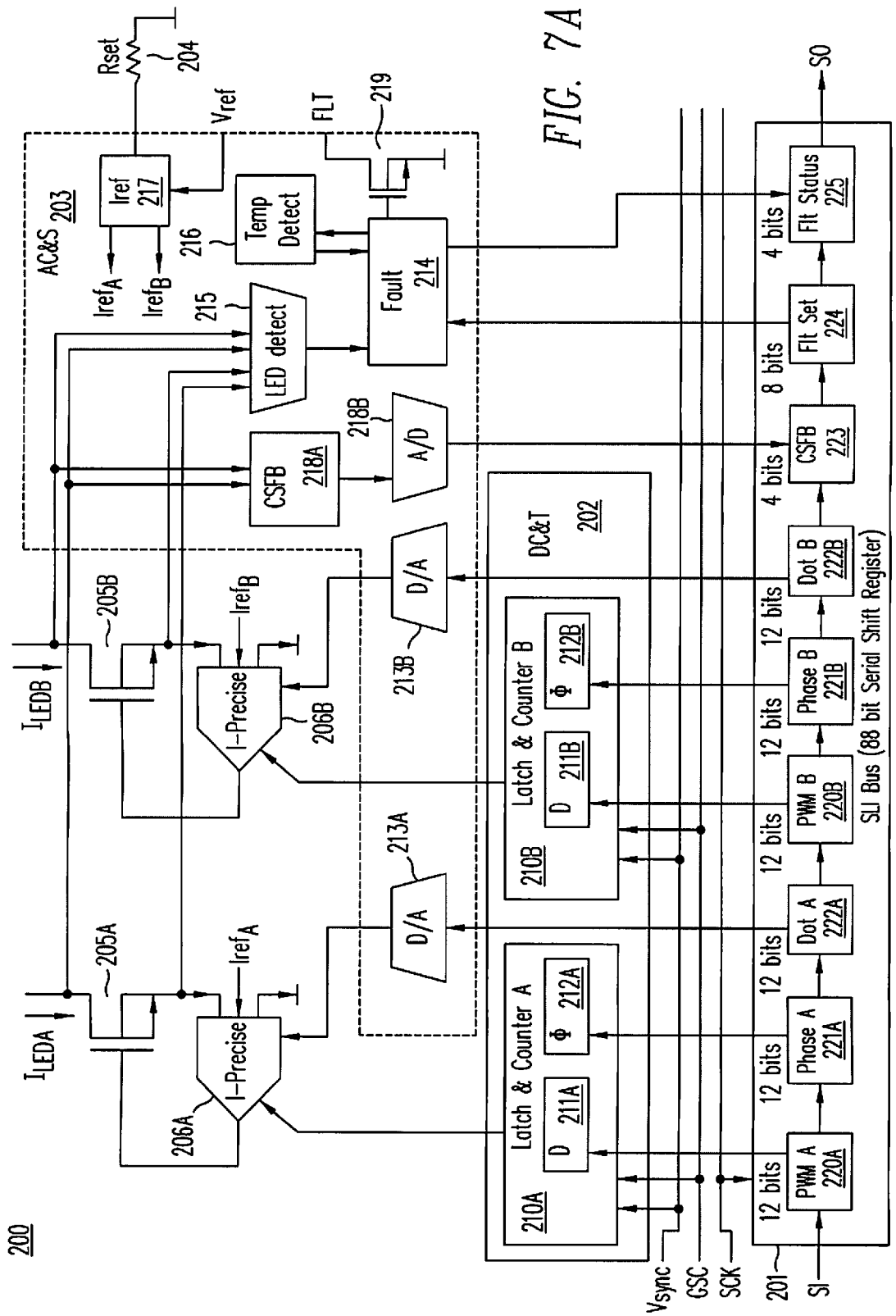
FIG. 7A is a block diagram of a dual-channel LED driver with corresponding digital control and timing (DC&T) and analog control and sensing (AC&S) circuitry with embedded CSFB feedback and using a fat SLI bus interface and protocol.

One implementation of an LED driver with an SLI bus-embedded CSFB function is shown in FIG. 7A. Included in an LED driver IC 200 are an SLI bus shift register 201, containing shift registers 220A, 221A, 222A, 220B, 221B, 222B, 223, 224 and 225, a digital control and timing (DC&T) circuit 202 and an analog control and sensing (AC&S) circuit 203. The example shown is a dual-channel driver, but other number of channels may be implemented in a similar fashion.

LED driver IC 200 is mixed signal, combining both digital and analog signals, including digital SLI shift register 201 connected to a digital DC&T circuit 202 by several parallel data busses, typically 12 bits wide, and also connected to an analog AC&S circuit 203 by a variety a parallel data busses ranging from 4 bits to 12 bits wide.

The outputs of DC&T circuit 202, digitally toggle I-Precise gate driver circuits 206A and 206B and current sink DMOSFETs 205A and 205B on and off with precise timing synchronized by the Vsync and GSK grey scale clock signals. The current sink MOSFETs 205A and 205B control the currents $I_{LEDA}$ and $I_{LEDB}$ in two strings of LEDs, not shown, in response to analog signals from AC&S circuit 203 which in turn control the gate drive signals output by I-Precise gate driver circuits 206A and 206B. The gate drive signals are analog, using an amplifier with feedback to insure the conducting current in each of current sink MOSFETs 205A and 205 is a fixed multiple of reference current Iref, also supplied by AC&T circuit 203.

While LED driver IC system 200 includes only current sink MOSFETs 205A and 205B, the circuit is compatible with either the cascode clamped LED driver output as shown in FIG. 3A or the high voltage current sink version as exemplified in FIG. 3B and FIG. 3C. To implement the cascode clamped version, two high-voltage N-channel DMOSFETs are connected in series with current sink DMOSFETs 205A and 205B, with their source terminals tied to the drain terminals of the current sink DMOSFETs, and with their drains tied to the anode of the respective LED strings being driven.

Both the drain voltage and the source voltage of current sink DMOSFETs 205A and 205B are used to monitor the status of the LED strings by LED detect circuit 215, specifically the source voltages are used to detect open LED strings while the drain voltages are used to detect shorted LEDs. The fault set latch 224 may be used to program the voltage levels used to detect a shorted LED.

The drain voltages of current sink DMOSFETs 205A and 205B are also used by a CSFB circuit 218A to determine the channel with the highest LED voltage drop, i.e. the DMOSFET with the lowest drain voltage. CSFB circuit 218A outputs to an analog-to-digital (A/D) converter 21 SB a voltage equal to the lower of the drain voltages of current sink DMOSFETs 205A and 205B, and A/D converter 218B converts this lower drain voltage into its equivalent digital value, storing it in a CSFB shift register 223 in SLI bus shift register 201. While the CSFB voltage can be continuously updated, this is normally unnecessary to control the relatively low bandwidth SMPS powering the LED strings. One sample per Vsync pulse in many cases may suffice.

In operation, data is clocked into SI shift register 201 through the serial input pin SI at a clock rate SCK. This includes shifting data into 12 bit data registers 220A and 220B for PWM on-time data for channel A and channel B, 12 bit data registers 221A and 221B for phase delay data for channel A and channel B, 1.2 bit data registers 222A and 222B for "dot" current data for channel A and channel B, along with 12 bits for Fault information comprising 8 bit register 224 for Flt settings and 4 bit register 225 for Flt status. In addition, for drivers with embedded CSFB, SLI bus shift register 201 also includes a 4-bit register 223 containing a word output by A/D converter 218A that represents the CSFB voltage output of LED driver IC 200. Data within these registers are clocked out of the SO pin as new data is clocked in. Suspending the SCK signal holds data statically within the shift registers. The terms "channel A" and "channel B" are arbitrary and are only used to identify the outputs and their corresponding data in the SLI data stream.

Upon receiving a Vsync pulse, data from PWM A register 220A is loaded into D latch 211A and data from Phase A register 221A is loaded into φ latch 212A of Latch & Counter A circuit 210A. At the same time, data from PWM B register 220B is loaded into D latch 211B and data from Phase B register 221B is loaded into φ latch 212B of Latch & Counter B circuit 210B. Upon receiving subsequent clock signals on GSC grey scale clock, both counters count the number of pulses in their φ latches 212A and 212B and thereafter enable current flow in I-Precise gate driver circuits 206A and 206B, respectively, illuminating the LED string connected to that specific channel. The channels remain enabled and conducting for the duration of the number of pulses stored in D latches 220A and 220B. Thereafter, the outputs are toggled off and wait for the next Vsync pulse to repeat the process. DC&T circuit 202 therefore synthesizes two PWM pulses in accordance with the SLI bus data.

Also synchronized to the Vsync pulse, the data stored in Dot A and Dot B latches 222A and 22B is copied into D/A converters 213A and 213B, setting the current in DMOSFETs 205A and 205B. As shown, the D/A converters 213A and 213B are discrete circuits providing a precise fraction of Iref to set the currents in the LED strings. Alternatively, in a preferred embodiment, I-Precise gate driver circuits 213A and 213B incorporate an adjustable current mirror using binary weighting and are able to set the fraction of the maximum current desired. The reference current Iref, that represents the maximum channel current, is set by Rset resistor 204 and the Vref input in bias circuit 217.

Fault detection includes an LED detect circuit 215 compares the source and drain voltages of current sink MOSFETs 205A and 205B against the values stored in Fault latch 214, which are copied from Flt Set register 224 at each Vsync pulse. Temperature detect circuit 216 monitors the temperature of the LED driver IC. Any fault immediately triggers open drain MOSFET 219 to turn on and pull the FLT line low, generating an interrupt. The fault information is also written from Fault latch 214 into Flt Status register 225 on the following Vsync pulse.

For LED drivers with embedded CSFB, the digital data representing the CSFB value for LED driver IC 200 is copied from the output of A/D converter 218B to CSFB register 223 in SLI bus shift register 201, synchronized to the Vsync pulse. While it is possible to refresh the CSFB data more often than once per Vsync pulse, using the fat SLI bus protocol there is no specific convenient timing pulse to instruct the data to be copied from A/D converter 218B into CSFB register 223. Without an additional dedicated control pin, the CSFB write operation must be performed using a timer, but since the GSC and SCK clock signals may start and stop in normal operation there is no simple way to execute oversampling of the CSFB value.

Implementation of the dot function and digital-to-analog conversion is further detailed in the above-referenced application Ser. No. 13/346,625, to Williams et al., entitled "Low Cost LED Driver with Integral Dimming Capability". That application also includes detailed circuit implementation examples of fault and LED detect circuits 214 and 215, reference current source 217, and current sense feedback (CSFB) circuit 218. Accordingly, the details of those components are not repeated here.

In the manner described, a serial data bus is used to control the magnitude, timing, and duration of the currents in a number of LED strings, as well as to control the detection of and report the occurrence of fault conditions in the LED strings, and control the $+V_{LED}$ supply voltage using embedded CSFB information. The SLI protocol is flexible, requiring only that the data sent through the serial bus match, the hardware being controlled, specifically that the number of bits sent to each LED driver IC matches the bits required by that LED driver IC (normally each LED driver IC in a given LED drive system requires the same number of bits), and that the total number of bits sent during each Vsync period equals the number of bits required by each LED driver IC times the number of LED driver ICs.

For example, in FIG. 7A the fat SLI bus protocol including dot correction, fault setting and fault reporting, and one channel of CSFB information comprises 88 bits per dual-channel driver IC, i.e. 44 bits per channel or LED string. If eight dual-channel driver ICs controlling 16 strings of LEDs are connected by a single SLI bus loop, the total number of bits shifted out of the interface IC and through the SLI bus during each Vsync period is equal to 8 times 88, or 704 bits, less than a kilo-bit. If the SLI bus is clocked at 10 MHz, the entire data stream can be clocked through every driver IC and to every channel within 70.4 microseconds or 4.4 microseconds per channel.

While the serial data bus communicates at "electronic" data rates, i.e. using MHz clocks and Mbits-per-second data rates, the Vsync, or "frame," rate used to control changing the image on the LCD display panel occurs at a much slower pace because the human eye cannot perceive changing images at anywhere near electronic data rates. While most people are unaware of flicker at 60 Hz frame rates, i.e. sixty image frames per second, in A versus B comparisons, to many people 120 Hz TVs images appear more "clear" than 60 Hz TVs, but only using direct comparisons. At even higher Vsync rates, e.g. 240 Hz and up, only "garners" and video display "experts" claim to see any improvement, mostly manifest as reduced motion blur. It is this large differential between electronic data rates and the relatively slow video frame rate that makes serial bus communication to the backlight drivers possible.

For example, at 60 Hz, the each Vsync period consumes 16.7 milliseconds, orders-of-magnitude longer than the time needed to send all the data to all the driver-ICs. Even in the most advanced TVs running with an 8× scan rate and in 3D mode at 960 Hz, each Vsync period consumes 0.04 milliseconds, meaning up to 236 channels can be controlled in real time. This number of channels greatly exceeds the LED driver system requirements for even the largest HDTVs.

The 88-bit per dual-channel "fat" protocol shown in shift register 201 of FIG. 7A enables the interface IC to write or read all the data in every register of every channel once during every Vsync period. The term "fat" refers to the content of the digital word used to control each channel. The fat protocol requires that data for every variable and register in a given LED driver IC be included in each packet of data transmitted from the interface IC to a that LED driver IC, even if nothing changed from the prior data packet for that LED driver IC.

If a reduced data protocol is used, i.e. a protocol requiring fewer bits per channel, sending data to every channel takes even less time. Since the fat protocol has no timing limitations because of the relatively slow Vsync refresh rate, there is no data rate benefit. Using fewer bits in the serial communication protocol does however reduce the size of the digital shift registers and data latches in the LED driver ICs, reducing the area of the LED driver IC and lowering the overall system cost.

For example, an alternative dual-channel data protocol for the SLI bus with embedded CSFB using 64 bits rather than the 88-bit data set shown for LED driver IC 200 in FIG. 7A is also possible. Such a data set could comprise 12 bits for PWM brightness duty factor, 12 bits for phase delay, 8 bits for fault setting, and 4 bits for fault status, and 4 bits for one channel of CSFB data, thereby excluding the 12-bit Dot correction data. As such, individual channel current setting and brightness calibration of each LED string is not available in this implementation.

In LCD panel manufacturing, many manufacturers believe electronically calibrating a display for uniform brightness is too expensive and is therefore not commercially practical. Global display brightness can still be calibrated by adjusting the value of a panel's current set resistors, such as set resistor 204 shown in LED driver IC 200, but backlight uniformity in backlight brightness cannot be controlled through the microcontroller or interface IC. Instead, panel manufacturers manually "sort" their LED supply into bins of LEDs having similar brightness and color temperature.

It should be noted that removing Dot data from the SLI bus protocol does not prevent overall display brightness control or calibration. Adjusting the system's global reference voltage Vref can still perform global dimming and global current control. For example, in LED driver IC 200, adjusting the value of Vref affects the reference current Iref produced by Iref generator 217. If the Vref voltage is shared by all the LED driver ICs, adjusting this voltage will uniformly affect every driver IC and the panel's overall brightness independent of the PWM dimming control.

Embedding CSFB functionality into the SLI bus is not limited to the fat SLI bus protocol. To the contrary, greater flexibility and higher CSFB feedback sample rates are more conveniently implemented using the prefix multiplexed SLI bus protocol and interface.

As such, the limitations and disadvantages of sending long digital words or instructions over a serial bus can be circumvented through the use of a "register address" or "prefix" added into the serial lighting interface bus protocol and embedded in every SLI bus communication. When combined with circuitry to decode and multiplex the SLI bus data, the embedded prefix information enables data to be routed only to specific targeted functional latches.

Implementing Embedded CSFB in Prefix Multiplexed SLI Bus Protocol and Interface

By sending data specifically only to latches requiring updates, the "prefix multiplexed" or "slim" SLI bus architecture avoids the need for repeatedly and unnecessarily resending digital data, especially resending redundant data that remains constant or changes infrequently. In operation, after an initial setup, only latches that are changing are rewritten.

Figure 7B:
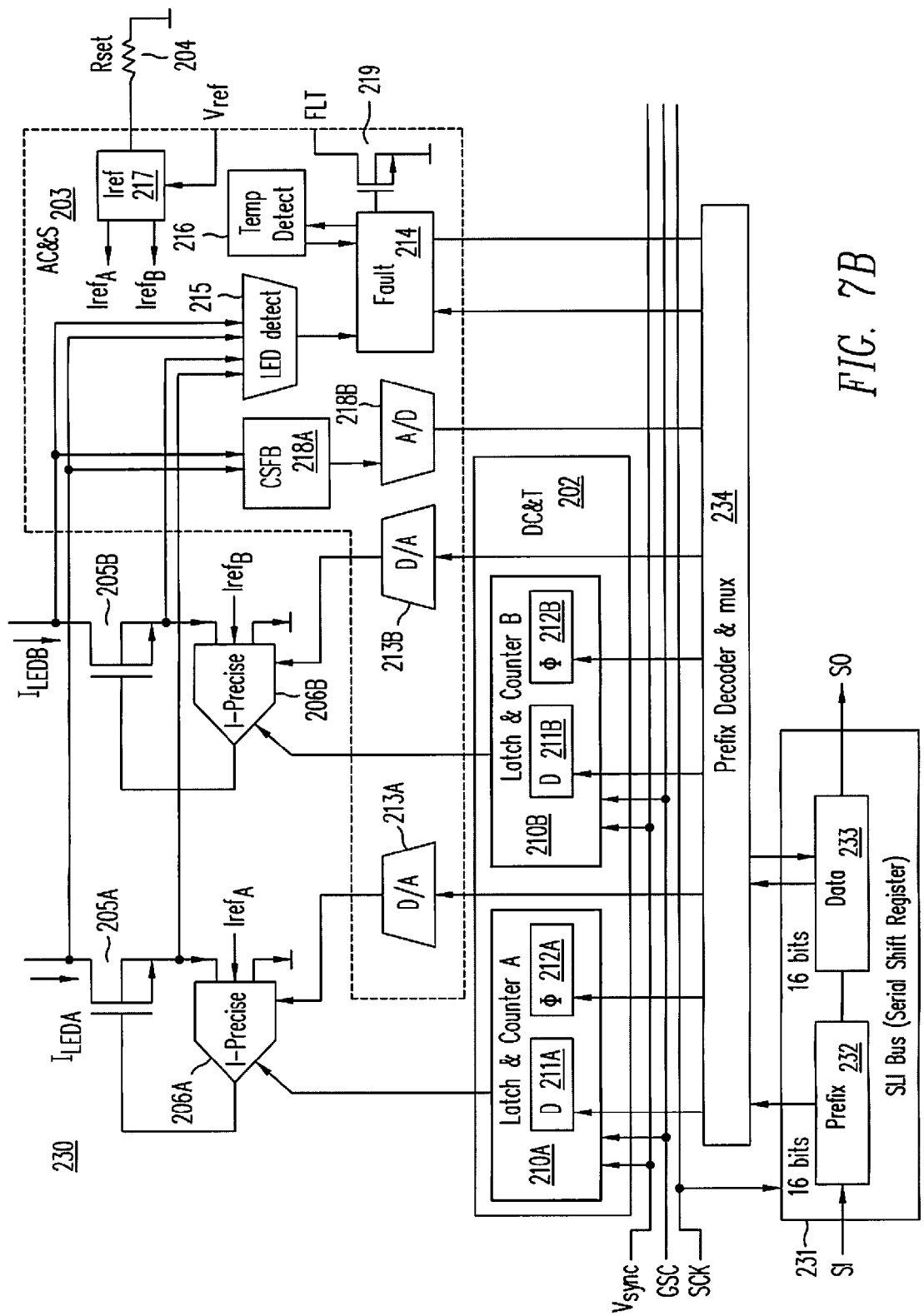
FIG. 7B is a block diagram of a dual-channel LED driver with corresponding digital control and timing (DC&T) and analog control and sensing (AC&S) circuitry with embedded CSFB feedback and using a prefix multiplexed SLI bus.

Registers containing fixed data are written, only once when the system is first initialized, and thereafter do not require subsequent communication through the SLI bus from the interface IC. Because only the latches that are changing are updated, the amount of data sent across the SLI bus is greatly reduced. This inventive method offers several distinct advantages over the fat SLI bus method, namely:

- the number of bits required to integrate a SLI bus shift register is greatly reduced, saving die area and lowering cost, especially in smaller (e.g. two channel) LED driver ICs
- the effective bandwidth of the SLI bus at any given clock rate is increased because redundant data is not being repeatedly sent
- the SLI bus protocol can be standardized with fixed word lengths and functions without losing versatility An example of a prefix-multiplexed SLI bus is shown in the embodiment of LED driver IC 230 shown in the schematic circuit diagram of FIG. 7B. In addition to the alternative LED driver IC 230, FIG. 7B also shows an SLI bus shift register 231 containing a 16-bit prefix register 232 and a 16-bit data register 233, and a prefix decoder and multiplexer (mux) circuit 234. The data in data register 231 is routed to D latches 211A and 211B and φ latches 212A and 212B in Latch & Counter A 210A and Latch & Counter B 210B, respectively, to one of D/A converters 213A and 213B in digital control and timing (DC&T) circuit 202, or to a fault latch circuit 214 in analog control and sensing (AC&S) circuit 203. These data transfers are made through prefix decoder and multiplexer circuit 234 according to routing directions contained in prefix register 232. Thus prefix decoder & multiplexer circuit 234 decodes the 16-bit word stored in prefix register 232 and multiplexes the 16-bit data 223 stored in data register 233 into the appropriate D, φ, or Dot latch DC&T circuit 202 or AC&S circuit 203.

In the case of fault latch circuit 214, multiplexer 234 operates bidirectionally, allowing the data stored in data register 233 to be written into fault latch circuit 214 or, conversely, allowing the data stored in fault latch circuit 214 to be written into data register 223. Similarly, depending on the prefix code stored in prefix register 232, the CSFB data contained within A/D converter 218B is directed by multiplexer 234 to be written into data register 233.

While in the case of the fat SLI bus protocol, data is copied between the functional latches and the SLI bus registers in synchronism with the Vsync pulse, in the prefix-multiplexed SLI bus, some functions need not be synchronized to the Vsync pulse, especially in the case of reading back fault information from fault latch 214 and CSFB data from A/D converter 218B. Instead, the data can be "pulled" from the LED driver IC into the SLI bus and examined by the interface IC as needed, even at a data rate higher than once per Vsync pulse.

In a preferred embodiment the prefix multiplexed SLI bus protocol comprises a 32-bit word, i.e. 4 bytes in length, offering a well-balanced compromise between the flexibility of addressing a large number of functional latches and maintaining a short word length and small SLI bus shift register size. In the example shown, SLI bus prefix register 232 is 16-bits in length and SLI bus data register 233 is also 16-bits in length, facilitating a variable with up to 65,536 combinations to be uniquely written or read from one of 65,536 different functional latches.

At 32-bits, the prefix multiplexed SLI bus protocol is designed for flexibility and expandability. Despite facilitating a large number of combinations, not all of the data stored in the SLI bus registers need be used. If fewer latches and channels are needed only a few bits of the prefix need be decoded to address the requisite number of functional latches. Likewise, if less than 16 bits of precision is demanded, a smaller number of bits may be used in the data register in the SLI bus and multiplexed to the target functional latch. For example, if the data contained in SLI bus data register 233 represents the PWM brightness duty factor, 12 bits of data may be multiplexed and loaded into D latch 211A while if the data contained in SLI bus data register 233 represents the LED current "Dot" setting, only 8-bits may be required by Dot latch within D/A converter 213A. The CSFB data read from A/D converter and latch 218B and written into SLI bus data register 233 may constitute only a 4-bit word.

So in the prefix-multiplexed SLI bus, data is repeatedly written by the interface IC into the SLI bus shift register 231 and then multiplexed into one of several functional latches 211-214 one word at a time, in sequential fashion. Likewise data is copied from latches 214 and 218B whenever requested by the interface IC, and shifted through the shift registers in the daisy chain and back to the interface IC in sequential fashion. In the LED driver IC 200 shown in FIG. 7B, one SLI bus data register 233 fans out into seven different functional latches and reads data back from two functional latches.

The prefix multiplexed SLI bus 230 is in sharp contrast to the fat SLI bus shown in FIG. 7A, wherein each register in SLI bus shift register 201 has a one-to-one correspondence to a functional latch in the LED driver IC, e.g. SLI bus PWM A register 220A corresponds to D latch 211A, SLI bus Phase A register 221A corresponds to φ latch 212A, and so on. This on-to-one correspondence makes scaling the fat SLI bus architecture to LED driver ICs having more channels problematic and costly.

The fan out capability of the prefix-multiplexed SLI bus therefore offers a more versatile lower cost approach to implement a multichannel LED drive than the fat SLI bus protocol. For this and other reasons to be considered later in this disclosure, the inventive prefix-multiplexed SLI bus represents an improved serial lighting interface bus protocol, architecture, and physical interface.

Prefix decoder and multiplexer 234 can be realized in a variety of ways, as described in the above-referenced application Ser. No. 13/346,647, to Williams et al., entitled "Low Cost LED Driver with Improved Serial Bus". One implementation is shown in the block diagram FIG. 8, wherein the 16-bit prefix register in SLI bus shift register 231 is subdivided into two 8-bit registers, a channel register 232C and a function register 232F. The data register 233 remains unchanged. As shown, prefix decoder 251 has two output lines comprising a channel select output line 254 to select which LED channel 255 is being controlled, and a function select output line 252 to control which functional latch is being interrogated, i.e. the functional latch being written to or read from.

In the example shown, prefix decoder 251 selects one of the many channels 255 with a channel select signal on line 254, then chooses the function to be controlled with function select signal on line 252. To change operation of a function 256, multiplexer 253 then writes data from data register 233 into a preload latch 258. The data is preserved in preload latch 258 until, a Vsync pulse occurs, at which time the data is copied from preload latch 258 into an active latch 257, thereby changing the operating conditions of analog or digital function 258, e.g. D, φ, Dot, etc. The data in active latch 257 remains unchanged till the next Vsync pulse occurs.

Control function 259 may be changed in a similar fashion by writing data into preload latch 261, copying the data into active latch 260 synchronized to the Vsync pulse, and thereby changing the operating conditions of the selected channel. Alternatively, data in latch 260 may be written from control function 259 and loaded, i.e. sampled, into preload latch 261 at regular intervals. The data contained in preload latch 261 is then copied into the data register 233 of SLI bus shift register 231 with decoder 251 selecting the corresponding channel and function.

In this manner any number of channels within a LED driver IC, i.e. any number of LED strings, can be controlled independently in real time facilitating precise adjustment of each control function 256, 259 and others through a shared SLI bus shift register 231 without the need for a large shift register or long digital words.

As shown in FIG. 8, the same SLI bus shift register 231 and prefix-multiplexed SLI bus protocol can be employed to embed the CSFB function. The CSFB signal 262, the digital output of an A/D converter is sampled at regular intervals and written into sample latch 263. In some embodiments the A/D converter and sample latch are part of the same unit, as with the A/D converter 218B shown in FIG. 7B. In this manner the most current value of the CSFB for a given channel and LED driver IC is ever-present in sample latch 263. The data contained in sample latch 263 is then copied into the data register 233 of SI bus shift register 231 whenever decoder 251 selects the corresponding channel and selects the CSFB function. Like any other function, the CSFB data is selected by the appropriate and corresponding prefix code. The prefix codes in Table 1 are included as an example for decoding:

TABLE 1

| Channel Select Decode | | |
|---|---|---|
| Hex | Bits Decoded | Channel Selected |
| 00 | xxxx xx00 | Channel A |
| 01 | xxxx xx01 | Channel B |
| 02 | xxxx xx10 | Channel C |
| 03 | xxxx xx11 | Channel D |

| Function Select Decode | | |
|---|---|---|
| Hex | Bits Decoded | Function Selected |
| 00 | xxxx xx00 | PWM Brightness (D) |
| 01 | xxxx xx01 | Phase Delay (Φ) |
| 02 | xxxx xx10 | Dot Correction |
| 03 | xxxx xx11 | Fault Status & Reporting |
| 04 | xxxx x100 | Fault Set |
| 05 | xxxx x101 | Fault Clear |
| 06 | xxxx x110 | PWM Invert |
| 0E | xxxx 1110 | Load CSFB into SLI Bus |
| 0F | xxxx 1111 | Execute CSFB |

After the data is written into the SLI bus shift register 231, the data must be shifted into the interface IC by the corresponding number of SCK pulses. The number of SCK pulses required to shift the data entirely through the SLI bus is equal to the number of bits in each SLI bus shift register times the number of SLI bus shift registers in the SLI bus. Assuming the fixed-length, 32 bit protocol shown in FIG. 8 and one SLI bus shift register per LED driver IC, then the total number of SCK pulses required to shift data from the driver IC farthest from the interface IC in the daisy chain into to the CSFBI input of the interface IC is equal to 32 times the number of LED driver ICs.

During the shifting, the prefix code is selected to prevent overwriting of the data in the SLI bus shift register 233. In a preferred embodiment this protection can be accomplished by using a dedicated prefix function code 251, e.g. hexadecimal 0E, for loading the SLI bus data registers 233 from their corresponding CSFB sample latches 263. On the subsequent broadcast, as the data from the sample latches 263 is shifted through the SLI bus daisy chain and into the interface IC to update the feedback signal controlling the SMPS, a different prefix code, e.g. hexadecimal 0F, is used to prevent any reading or writing into or from the SLI bus shift register 233 (this step is referred to as "Execute CSFB" in Table 1 above).

Figure 9:
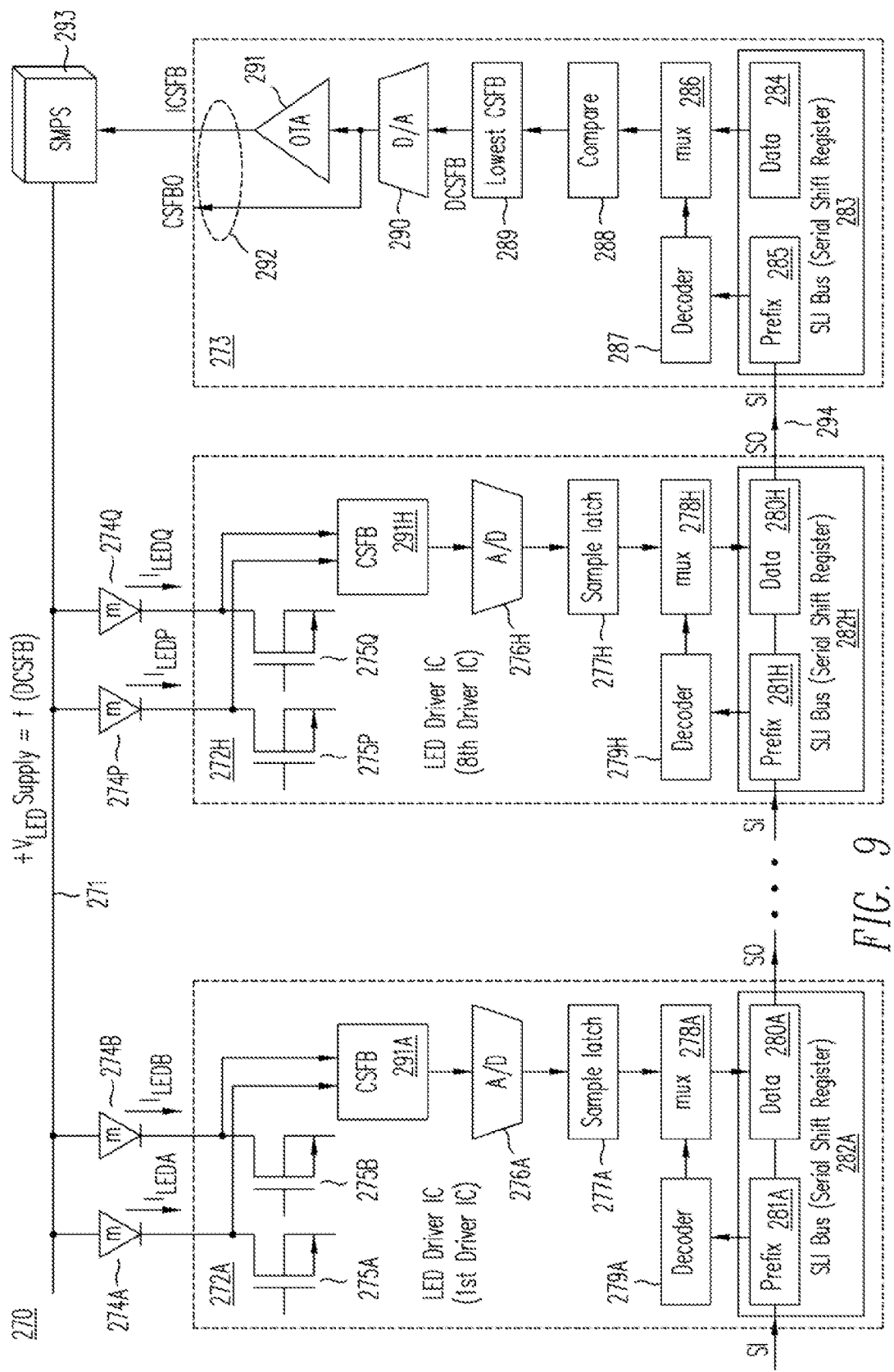
FIG. 9 is a simplified diagram illustrating the communication pathway of an SLI bus-embedded CSFB signal from an LED driver IC to an interface IC.

Embedding CSFB functionality within the SLI bus is further explained by the schematic block diagram of the LED drive system 270 shown in FIG. 9. Shown are LED driver ICs 272A and 272H, an interface IC 273, LED strings 274A, 274B, 274P and 274Q, and a switch mode power supply (SMPS) 293. Relating to embedded CSFB operation, LED driver IC 272A contains current sink MOSFETs 275A and 275B driving LED strings 274A and 274B, respectively, a CSFB circuit 291A, an analog to digital (A/D) converter 275A, a sample latch 277A, along with SLI bus communication using an SLI bus shift register 282A comprising a prefix register 281A and a data register 280A, a decoder 279A and its associated multiplexer 278A. Other functions within LED driver IC 272A such as PWM dimming control, dot correction, and fault detection are excluded for clarity's sake.

Similarly, LED driver IC 272H contains current sink MOSFETs 275P and 275Q driving LED strings 274P and 274Q, respectively, a CSFB circuit 291H, an A/D converter 275H, a sample latch 277H, along with SLI bus communication using SLI bus shift register 282H comprising a prefix register 281H and a data register 280H, a decoder 279H and its associated multiplexer 278H. Other LED driver ICs 272B-272G, not shown, are of identical construction. Interface IC 273 connects digitally to LED driver ICs 272A-272H through SLI bus 294, wired in daisy chain fashion with each SLI bus output SO wired to the SLI bus input SI of the next IC in the daisy chain. The last LED driver IC 272H in the chain has its SO output connected to the SLI input of interface IC 273. The first LED driver IC in the chain 272A has its input connected to the SO output of the interface IC 273 (the output portion of interface IC 273 is not shown) or alternatively, any other source of SLI bus data used to control the LED driver ICs.

Interface IC 273 comprises SLI bus shift register 283 comprising a prefix register 285 and a data register 284, a decoder 287 and its associated multiplexer 286, a digital magnitude comparator 288, a register 289 for storing a digital DCSFB signal, which is the current lowest CSFB sample obtained from LED driver ICs 272A-272H, a digital-to-analog (D/A) converter 290, and an operational transconductance amplifier 291, connected in the LED drive system 270 shown in FIG. 9 to the feedback input of SMPS 293, using an ICSFB signal. Interface IC 273 is capable of providing two analog outputs: the current feedback signal ICSFB output by OTA 291, or alternatively a voltage feedback signal CSFBO output by D/A converter 290 used to connect to SMPS modules requiring a voltage rather than a current feedback signal.

Both the ICSFB signal and the CSFBO signal represent the analog equivalent of the digital current sense feedback signal DCSFB. This digital DCSFB signal, sampled at regular intervals, represents the lowest current sense (drain) voltage on current sink MOSFETs 275A-275Q, and it is used to detect the LED string 274A-274Q with the highest forward-voltage drop. The CSFB signal (whether in the form of ICSFB or CSFBO) in turn controls the voltage $+V_{LED}$ of SMPS 293 on the supply line 271 to produce a voltage $+V_{LED}$ sufficient to power all the LED strings 274 including whichever one has the highest forward-voltage drop.

In operation, the interface IC 273 clocks a prefix command into prefix register 281 via the SLI bus daisy chain to each of the eight LED driver ICs 272A-272H, instructing each driver IC's multiplexer 278 to copy the current sample contents of sample latch 277 into the data register 280 of its SLI bus shift register 282. As an example, in driver IC 272A a prefix command in prefix register 281A, interpreted by decoder 279A instructs multiplexer 278A to copy the current sample contents of sample latch 277A into the data register 280A of SLI bus shift register 282A. The same process and procedure occurs in the other LED driver ICs.

Prior to or contemporaneous with data transfer from sample latch 277A into SLI bus data register 280A, CSFB circuit 291A measures the drain voltages on current sink MOSFETs 275A and 275B, determines which MOSFET has the lower drain voltage, and delivers that lower drain voltage to A/D converter 276A, which converts the voltage into its digital equivalent. The result is temporarily stored in sample latch 277A. The CSFB voltage may be sampled at the time the data is requested through the prefix code in prefix register 281A, or it may be sampled at regular intervals more frequently than the SLI bus communications. As a result, the data contained within sample latch 277A represents the most current information regarding the lowest current sink voltage of the two channels integrated within LED driver IC 272A.

Voltage sampling should occur at least once per Vsync period and may occur at a higher rate. Preferably, it should occur two to three times per Vsync period to improve the accuracy and transient response of SMPS 293. Sampling above three times per Vsync period offers diminishing returns, and excessive sampling, e.g. ten times the Vsync period, occupies the interface IC performing unnecessary tasks. Once the CSFB data provided by A/D converters 277A-277H of LED-drivers 272A-272I has been loaded into their corresponding SLI bus data registers 280A-280H, the CSFB data must be clocked out of the data registers and into interface IC 273. The number of SCK pulses required to complete this is equal to the number of LED driver ICs 272 in the daisy chain times the number of bits per SLI bus shift register 282 in the protocol, in this case 32 bits times 8 driver ICs, or 256 clock pulses.

During or after the shifting of the driver IC CSFB data into SLI bus 283 within interface IC 273, interface IC 273 performs the task of determining which CSFB value is lowest and then uses that data to deliver a CSFBO or ICSFB signal to the SMPS 293, which in turn uses that signal to set the voltage $+V_{LED}$ on the supply rail 271. While the data can be stored and analyzed at the conclusion of the SLI bus shift register data transfer, it may also be performed in real time. In one embodiment of this invention, each CSFB value shifted into the SLI bus data register 284 of interface IC 273 is compared to the previous value by magnitude comparator 288 and overwritten into register 289 only when it represents a lower voltage than the data before it. After all the CSFB data from all the driver ICs has been compared within one SLI broadcast cycle, the digital data DCSFB within register 289 represents the lowest CSFB value in the system 270.

In another aspect of this invention, a dedicated prefix code in prefix register 285, e.g. hexadecimal code "OF" (binary "00001111") can be used during the SLI bus shifting operation to prevent overwriting of the CSFB data by LED driver ICs 272 while the data is shifted through the SLI bus daisy chain. The same prefix code can be chosen to instruct interface IC 273 to perform the sequential comparison of the incoming data during shifting, i.e. during sequential SCK pulses, to determine the lowest CSFB signal in the data stream. In this comparison operation, decoder 287 directs multiplexer 286 to the input of digital magnitude comparator 288. This circuit compares the data in SLI bus register 284 against that in register 289 and overwrites register 289 only if the new data is lower. The process is repeated until the CSFB data from every LED driver IC has been shifted into interface IC 273. In other words, in one embodiment of this invention, a special prefix code can be assigned that during shifting never allows the multiplexer to overwrite the CSFB data already present in the SLI bus data stream.

Interface IC 273 then converts this digital representation of the lowest CSFB voltage into an analog voltage CSFBO or analog current ICSFB collectively as feedback signals 292, which control the SMPS 293. The nature of the analog feedback signal depends on the type of feedback required by SMPS 293. If an analog voltage is required, the CSFBO voltage output of D/A converter 290 can be used, with or without a buffer, to directly drive the SMPS 293. If a current feedback signal is required, then operational amplifier OTA 291 is used to convert the CSFBO voltage signal into the current signal ICSFB.

Regardless of whether the feedback to SMPS 293 comprises a current or voltage, in closed loop operation the output voltage of the D/A converter 290 reacts to the digital CSFB signal DCSFB provided by digital magnitude comparator 288, i.e. it becomes a dynamic function of the DCSFB signal. In this manner, real time feedback can be provided to SMPS 293 digitally-SLI bus 294, facilitating control of the LED power supply output voltage $+V_{LED}$ to guarantee adequate voltage for proper illumination of LED strings 274A-274Q at requisite levels of LED current.

LED Driver ICs' with SLI Bus Embedded CSFB

Figure 10A:
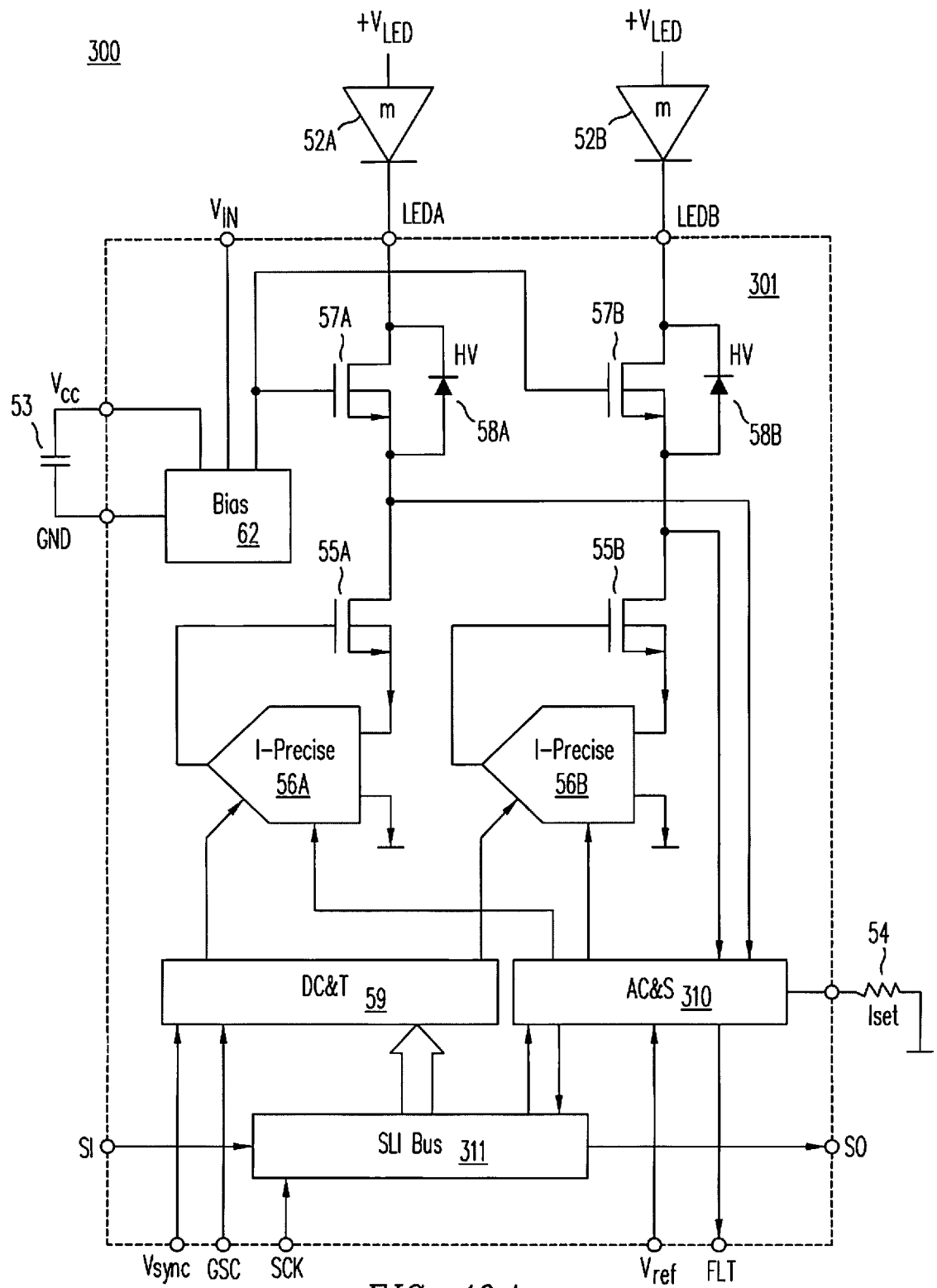
FIG. 10A is a schematic diagram of a dual-channel high-voltage intelligent LED driver with SU bus embedded CSFB and serial bus control with a protective high-voltage cascode clamp DMOSFET and fat SLI bus.

An LED drive system 300 with SLI bus communication and embedded CSFB control in accordance with this invention is shown in FIG. 10A. Similar to LED driver I 51 shown in FIG. 3A, LED drive system 300 comprises a dual channel driver IC 301 with integrated current sink DMOSFETs 55A and 55B, cascode clamp DMOSFETs 57A and 57B with integral high-voltage diodes 58A and 58B, I-precise gate driver circuits 56A and 56B for accurate current control, a digital control and timing (DC&T) circuit 59, and an on-chip bias supply and regulator 62. Unlike the previously described driver IC 51, however, the analog control and sensing (AC&S) circuit 310, along with fat SLI bus shift register 311, have been modified to embed current-sense-feedback CSFB information within the SLI bus protocol. Since the SLI bus shift register is "fat," it contains a CSFB register (equivalent to register 223 in FIG. 7A) that is dedicated to receiving CSFB data from a sample latch within AC&S circuit 310 (equivalent to latch 277 in FIG. 9).

As such, LED driver IC 301 provides complete control of two channels of 250 mA LED drive with 150V blocking capability and ±2% absolute current accuracy, 12 bits of PWM brightness control, 12 bits of PWM phase control, 8 bits of dot current control, fault detection for LED open and LED short conditions and over-temperature detection, all controlled through a high-speed SLI bus, and synchronized to other drivers by a common Vsync and grey-scale clock (GSC) signal. While the specific example shown illustrates cascode clamp DMOSFETs rated at 150V blocking capability, the devices can be sized for operation from 100V to 300V as needed. The device's current rating of 250 mA is set by the power dissipation of the package and the mismatch in forward voltage in the two LED strings being driven.

AC&S circuit 310 within LED driver IC 301 also includes an analog current sense feedback, or CSFB, signal monitoring the two current sink DMOSFETs 55A and 55B, converted by an integrated analog-to-digital A/D converter into a digital version of the CSFB voltage, preferably 4 or more bits in length. This digital CSFB signal, or DCSFB, represents the lowest current source voltage in driver IC 301, and hence the LED string with the highest forward drop. This signal is copied to the CSFB register in SLI bus shift register 311 and is passed through the SLI bus to the interface IC and ultimately back to the system SMPS, supplying the $+V_{LED}$ supply rail.

Unlike previously described LE) driver IC 51, which requires CSFBO) and CSFBI pins for the output and input CSFB signals, respectively, LED driver IC 301 embeds its CSFB data into the SLI bus data stream and requires no extra pins to facilitate current sense feedback regardless of the number of channels integrated in the driver. The CSFBO and CSFBI pins are therefore absent from the package that contains LED driver IC 301. Accordingly, analog control and sensing circuit 310, along with fat SLI bus interface 311, have been modified to embed current-sense-feedback CSFB information within the SLI bus protocol.

Figure 10B:
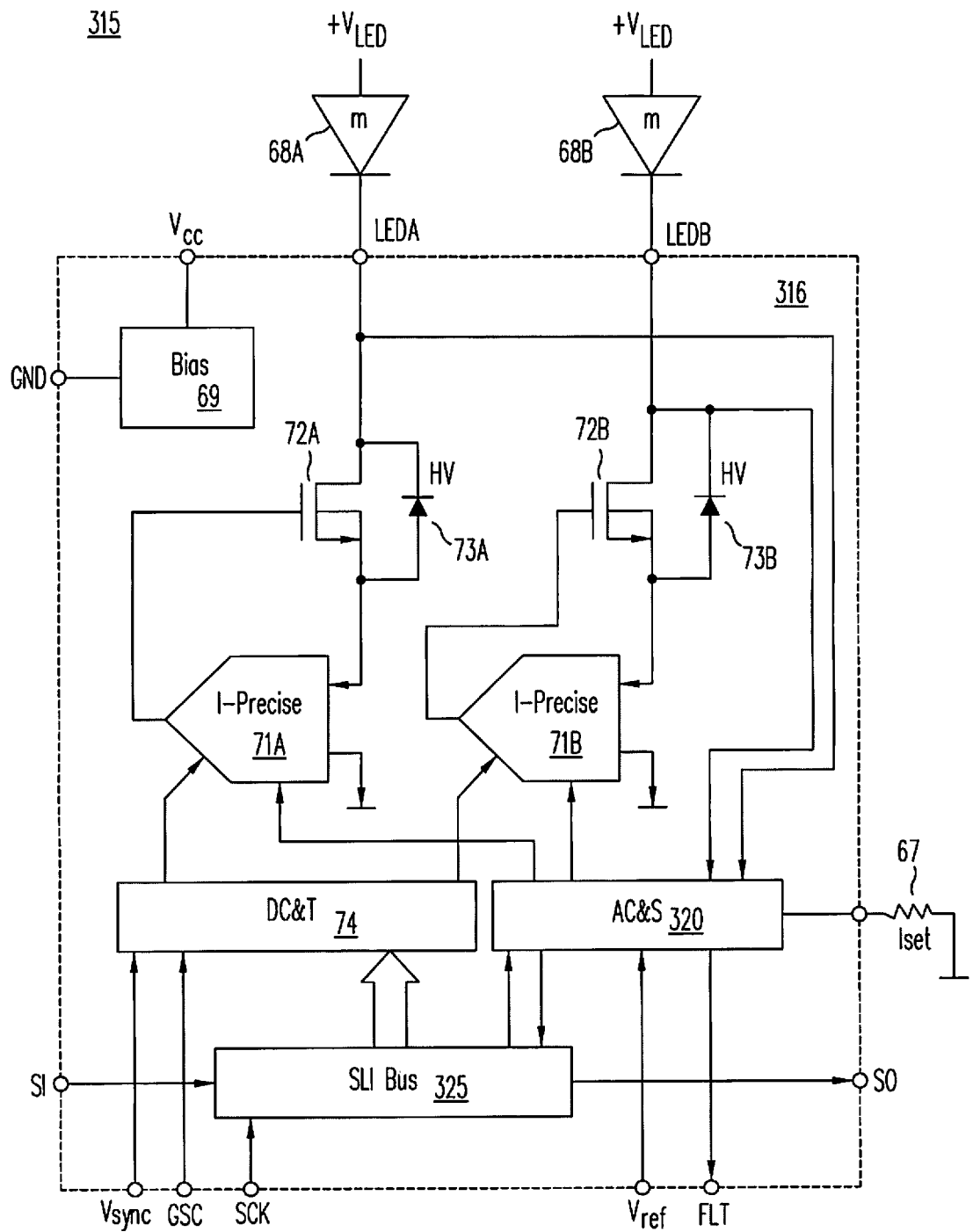
FIG. 10B is a schematic diagram of a dual-channel high-voltage intelligent LED driver with SLI bus embedded CSFB and serial bus control using high-voltage current sink MOSFETs without cascode clamp MOSFETs and comprising a fat SLI bus.

An alternative LED drive 315 with SLI bus communication and embedded CSFB control in accordance with this invention is shown in FIG. 10B. A dual-channel LED driver IC 316 contains current sink DMOSFETs 72A and 72B but omits cascode clamp MOSFETs. Instead, DMOSFETs 72A and 72B contain integral high-voltage diodes 73A and 72B designed to sustain high-voltages in the off condition. Typically such a design is most applicable for operation below 100V but can be extended to 150V if required. As in LED driver 301, I-precise gate driver circuits 71A and 71B facilitate accurate current control, controlled by an analog control and sensing circuit 320, and a digital control and timing circuit 74. An on-chip bias supply and regulator 69 powers LED driver IC 316, in this case from Vcc, not from the 24V input as in LED driver IC 301. Aside from lacking cascode clamp DMOSFETs, LED driver IC 316 operates similarly to LED driver IC 301, controlled through its SLI bus shift register 325 including a digital CSFB signal embedded within the SLI bus interface and protocol.

Unlike the previously described LED driver IC 66 (FIG. 3B), which requires CSFBO and CSFBI pins for the output and input CSFB signals, respectively, LED driver IC 316 embeds its CSFB data into the SLI bus data stream and requires no extra pins to facilitate current sense feedback regardless of the number of channels integrated in the driver. The CSFBO and CSFBI pins are therefore absent from the package that contains LED driver IC 316. Accordingly, analog control and sensing circuit 320, along with fat SLI bus interface 325, have been modified to embed current-sense-feedback CSFB information within the SLI bus protocol.

Figure 10C:
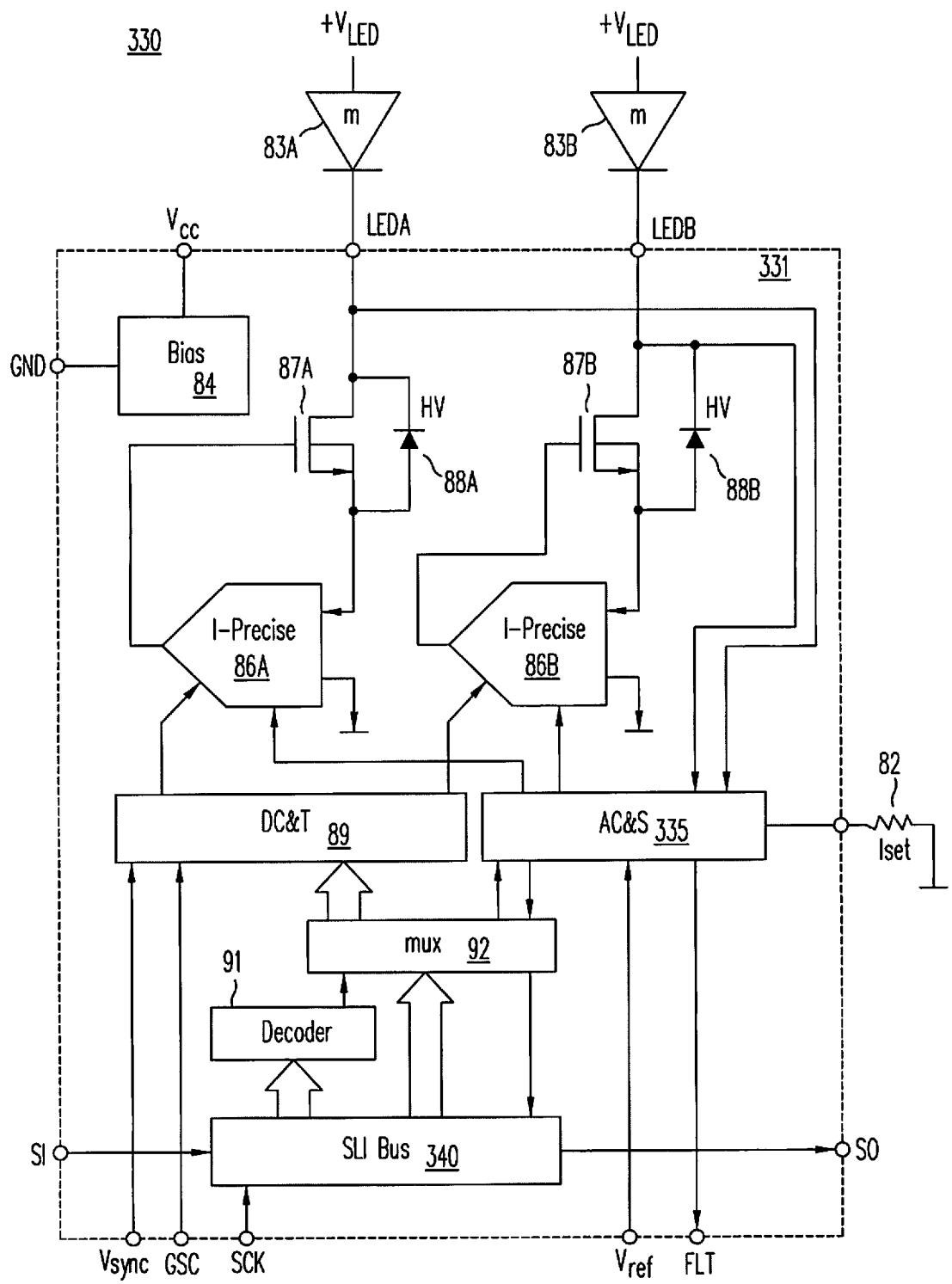
FIG. 10C is a schematic diagram of a dual-channel high-voltage intelligent LED driver with SLI bus embedded CSFB and serial bus control using high-voltage current sink MOSFETs without cascode clamp MOSFETs and comprising a prefix multiplexed SLI bus.

An LED drive 330 using prefix-multiplexed SIT bus communication with embedded CSFB made in accordance with this invention is shown in FIG. 10C. A dual-channel LED driver IC 331 comprises integrated current sink DMOSFETs 87A and 87B with integral high-voltage diodes 88A and 88B, I-precise gate driver circuits 86A and 86B for accurate current control, an analog control and sensing circuit 335, and a digital control and timing circuit 89. An on-chip bias supply and regulator 84 powers the IC from a Vcc input.

Unlike the previously described LED driver IC 80 (FIG. 3C) which requires CSFBO and CSFBI pins for the output and input CSFB signals, respectively, LED driver IC 331 embeds its CSFB data into the SLI bus data stream and requires no extra pins to facilitate current sense feedback regardless of the number of channels integrated in the driver. The CSFBO and CSFBI pins are therefore absent from the package containing LED driver IC 80. Accordingly, analog control and sensing circuit 335, along with prefix-multiplexed SLI bus interface 340, have been modified to embed current-sense-feedback CSFB information within the SLI bus protocol.

Otherwise, LED driver IC 331 provides complete control of two channels of 250 mA LED drive with 150V blocking capability and ±2% absolute current accuracy, 12 bits of PWM brightness control, 12 bits of PWM phase control, 8 bits of current control, fault detection for LED open and LED short conditions and over-temperature detection, all controlled through a high-speed SLI bus, and synchronized to other drivers by a common Vsync and grey-scale clock (GSC) signal. While the specific example shown illustrates current sink DMOSFETs rated at 150V blocking capability, the devices can be sized for operation from 100V to 300V as needed. The device's current rating of 250 mA is set by the power dissipation of the package and the mismatch in forward voltage in the two LED strings being driven. Above a 100V rating, it is advantageous to integrate high voltage cascode clamp DMOSFETs (not shown) in series with current sink DMOSFETs 87A and 87B, whereby current sink MOSFETs 87A and 87B do not require operation above the clamp voltage, i.e. above 12V.

LED Drive System and Interface with SLI Bus Embedded CSFB

Figure 11A:
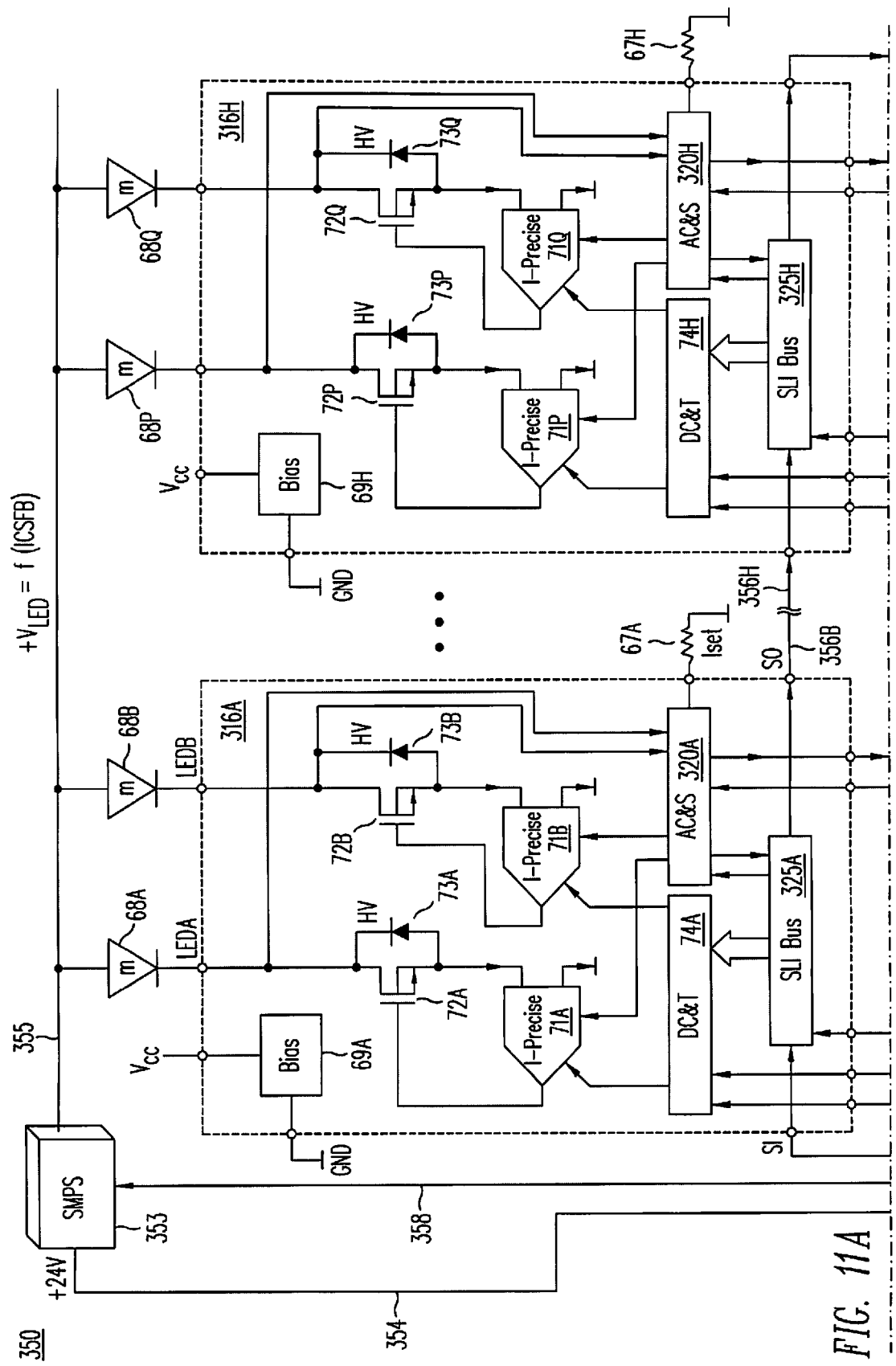
FIGS. 11A and 11B illustrate a multi-channel LED backlight system using intelligent LED drivers with cascode-clamp MOSFETs and a SLI bus-embedded CSFB signal.
Figure 11B:
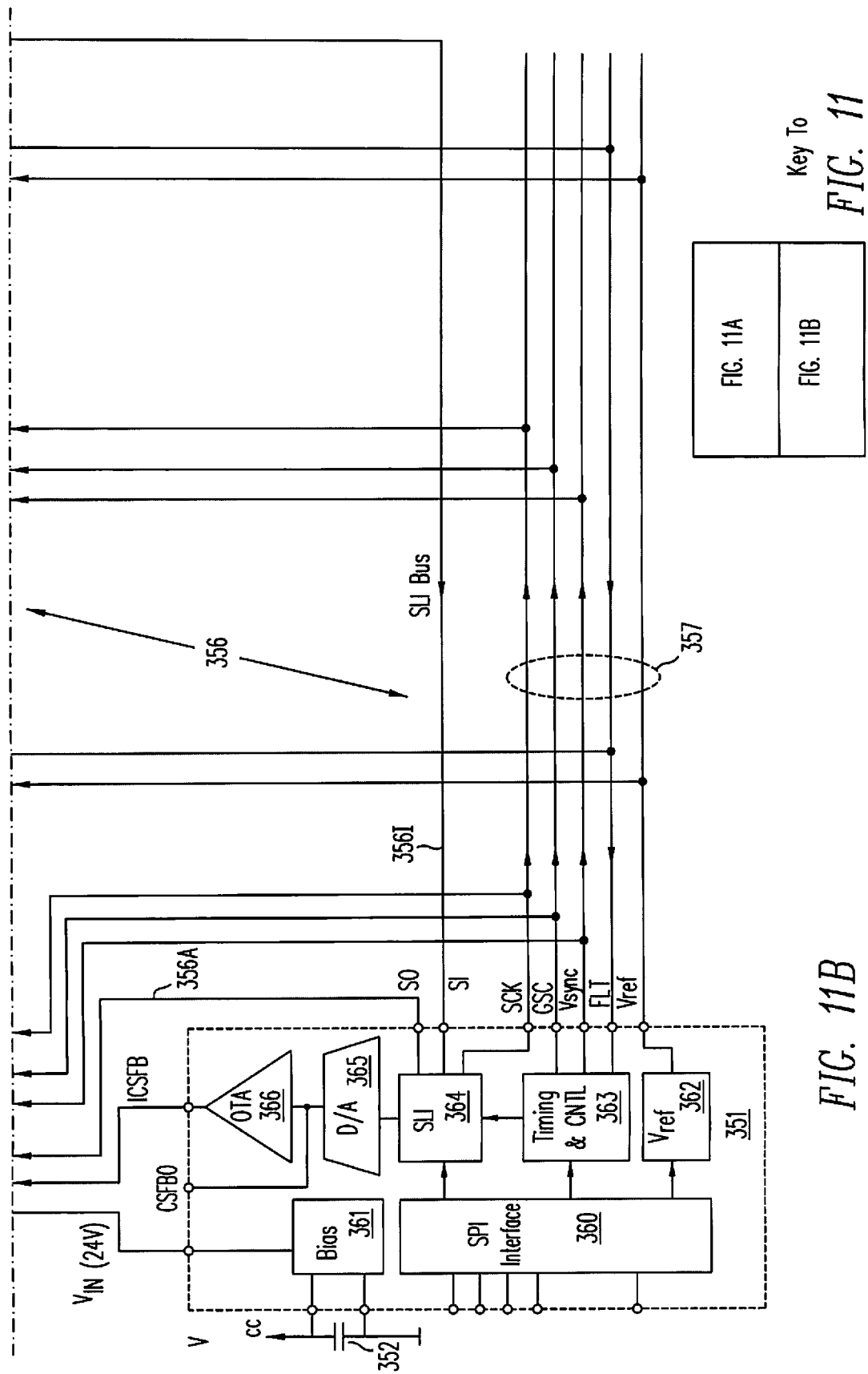

System 350 in FIG. 11 illustrates the application of a distributed system for LED backlighting with local dimming including SLI bus embedded current sense feedback made in accordance with this invention. The figure illustrates an interface IC 351 driving a series of LED) drivers 316A-316H with integral dimming and fault detection powered by a common SMPS 353. The diagram is similar to system 100 in FIG. 4 except that the analog CSFB daisy chain has been completely eliminated and functionally replaced by a DCSFB signal embedded within the SLI bus protocol and physical interface. While the analog-to digital conversion is not explicitly shown in LED driver ICs 316A-316H, interface IC 351 does illustrate the addition of I/A converter 365 needed to reconstruct the analog feedback signal from the SLI bus embedded DCSFB digital word.

Each of LED driver ICs 316A-316H may employ a prefix multiplexed SL bus protocol, as shown in the LED driver IC 331 of FIG. 10C or may alternatively employ a fat bus protocol as shown in the LED driver ICs 301 and 316 of FIG. 10A and FIG. 10B. Each of driver ICs 316A-316H may likewise incorporate high voltage current sink MOSFETs as shown in FIG. 10B and FIG. 10C or alternatively may integrate cascode clamp MOSFETs to protect the current sink MOSFETs, as shown in FIG. 1A. In the system 350, LED driver ICs 316A-316H are illustrated without a multiplexer 92 and a decoder 91, with the understanding that such devices can be included within driver ICs 316A-316H as needed, i.e. whenever a prefix multiplexed SLI bus protocol is utilized. Five common signal lines 357, comprising three digital clock lines, one digital fault line, and one analog reference voltage line connect interface IC 351 to every driver IC. A timing and control circuit 363 generates the Vsync and GSC signals in sync with data from a host µC (not shown) received through an SPI bus interface 360. Timing and control circuit 363 also monitors the FLT interrupt line to immediately detect a potential problem. A reference voltage source 362 provides a reference voltage Vref to the system globally in order to insure good channel-to-channel current matching. A bias supply 361 powers interface IC 351 from a supply voltage $V_{IN}$ on a fixed ±24V supply rail 354 generated by SMPS 353. Bias circuit 361 also generates the regulated supply voltage Vcc, preferably 5V, to power LED drivers 316A-316H. The Vcc supply is filtered by a capacitor 362.

In this example, each of LED drivers 316A-316H comprises two channels which include high-voltage current sink DMOSFETs 72A-72Q with integral HV diodes 73A-73Q, I-Precise gate driver circuits 71A-71Q, DC&T circuits 74A-74H. AC&S circuits 320A-320H including current sense feedback detection and A/D conversion into digital DCSFB, and SLI bus shift registers 325A-325H. While the LED driver ICs 316A-316H shown in FIG. 11 lack cascode clamp MOSFETs, the system 350 may also be constructed in the manner of LED driver IC 300 shown in FIG. 10A, except that the 24V VIN supply, rather than Vcc, may be used to power the LED driver ICs and bias the gates of the cascode clamp DMOSFETs.

Any of the three versions 10A, 10B or 10C can be plugged into the driver IC boxes 316 in FIG. 11.

An SLI bus 356 connecting the LED driver ICs 316A-316H comprises SLI bus shift registers 325A-325H connected together in a daisy chain by SLI bus lines 356A-356I, where the SO serial output of SLI circuit 364 within interface IC 351 connects via SLI bus line 356A to the SI input of LED driver 316A, the SO output of LED driver 316A connects via SLI bus line 356B to the SI input of LED driver 316B (not shown) and so on. SLI bus line 356H connects to the SI input of the last LED driver 316H shown in system 350. The SO output of LED driver 316H, in turn, connects via SLI bus line 356I to the SI input of SLI circuit 364 within interface IC 351. In this manner SLI bus 356 forms a complete loop emanating from the interface IC 351, running-every LIED driver IC 316A-316H (sometimes referred to collectively as LED driver ICs 316) and back to itself. Shifting data out of the SO pin of interface IC 350 concurrently returns an equal length bit string back into the SI pin of interface IC 350.

SLI circuit 364 generates the SLI bus clock signal SCK as required. Because the LED driver ICs 316A-316H have no chip addresses, the number of bits clocked through the SLI bus 356 is correlated to the number of LED driver ICs being driven. The number bits clocked through the SLI bus 356 may be adjusted by modifying the software controlling the data exchange in SPI interface 360, or by a hardware modification to interface IC 351. In this manner, the number of channels within system 350 can be varied flexibly to match the size of the display. The number of bits shifted through the SLI bus 356, i.e. broadcasted on the bus 356, depends on the SLI bus protocol employed and the number of bits in the SLI bus shift registers. For example, the fat SL bus protocol requires 72 to 88 bits per dual channel LED driver while the prefix multiplexed SLI bus is substantially smaller, e.g. a fixed 32 bits in length per LED driver IC regardless of the number of channels integrated into each driver IC.

When a hardware controller within interface IC 351 is used to control SL bus communication, modifying the registers in SLI bus circuit 364 to shift out fewer or more bits requires a modification in the manufacturing or design of interface IC 351. An alternative approach involves replacing interface IC 351 with a programmable interface IC using software to adjust the driver for accommodating fewer or more LED driver ICs in the daisy chain.

Current sense feedback to SMPS 353 comprises a digital current-sense-feedback or DCSFB signal embedded within SLI bus 356. Shifting data through the SLI bus 356 ultimately returns this embedded DCSFB signal to SLI bus circuit 364 of interface IC 351. In the manner described previously, SLI bus circuit 364 in turn, outputs the a DCSFB word representing the lowest CSFB word in SLI bus 356 and D/A converter 365 converts that DCSFB word into an analog CSFB feedback voltage. Operational transconductance amplifier 366 then converts the CSFB feedback voltage into current feedback ICSFB signal on line 358 to control the $+V_{LED}$ output of SMPS 353. Alternatively, the CSFB feedback voltage itself may be used as the feedback signal to control SMPS 353. Digitally embedding the CSFB data contrasts system 350 with the system 100 of FIG. 4, wherein connecting every the LED driver IC to the interface IC through an analog daisy chain requires two dedicated pins per driver IC.

In system 350, like in system 100, only a single value of CSFB feedback signal CSFBO or ICSFB is generated by interface IC 351. In applications where more than one SMPS is required, e.g. in larger, higher current backlit displays or displays with RGB backlighting, the interface IC can be modified to output more than one CSFB output voltage to control multiple SMPS units. The SLI bus data stream itself carries the necessary information to independently control multiple LED supply voltage rails, but the interface IC has to be configured to separate the channel information appropriately to take advantage of such a feature. A multi-feedback, multi-output embodiment of this invention is described below.

Analog and Digital Data Conversion

Referring again to FIG. 9, the voltages present across the current sink MOSFETs 275 are dynamically measured and used to control the output voltage of SMPS 293. While the measured voltage and the feedback signal both comprise analog signals, the SLI bus embedded CSFB method in accordance with this invention comprises a digitally encoded feedback path from the LED driver ICs 272 to the interface IC 273. Such a system requires analog-to-digital conversion within the LED driver ICs 272 to sense the voltages across the current sink MOSFETs 275, and digital-to-analog conversion within the interface IC 273 to generate the feedback signal 292 for SMPS 293.

Changing analog signals into digital words and vice versa, relies on data conversion. While designs of A/D and D/A converters are well known to those skilled in the art, a large variety of converters exist and must be selected to meet, but not substantially exceed, the performance requirements of the digital CSFB function. Data converter designs that respond too slowly to load transients or suffer from instability and long settling times can lead to flicker and inconsistent display images and in extreme cases may even damage electronic components in a display. Conversely, accurate high performance converters are generally too large and too expensive for the TV market.

Figure 12:
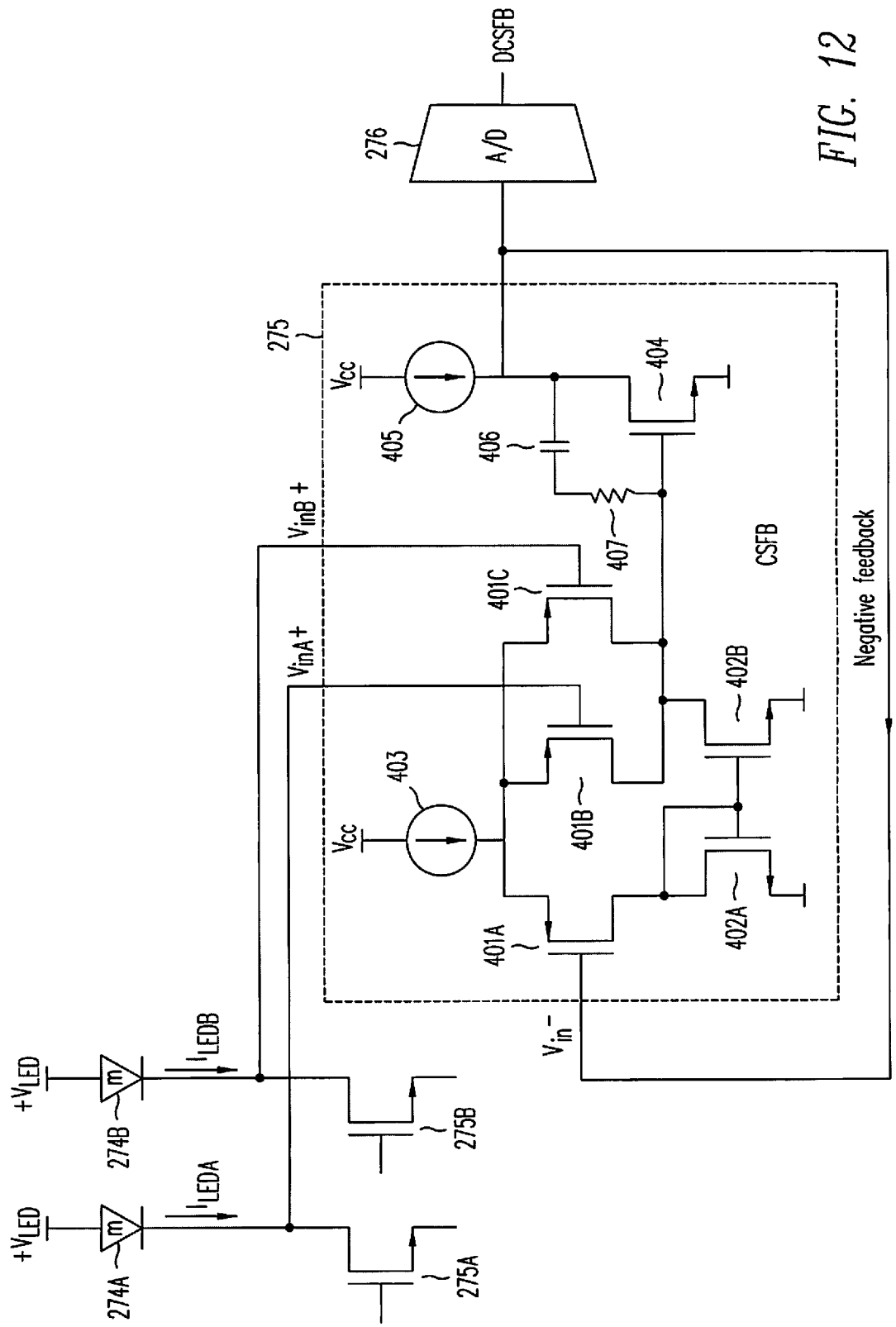
FIG. 12 illustrates an embodiment of an analog CSFB circuit.

FIG. 12 illustrates circuitry for sensing and digital encoding performed within the LED driver ICs where the voltage on the drain connection of MOSFETs 275A and 275B driving LED strings 274A and 274B is connected to the positive inputs $V_{inA}+$ and $V_{inB}+$ of a CSFB circuit 275 which comprises an operational amplifier. With the output of the operational amplifier connected to its negative input $V_{inB}-$, the operational amplifier acts as a unity gain amplifier, or voltage-follower, amplifying the most negative of its positive inputs $V_{inA}+$ and $V_{inB}+$. The output of CSFB circuit 275 also feeds the input of an A/D converter 276. Note that the I-Precise gate driver circuits for current sink MOSFETs 275A and 275B are not shown in FIG. 12 for the sake of clarity.

In one embodiment of CSFB circuit 275, the operational amplifier comprises a differential input with matching input P-channel MOSFETs 401A, 401B and 401C and current source 403. A current mirror comprising matching N-channel MOSFETs 402A and 402B reflects the current in negative input P-channel MOSFET 401A. The current in N-channel MOSFET 402B along with current in P-channel MOSFETs 401B and 401C is summed, driving a second amplifier stage comprising an N-channel MOSFET 404 and active load 405 comprising a current source. Along with negative feedback from its output to negative input MOSFET 401A, a compensation network comprising capacitor 406 and resistor 407 is included to set the pole-zero response of the amplifier and maintain stability over the full range of operation.

In operation, the most negative input present on the amplifier's $V_{inA}+$ and $V_{inB}+$ inputs turns on either P-channel MOSFET 401B or 401C more than its parallel counterpart, and forces the output of the amplifier to the lower of the two drain voltages of MOSFETs 401B and 401C. The output is then digitized by A/D converter 276 and loaded into the SLI bus shift register when requested.

While CSFB circuit 275 in FIG. 12 is shown for a dual-channel LED driver IC, any number of channels can be integrated simply by adding positive inputs connected to P-channel MOSFETs matched to MOSFETs 401B and 401C. For example, if a third positive input were connected to a P-channel MOSFET 401D, then CSFB circuit 275 would output the lowest of its three inputs, either that of channel A, channel B or channel C. In this manner CSFB circuit 275 detects and outputs the lowest drain voltage of any current sink MOSFET in a particular LED driver IC.

Figure 13:
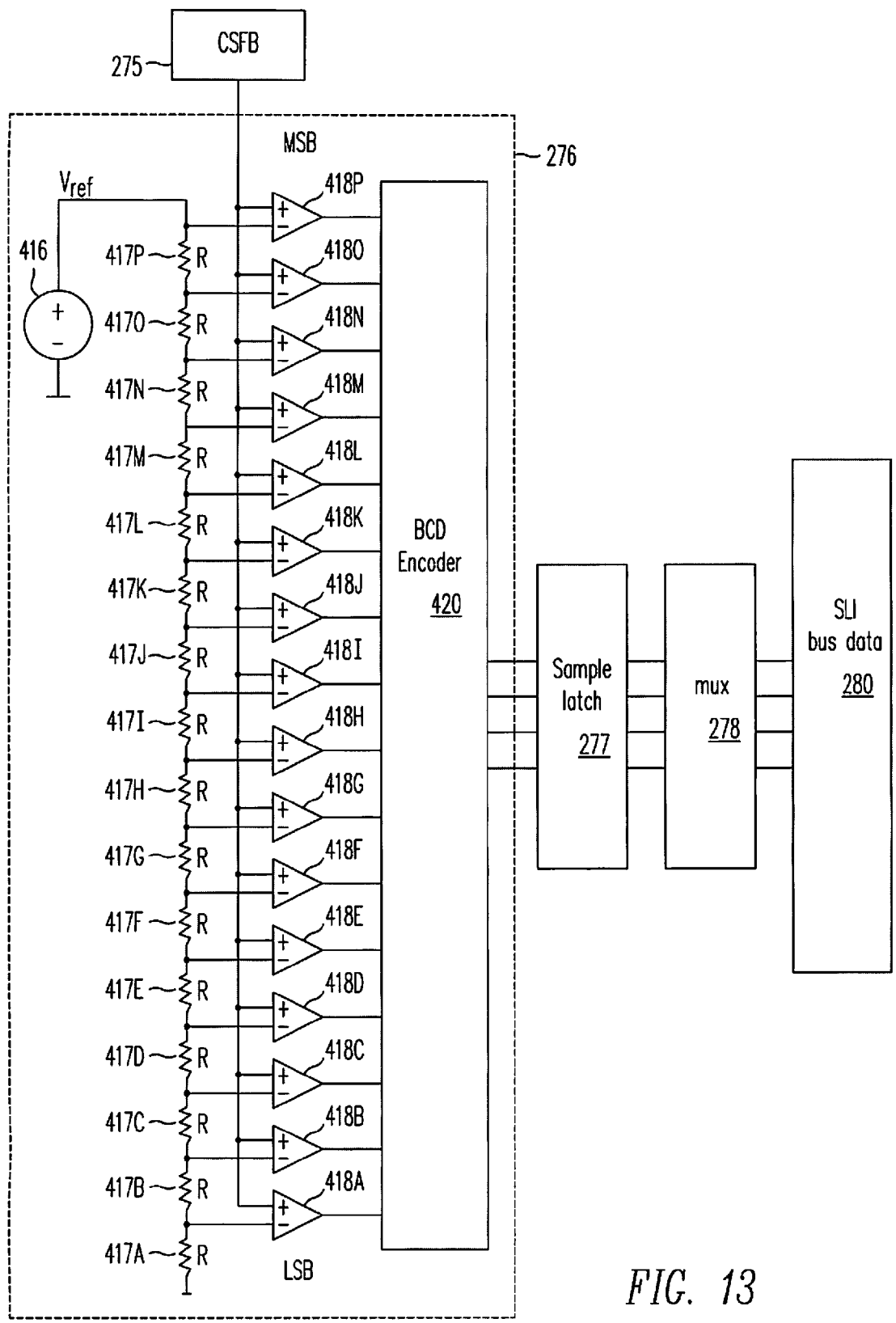
FIG. 13 illustrates an embodiment of an analog-to-digital CSFB converter

As described previously, CSFB circuit 275 determines the lowest voltage present across the current sink MOSFETs within a given LED driver IC. This analog voltage is input to analog-to-digital converter 276. Analog-to-digital converter 276 can easily be realized using methods well known to those skilled in the art. A 4-bit D/A converter 276 is shown in FIG. 13, comprising a voltage divider comprising resistors 417A-417P (collectively referred to as resistors 417), a corresponding number of analog comparators 418A-418P, a stable source of a reference voltage Vref 416, and a binary-coded decimal BCD digital encoder 420.

As shown, the reference voltage Vref is divided into sixteen linearly uniform steps ranging from one-sixteenth of Vref up to Vref. These sixteen reference voltages are connected to the negative inputs of analog comparators 418A-418P. For example, the more positive terminal of resistor 417A, i.e. the side not connected to ground, is connected to the negative input of comparator 418A. Similarly, the more positive terminal of resistor 417G is connected to the negative input of comparator 418G, and so on. The input to comparator 418P is tied directly to the reference voltage Vref. The positive inputs of analog comparators 418A-418P are connected to the input terminal of A/D converter 276, which in turn is connected to the output of the CSFB circuit 475. Because comparator 418A measures the lowest voltage of the series resistor chain 417, its output can be considered as the least significant bit or LSB of the converter. Conversely, because comparator 418P measures the highest voltage, i.e. input higher than Vref, it can be considered the most significant bit or MSB of A/D converter 276.

In operation, an analog voltage output by CSFB circuit 275 is compared against the sixteen reference voltages at the negative inputs to analog comparators 418A-418P. Powered by Vref 416, the individual reference voltages are generated using a series string of resistors 417. For any given input voltage, the A/D converter input may exceed the reference voltage on some comparators and fall below the reference voltage on others. For those comparators where the CSFB input exceeds the reference voltages, the outputs of the corresponding comparators will exhibit a logical "high" state. For those comparators where the reference voltage exceeds the CSFB input, the outputs of the corresponding comparators will exhibit a logical "low" state. For example, when the input voltage to A/D converter 276 just slightly exceeds the reference voltage input to comparator 418G, then all the outputs of comparators 418A-418G will be high and all the outputs of comparators 418H-418P will remain low.

In this way, the outputs of the sixteen comparators 418A-418P produce a unique digital combination of bits, i.e. of "ones" and "zeroes", representing a digital approximation of the analog CSFB voltage output of CSFB circuit 275. The sixteen outputs of comparators 418A-418P are fed into BCD decoder 420 that in turn outputs a four-bit binary-coded-decimal or BCD code that is subsequently stored in sample latch 277 as digital CSFB data. BCD encoder 420 converts the sixteen possible combinations of the comparator 418 outputs into sixteen 4-bit words in a one-to-one correspondence. One possible conversion code is shown in Table 2 below:

TABLE 2

| High Comparators | Low Comparators | Comparator Out | BCD Encoder Out |
|---|---|---|---|
| none | 418P to 418A | 0000 0000 0000 0000 | 0000 |
| 418A | 418P to 418B | 0000 0000 0000 0001 | 0001 |
| 418B to 418A | 418P to 418C | 0000 0000 0000 0011 | 0010 |
| 418C to 418A | 418P to 418D | 0000 0000 0000 0111 | 0011 |
| 418D to 418A | 418P to 418E | 0000 0000 0000 1111 | 0100 |
| | | etc. | |
| 418M to 418A | 418P to 418N | 1111 1111 1111 1000 | 1100 |
| 418N to 418A | 418P to 418O | 1111 1111 1111 1100 | 1101 |
| 418O to 418A | 418P | 1111 1111 1111 1110 | 1110 |
| 418P to 418A | none | 1111 1111 1111 1111 | 1111 |

The 4-bit DSCFB data in sample latch 277 is passed to the SLI bus register 280 as required, being subsequently shifted through the SLI bus and into the interface IC in a manner described previously. Sample latch 277 containing the DCSFB data is referred to as a "sample latch" because the process of converting analog data into digital data takes a finite amount of time, i.e. A/D conversion is not instantaneous, so that the voltage data is only "sampled" at some periodic basis. Moreover, as described above, there is normally no compelling need or benefit to sample the CSFB feedback voltage in a video backlight system at a frequency significantly above the frame rate, i.e. at a rate faster than five times the Vsync frequency.

In the case of the prefix multiplexed SLI bus, the DCSFB data in sample latch 277 is passed into SLI bus data register 280 through multiplexer 278 in response to the corresponding prefix code for reading the DCSFB data, where the prefix is decoded and the data is copied from the sample latch into the data field of the SLI bus shift register. In a preferred embodiment of the prefix multiplexed SLI bus where the SLI bus data register is 16-bits wide, the 4-bit DCSFB word generated from the LED driver IC is preferably loaded into the 4 least significant bits of the data register as shown in Table 3:

TABLE 3

| DCSFB sample latch | SLI bus data register |
|---|---|
| wxyz | 0000 0000 0000 wxyz |

In contrast, the fit SLI bus protocol, the data in sample latch 277 maps directly into the corresponding 4-bit word in the SLI bus protocol without the need for intervening multiplexer 278. As such, each LED driver IC regularly generates at least one DCSFB word per IC and loads that information into the SLI bus data registers on a regular periodic basis or upon request.

Figure 14:
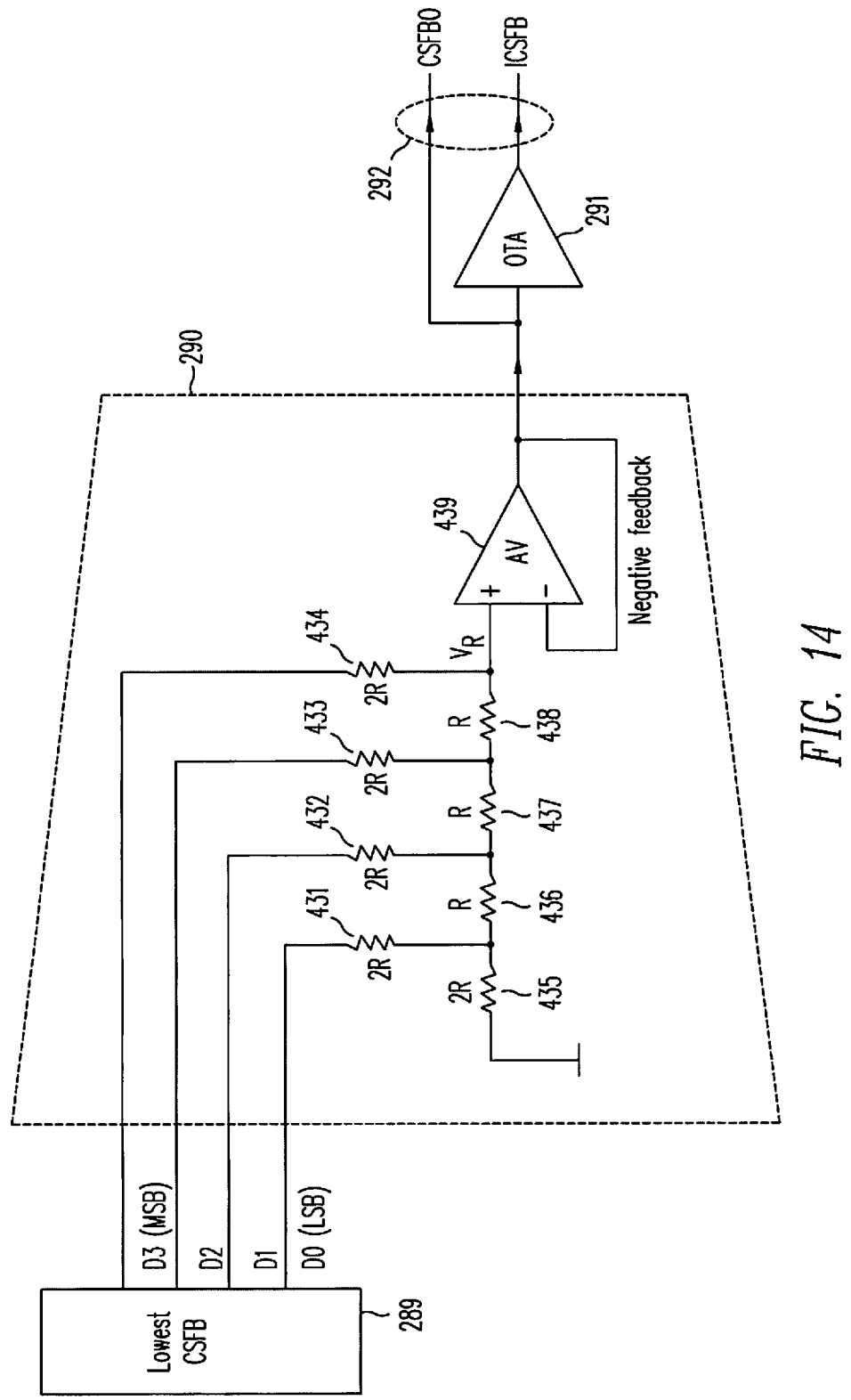
FIG. 14 illustrates an embodiment of a digital-to-analog CSFB converter.

Since each driver IC generates it own DCSFB signal representing the lowest drain voltage of the current sink MOSFETs in that particular IC, the interface IC must sort through the digital codes to identify the value of the lowest CSFB voltage for all channels and driver ICs. As shown in FIG. 14, this lowest CSFB voltage stored in digital register 289 is then converted back into an analog feedback signal by D/A converter 290 and output as an analog feedback signal 292. The voltage output of D/A converter 290, named CSFBO, may be used directly to drive the feedback input of a SMPS or alternatively operational transconductance amplifier OTA 291 may be used to convert this voltage into a feedback current ICSFB.

Four-bit digital-to-analog converter 290 can easily be realized using methods well known to those skilled in the art. One such method, illustrated in FIG. 14, is to employ an R/2R ladder design comprising resistors 431-438. Each digital input DO-D3 is biased in a logic "high" state at Vcc, or in a logic "low" state at ground. These inputs connect to the resistor "ladder", producing a voltage $V_R$ across the resistor network. By changing the binary bit combination in register 289, the resistor ladder voltage $V_R$ may be varied dynamically. Specifically, if register 289 comprises a 4-bit word, sixteen possible digital combinations create sixteen unique equivalent circuits, each having a distinct and unique $V_R$ voltage. To avoid interactions with varying load impedance, voltage follower 439 buffers the ladder output voltage. By using resistors binary weighting, D/A converter 290 produces a linear monotonic conversion of digital code into an analog voltage.

Supporting Multiple SLI Bus Embedded CSFB Signals

As described previously, one of the limitations of analog current sense feedback is its inflexibility to support multiple independent feedback signals. Multiple feedback signals are required when more than one SMPS is required per system, either to support higher power levels or to drive multiple strings of LEDs having different colors. For example two SMPS modules generating independent $+V_{LED}$ an supplies are needed in larger, brighter displays where a single power supply is excessively large and energy inefficient. In RGB backlighting, at least three separate power supplies, one to power strings of red LEDs, one to power strings of green LEDs, and another to power strings of blue LEDs are required. In some cases, in RGBG backlights four power supplies are employed because two rather one string on green LEDs are needed to achieve the best color balance. Regardless, in present day systems, supporting multiple power supplies with different output voltages requires duplicating or triplicating the entire LED backlight system, making the solution costly, complex, and sensitive to noise coupled into the multiple analog feedback signals.

Modifying the SLI bus embedded CSFB method to support multiple DCSFB signals resolves the problematic issues of multiple analog current sense feedback signals with no change to the BOM system cost other than the extra SMPS modules, no change to the SLI bus architecture, no change to the LED driver ICs, and minimal changes to the interface IC. As such, a single backlight system made in accordance with this invention can be adapted to support multiple supplies in a straightforward manner.

Figure 15:
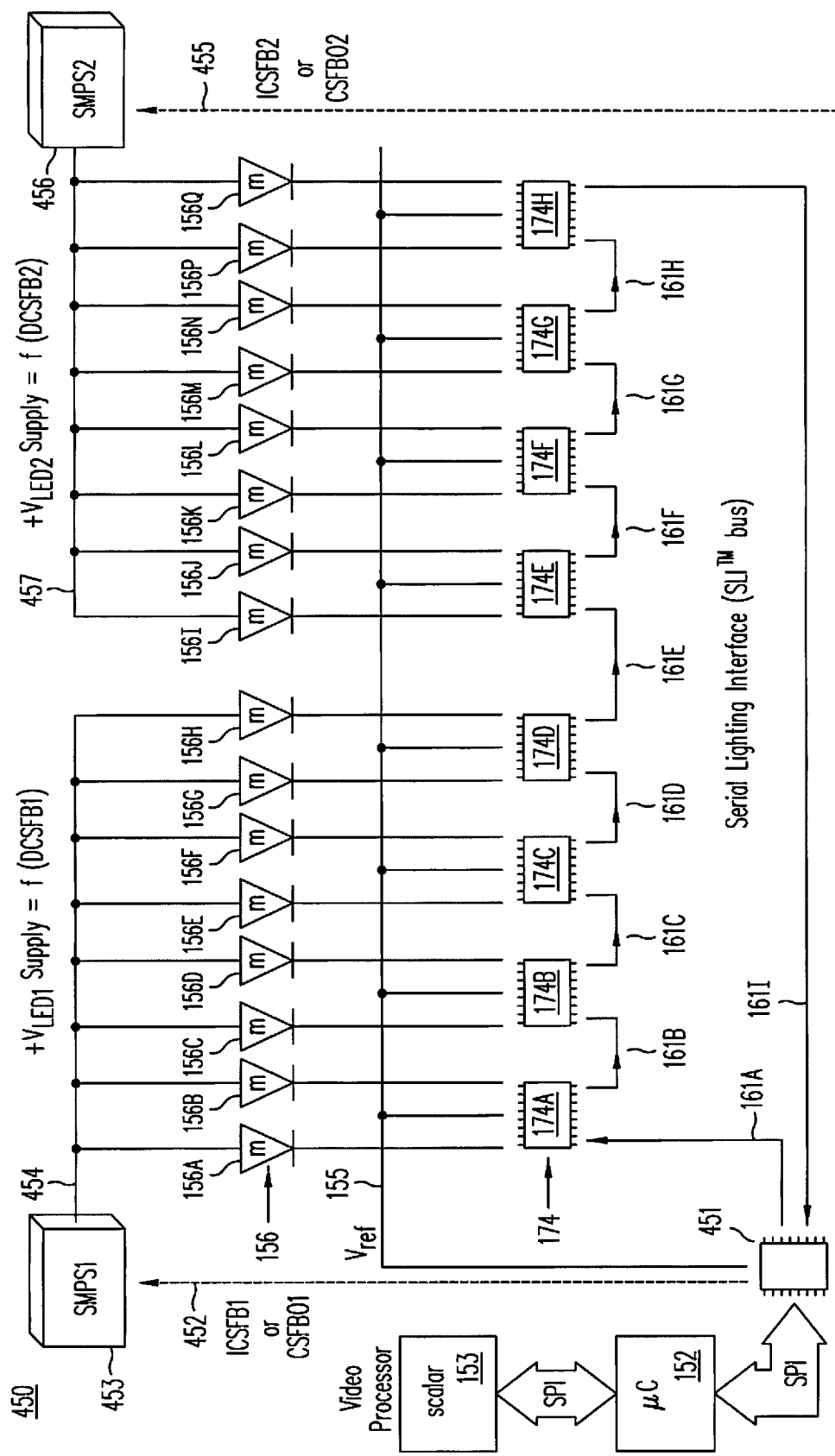
FIG. 15 is a schematic diagram illustrating SLI bus-based control of an intelligent backlighting system with an embedded SLI bus control for dual power supplies.

As illustrated in FIG. 15, a multiple power supply LED drive system 450 made in accordance with this invention comprises a single interface IC 451 and single SLI bus daisy chain 161 controlling an array of eight LED driver ICs 174 and two SMPS modules 453 and 456 with independent feedback lines 452 and 455 for each SMPS module using the disclosed SLI bus embedded CSFB method adapted for multiple DCSFB signals. In this manner, a single scalar video processor IC 153 and microcontroller 152 can drive separate LED backlight arrays from two high-voltage power supplies, each of SMPS modules 453 and 456 operating at the optimum voltage for the LED strings it is driving. For precise current matching, all LED driver ICs 174A-174-H share a common Vref analog reference voltage on line 155.

In the dual-supply backlight system 450 as shown, LED strings 156A-156H are powered from a common high-voltage supply rail 454, dynamically regulated to a voltage $+V_{LED1}$ as a function of digital feedback signal DCSFB1. Interface IC 451 determines the value of DCSFB1 by interrogating the SLI bus embedded CSFB data retrieved from LED driver ICs 174A-174D and selecting the lowest value in the data stream. This digital value is then converted to an analog feedback signal on line 452 controlling SMPS1 module 453, either as a voltage feedback signal CSFBO1 or as a current feedback signal ICSFB1. Similarly, LED strings 156I-156Q are powered from a common high-voltage supply rail 457, dynamically regulated to a voltage $+V_{LED2}$ as a function of digital feedback signal DCSFB2. Interface IC 457 determines the value of DCSFB2 by interrogating the SLI bus embedded CSFB data retrieved from LED driver ICs 174E-174H and selecting the lowest value in the data stream. This digital value is then converted to an analog feedback signal on line 455 controlling SMPS2 module 456, either as a voltage feedback signal CSFBO2 or as a current feedback signal ICSFB2.

Both DCSFB1 and DCSFB2 data are derived from interface IC 451 interrogating the data stream on the SLI bus 161 which is shifted into interface IC 451 via the SLI bus line 161I and sorting through the incoming bits to determine the portion of each word constituting the CSFB data and the driver IC from whence it came. In the case of the fat SLIT bus protocol, this sorting function can be achieved using a counter or with programmable logic to determine which LED driver IC relates to the data that is arriving on line 161I. This method for encoding CSFB data into the SLI bus protocol facilitates controlling multiple power supplies from LED driver IC's embedding one-single CSFB feedback signal per driver IC. While driver ICs 174 do not require modification from those previously described and used in single power supply applications, such as the system 170 shown in FIG. 6, interface IC 451 in FIG. 15 must be modified to interrogate and parse its incoming CSFB data into two channels of feedback in order to independently control multiple power supplies.

Figure 16:
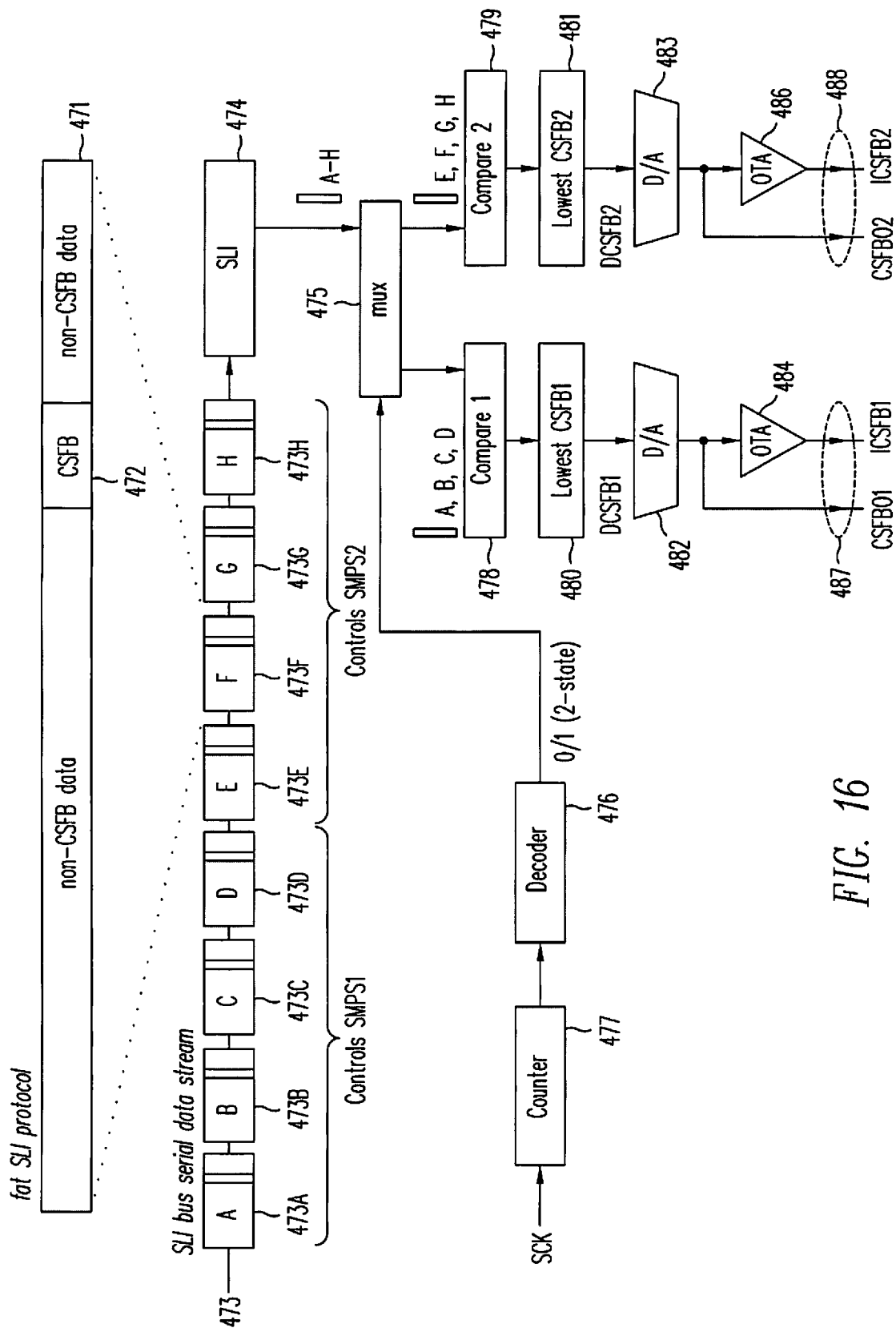
FIG. 16 is a block diagram of an interface IC for controlling dual power supplies using fat SLI bus protocol.

A method of separating the CSFB data that relates to LED driver ICs 174A-174D from the CSFB data that relates to LED driver ICs 174E-174H is illustrated functionally in FIG. 16. An SLI bus data stream 473 entering SLI bus shift register 474 comprises eight CSFB signals 473A-473H generated from and within eight separate LED driver ICs (not shown), with each driver IC sending its own unique CSFB feedback value to the interface IC for processing. SLI bus shift register 474 which interprets the incoming CSFB feedback data, resides within aforementioned interface IC, for example within interface IC 451 or equivalent, which as shown, outputs feedback signals 487 and 488 to control two power supplies.

Since fat SLI bus protocol 471 containing CSFB data 472 contains no information regarding which driver IC generated the specific CSFB signal, a counter or programmable logic must be used to identify the source of the data as it is shifted into SLI bus shift register 474. In the example shown, the CSFB data words 473A-473D generated from LED driver ICs 174A-174D control the output voltage of power supply SMPS1 while CSFB data words 473E-473H generated from LED driver ICs 174E-174H control the output voltage of power supply SMPS2. Digital word 471, which structurally represents each of words 473A-473H, comprises a CSFB packet 472, representing CSFB data, embedded within bits constituting non-CSFB data. In the example shown, data words 473E though 473H, used to control SMPS2, are shifted into SLI bus shift register 474 first, followed by the words controlling SMPS1. This sequence is arbitrary and can vary from system to system. In fact, the data controlling SMPS1 and SMPS2 could conceivably be interspersed further complicating the sorting process.

To parse the incoming SLI bus data into distinct words 473A-473H, isolate the CSFB data packet 472 in each word, and identify which LED driver IC channel sent the data, a counter 477 counts the number of SCK pulses and a decoder 478 interprets what to do with the corresponding data, either to load it from SLI bus register into an active latch as CSFB1 data, CSFB2 data, or to discard it. Specifically a multiplexer 475 directs SLI bus data for channels A, B, C, and D to compare1 register 478 and data for channels E, F, G and H to compare2 register 479. While SLI bus shift register 474 contains the entire fat SLI-bus protocol word, either 66 or 88 bits in length, only the 4-bit-wide CSFB packet 472 is loaded into compare registers 478 or 479. All the other bits are discarded or used by other registers and functions within the interface IC.

When channel-1 CSFB data packets 472 have been loaded into compare1 register 478, the incoming data is compared against the data in "lowest CSFB1" register 480, overwriting the register 480 data only if the new data has a numerically lower magnitude value. Otherwise the data in "lowest CSFB1" remains unaltered. At the completion of the SLI bus shift operation or upon the next Vsync pulse the DCSFB1 data is then loaded into active latch and D/A converter 482 and the output voltage of SMPS1 changes. The analog feedback signal 487 may comprise voltage output CSFBO1 or current ICSFB1 where operational transconductance amplifier OTA 484 converts CSFBO1 feedback voltage into ISCFB1 feedback current. In a similar manner, when channel-2 CSFB data 472 is loaded into compare2 register 479, the incoming data is compared against the data in "lowest CSFB2" register 481, overwriting the register 481 data only if the new data has a numerically lower magnitude value. Otherwise the data in "lowest CSFB2" remains unaltered. At the completion of the SLI bus shift operation or upon the next Vsync pulse the DCSFB2 data is then loaded into active latch and D/A converter 483 and the output voltage of SMPS2 changes. The analog feedback signal 488 may comprise voltage output CSFBO2 or current ICSFB2, where operational transconductance amplifier OTA 486 converts CSFBO2 feedback voltage into ISCFB2 feedback current.

In this manner counter 477, decoder 476, and multiplexer 475 are able to parse and sort SLI bus data stream 473, extracting SLI bus embedded digital CSFB signal 472 from each LED driver IC to dynamically control two SMPS outputs via analog CSFB signals 487 and 488. The concept can be extended to three or more power supplies by changing decoder 476 and adding extra compare registers and D/A converters. As shown, data stream 473 groups all the LED driver IC data controlling SMPS2 into successive words 473H-473E, followed by all the LED driver IC data controlling SMPS1 comprising sequential. SL bus words 473D-473A. In other embodiments of this invention, the CSFB feedback data for two or more SMPS modules may be interspersed in alternating or random fashion. Thus decoder 476 may comprise reconfigurable logic, field programmable gate arrays, or a small microcontroller core in order to flexibly adapt the sorting routine to varying sequences. Note that at startup, the CSFB registers are initially loaded with the highest value. After that, the most recent CSFB data is updated in the SLI bus data, adjusting the power supply voltage dynamically in perpetuity.

Figure 17:
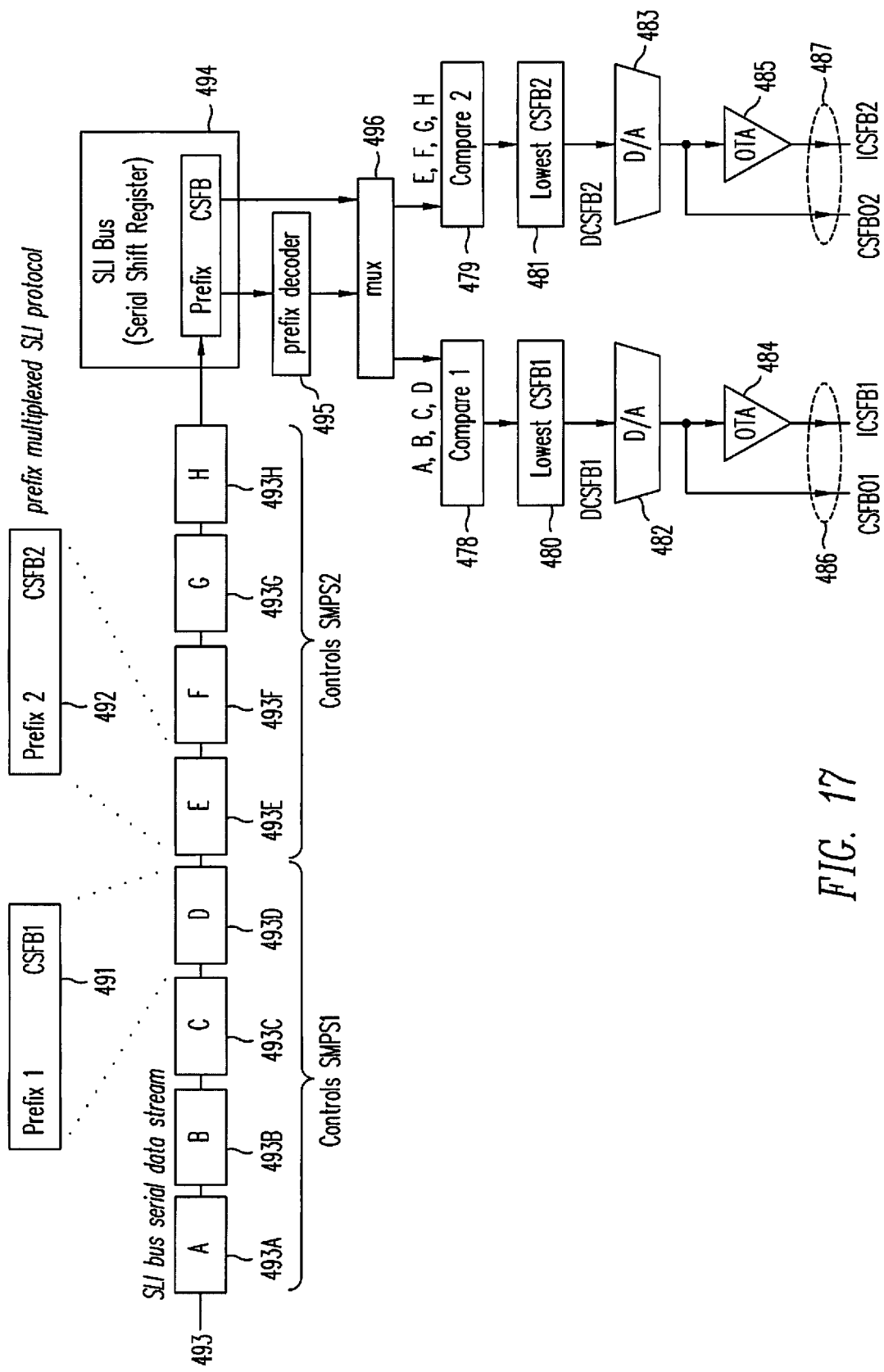
FIG. 17 is a block diagram of an interface IC for controlling dual power supplies using a prefix multiplexed SLI bus protocol and prefix-specific CSFB signals.

In an alternative embodiment in accordance with this invention, information needed to separate and assign the SL bus-embedded CSFB data to one of several power supplies can be built-in to the protocol itself. In the prefix-multiplexed SLI bus protocol and hardware interface, one method for extracting and assigning embedded CSFB data using separate prefix codes as shown in FIG. 17. In this example, a prefix code and its associated CSFB data identifying the SMPS to be controlled by the digital CSFB data is embedded in the SLI bus data stream generated by each LIED driver IC. By reading and decoding the prefix data, the interface IC is then able to easily assign the feedback data to the appropriate SMPS.

As an example, SLI bus data stream 493 embeds two types of CSFB signals, specifically SLI bus word 491 comprising prefix code "prefix1" with corresponding data CSFB1 for controlling SMPS1, and SLI bus word 492 comprising "prefix2" corresponding to CSFB2 data for controlling SMPS2. In this embodiment, SLI bus data stream 493 comprises four words 493H-493E controlling SMPS2 and four words 493D-493A controlling SMPS1. The SLI bus data stream 493 is sequentially shifted into SLI bus serial shift register 494 under control of the SCK signal, whereby the prefix code is interpreted by prefix decoder 495, and multiplexer 496 directs the data to the appropriate functional latch.

In the case where the prefix code identifies CSFB1 data, prefix decoder 495 directs multiplexer 496 to load the CSFB data from the data field of SLI bus register 494 into "compare1" register 478, as shown comprising the CSFB data for LED driver ICs A, B, C, and D. Compare1 function 478 then overwrites the data in lowest CSFB1 latch 480 only when the incoming data in SLI bus 494 has a numerical magnitude lower than the data currently residing in "lowest CSFB1" register 480, otherwise the data in register 480 remains unaltered. After all the words in SLI bus data stream 493 are shifted into SLI bus shift register 494 and interpreted, the data in "lowest CSFB1" register 480 represents the current digital representation of CSFB1 data, i.e. DCSFB1. At that time or synchronized to the next Vsync pulse, the DCSFB1 data is copied, into active latch and D/A converter 482, generating analog feedback outputs 486 comprising voltage output CSFBO1 or after conversion by OTA 484, current output ICSFB1.

In a similar manner, when the prefix code identifies CSFB2 data, prefix decoder 495 directs multiplexer 496 to load the CSFB data from the data field of SLI bus register 494 into compare2 register 479, as shown comprising the CSFB data for LED driver ICs F, F, G and H. Compare function 479 then overwrites the data in "lowest CSFB2" latch 481 only when the incoming data in SLI bus 494 has a numerical magnitude lower than the data currently residing in "lowest CSFB2" register 481, otherwise the data in register 481 remains unaltered. After all the words in SLI bus data stream 493 are shifted into SLI bus shift register 494 and interpreted, the data in lowest CSFB2 register 481 represents the current digital representation of CSFB2 data, i.e. DCSFB2. At that time or synchronized to the next Vsync pulse, the DCSFB2 data is copied into active latch and D/A converter 483, generating analog feedback outputs 487 comprising voltage output CSFBO2 or after conversion by OTA 485, current output ICSFB2.

In this example shown, the first four words shifted into SLI bus shift register 494 are those associated with control of SMPS2, i.e. LED driver ICs H, G, F, and E, followed by four words controlling SMPS1, in order as LED driver ICs D, C, B, and A. With the prefix multiplexed SLI bus, however, the data stream is not limited to a particular sequence. Instead, the data sequence can intermix the feedback data for SMPS1 and SMPS2 in any alternating or random sequence. Furthermore, using a distinct prefix code for each CSFB signal, any number of CSFB signals can be embedded into the SLI bus data stream.

For example, the format can easily be adapted to support three power supplies consistent with driving RGB backlighting systems, or to support four separate feedback signals useful in RGBG or RGYB backlighting approaches. RGBG backlighting solutions employ strings of red LEDs powered by one SMPS, strings of blue LEDs powered by another SMPS, and double the number of green LED strings powered by two SMPS modules in order to compensate for the lower luminance of today's green LEDs. In RGBY backlighting, yellow LEDs are included to extend the range of color temperature. The same system may also be used in signage applications where RGB, RGBG, or RGBY are used to produce the actual image rather than to generate a white backlight.

Figure 18:
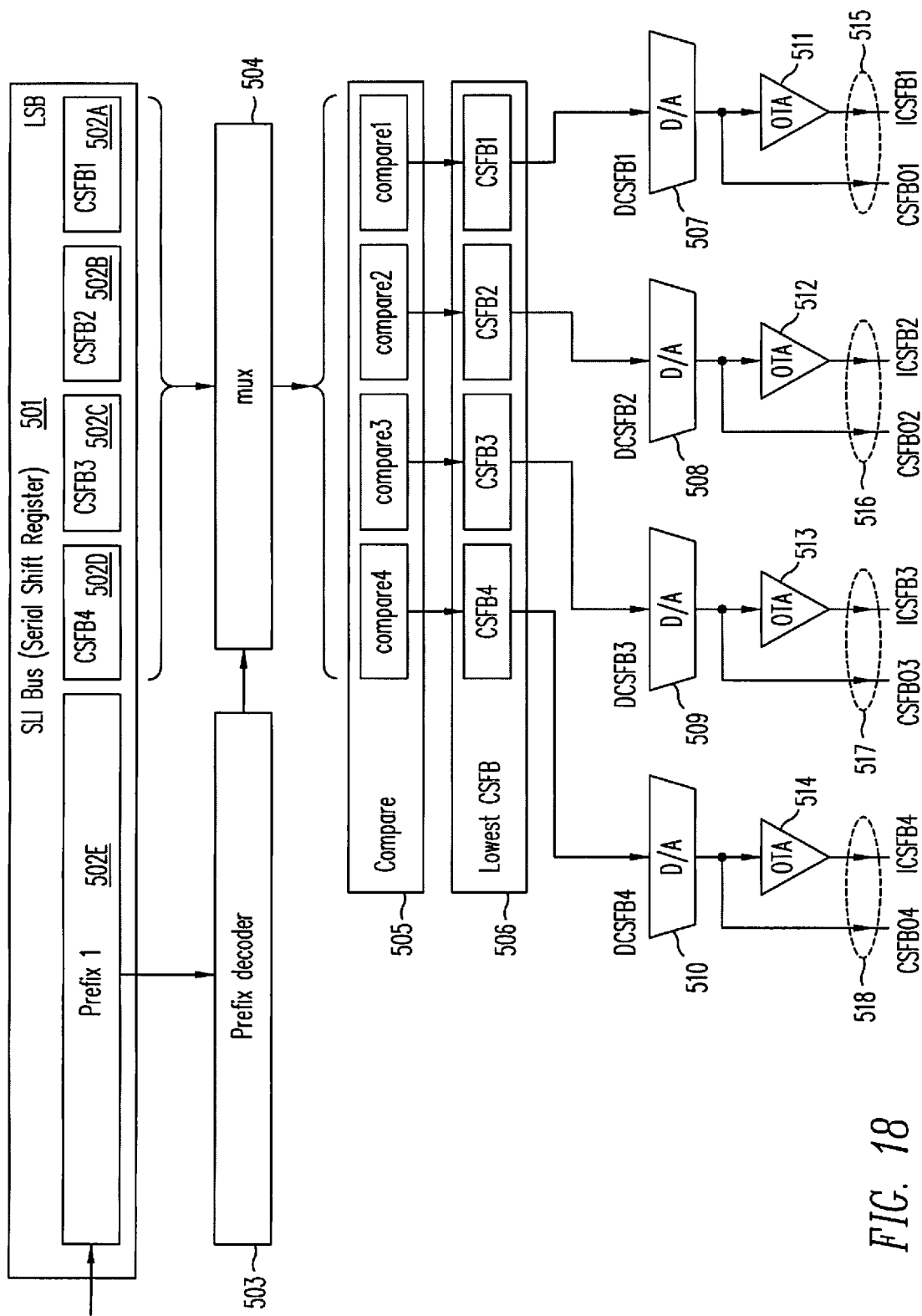
FIG. 18 is a block diagram of a quad-CSFB SLI-bus protocol and decoding system using a single SLI bus prefix.

In summary, FIG. 17 illustrates that separate prefix codes can be used to en bed multiple distinct CSFB signals into a SLI bus data stream to produce a flexible solution to managing multiple power supplies without the need for analog feedback networks. An alternative approach is embed up to four CSFB signals into the data field of a single prefix-multiplexed SLI bus word, partitioning one 16-bit SLI bus data field into four CSFB 4-bit "nibbles". Such an alternative approach to embedding CSFB data into the SI bus protocol is illustrated in FIG. 18, where one SLI bus word 501 using a 32-bit prefix multiplexed or "slim" SLI bus protocol comprises a 16-bit prefix code 502E and four 4-bit CSFB signals 502A-502D.

The data field of SLI bus word 501 comprises CSFBI word 502A comprises the four lowest significant bits in the SLI bus data field, bits 0 to 3, CSFB2 word 502B comprises the next four higher significant bits in the SLI bus data field, bits 4 to 7, CSFB3 word 502C comprises the next four higher significant bits in the SLI bus data field, bits 8 to 11, and CSFB4 word 502D comprises the four highest significant bits in the SLI bus data field, bits 12 to 15.

Prefix decoder 503 decodes prefix 502E instructing multiplexer 504 to transfer all four CSFB words 502A-502D into compare register 505. Compare register 505 then compares the 4-bit CSFB1 data. 502A in SLI bus to the CSFB1 data in lowest CSFB register 506, overwriting the data in register 506 only when the new data in 502A is lower. Compare register 505 simultaneously compares the 4-bit CSFB2 data 502B in SLI bus to the CSFB2 data in lowest CSFB register 506, overwriting the data in register 506 only when the new data in 502B is lower. Contemporaneously, compare function. 505 compares the data in 502C to CSFB3 data in "lowest CSFB" register 506, and compares the data in 502D to CSFB4 data in "lowest CSFB" register 506. After data is shifted into serial shift register 501, "lowest CSFB" register 506 contains the most current CSFB values.

The data within register 506 is then used to generate CSFB feedback outputs 511-51S using D/A converters 507A-510 and transconductance amplifiers 511-514, either in real time or synchronized to the next Vsync pulse. The four least significant bits in register 506 represent DCSFB1 data processed by D/A converter 507 and OTA 511 to produce CSFBO1 and ICSFB1 outputs used to control SMPS1. Similarly, in successive 4-bit combinations, register 506 contains DCSFB2 data used to control SMPS2, DCSFB3 data used to control SMPS3, and DCSFB4 data used to control SMPS4. As described in a manner made in accordance with this invention, one multi-CSFB instruction in SLI bus 501 independently controls up to four SMPS output voltages dynamically in real time.

Figure 19:
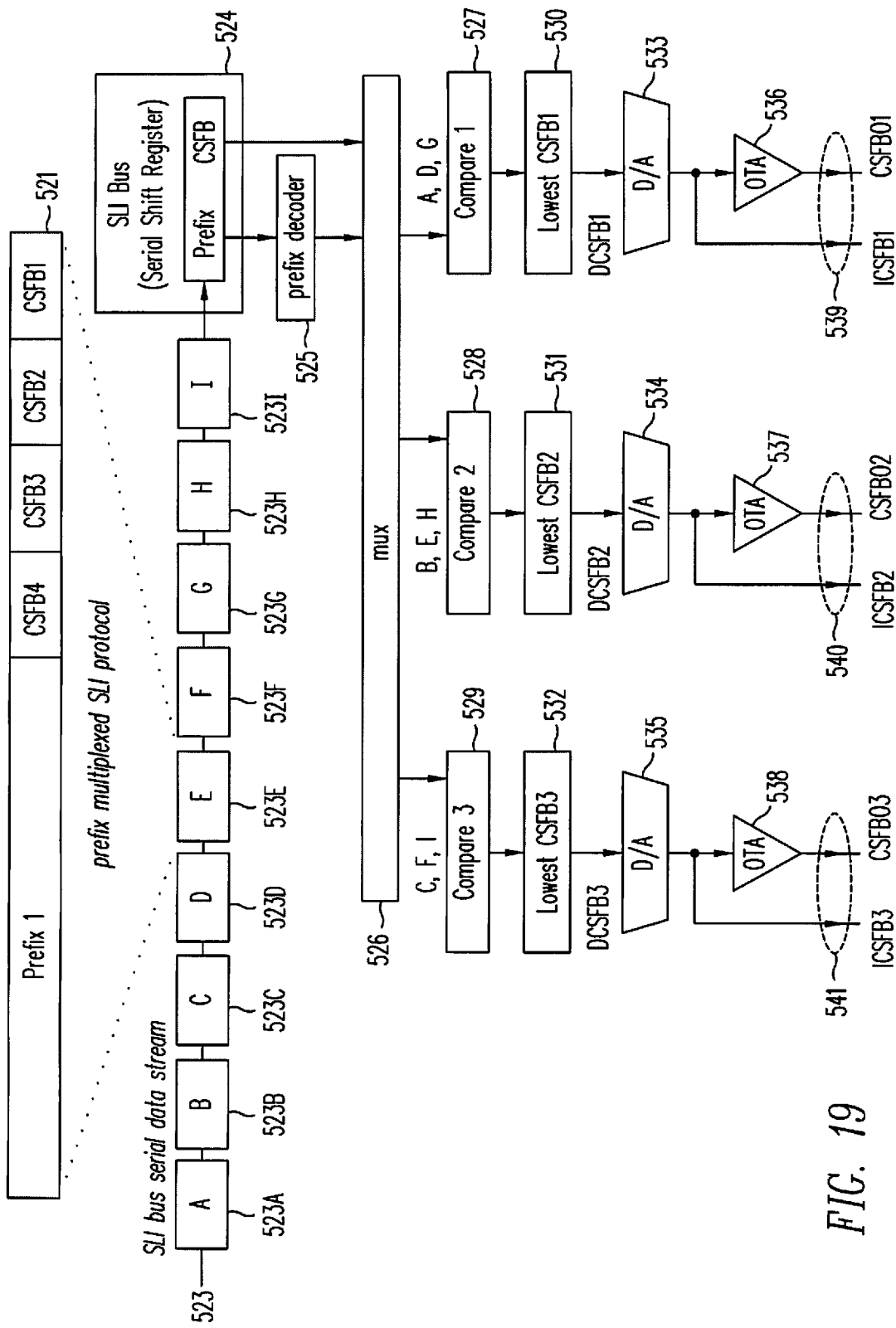
FIG. 19 is a block, diagram of an interface IC for controlling multiple power supplies using an alternative quad-CSFB encoded prefix-multiplexed SLI bus protocol.

An application of the multi-CSFB embedded SI bus independently controlling three SMPS outputs is illustrated in FIG. 19 whereby SLI bus data stream 523 comprises a sequence of nine SLI bus words 523I-523A, each following the quad-CSFB protocol represented by prefix multiplexed SLI bus word 521 with a corresponding data field "wxyz". The data for CSFBI is encoded in the four least significant bits of SLI bus words 523G, 523D and 523A, while the remaining bits represent the highest digital value possible, i.e. 1111 in binary or "F" in hexadecimal. The data in SLI bus words 523G, 523D and 523A therefore comprise the 16-bit binary words in the format [1111 111 111 wxyz].

In a similar manner, the data for CSFB2 is encoded in the next four higher significant bits of SLI bus words 523H, 523E and 523B, while the remaining bits represent the highest digital value possible, i.e. 1111 in binary. The data in SLI bus words 523H, 523E and 523B therefore comprise the 16-bit binary words in the format [1111 1111 wxyz 1111]. Data for CSFB3 is encoded in the next four higher significant bits of SLI bus words 523I, 523F and 523C, while the remaining bits represent the highest digital value possible, i.e. 1111 in binary. The data in SLI bus words 523I, 523F and 523C therefore comprise the 16-bit binary words in the format [1111 wxyz 1111 1111]. As shown, no word in SLI bus data stream 523 contains CSFB4 data, so it remains at the highest voltage DCSFB value 1111.

SLI bus data 523 is shifted serially into SLI bus shift register 524, once decoded by prefix decoder 525 instructs multiplexer 526 to write the appropriate 4-bit nibbles into "compare" registers 527, 528 and 529 from SLI bus data 521 respectively, with CSFB1 data being loaded into compare1 register 527, CSFB2 data being loaded into compare2 register 528, and CSFB3 data being loaded into compare1 register 529 for subsequent conversion in analog feedback signals 539-541. As shown, CSFB4 data is not loaded into any compare register and therefore does not influence any SMPS output. Such a three output decoding is applicable for RGB backlighting applications.

Figure 20:
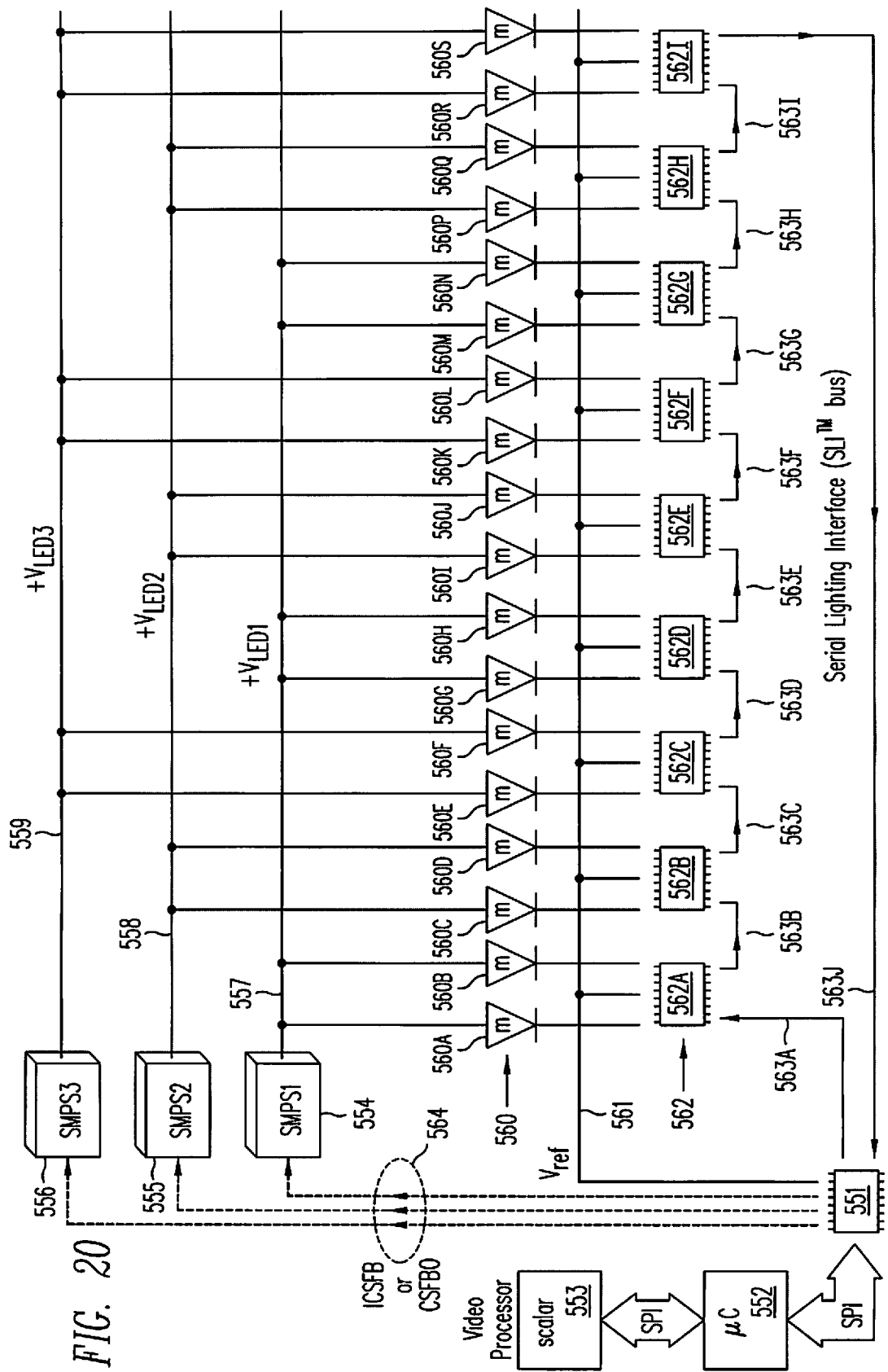
FIG. 20 is a schematic diagram illustrating SEA bus-based control of an intelligent RGB backlighting system with embedded SLI bus control for triple power supplies with one-color per driver IC partitioning.

One possible RGB backlight is shown in FIG. 20 where LED driver ICs 562A, 562D and 562G control and provide one of CSFB feedback signal 564 for SMPS1 554, powering red LED strings 560A, 560B, 560G, 560H, 560M and 560N with a voltage +$V_{LED1}$ on supply rail 557; where LED driver ICs 562B, 562E and 562H control and provide one of CSFB feedback signals 564 for SMPS2 555, powering green LED strings 560C, 560D, 560I, 560J, 560P and 560Q with a voltage +$V_{LED2}$ on supply rail 558; and where LED driver ICs 562C, 562F and 562I control and provide one of CSFB feedback signals 564 for SMPS3 556, powering blue LED strings 560E, 560F, 560K, 560L, 560R and 560S with a voltage +$V_{LED3}$ on supply rail 559.

All three CSFB signals are digitally embedded into a single SLI bus daisy chain comprising SLI bus lines 563A-563J and are converted into separate analog feedback signals 564 by an interface IC 551, facilitating dynamic control of red, green, and blue LED supply voltages +$V_{LED1}$, +$V_{LED2}$, and +$V_{LED3}$, respectively, in response to instructions from a μC 552 and a scalar IC 553.

Figure 21:
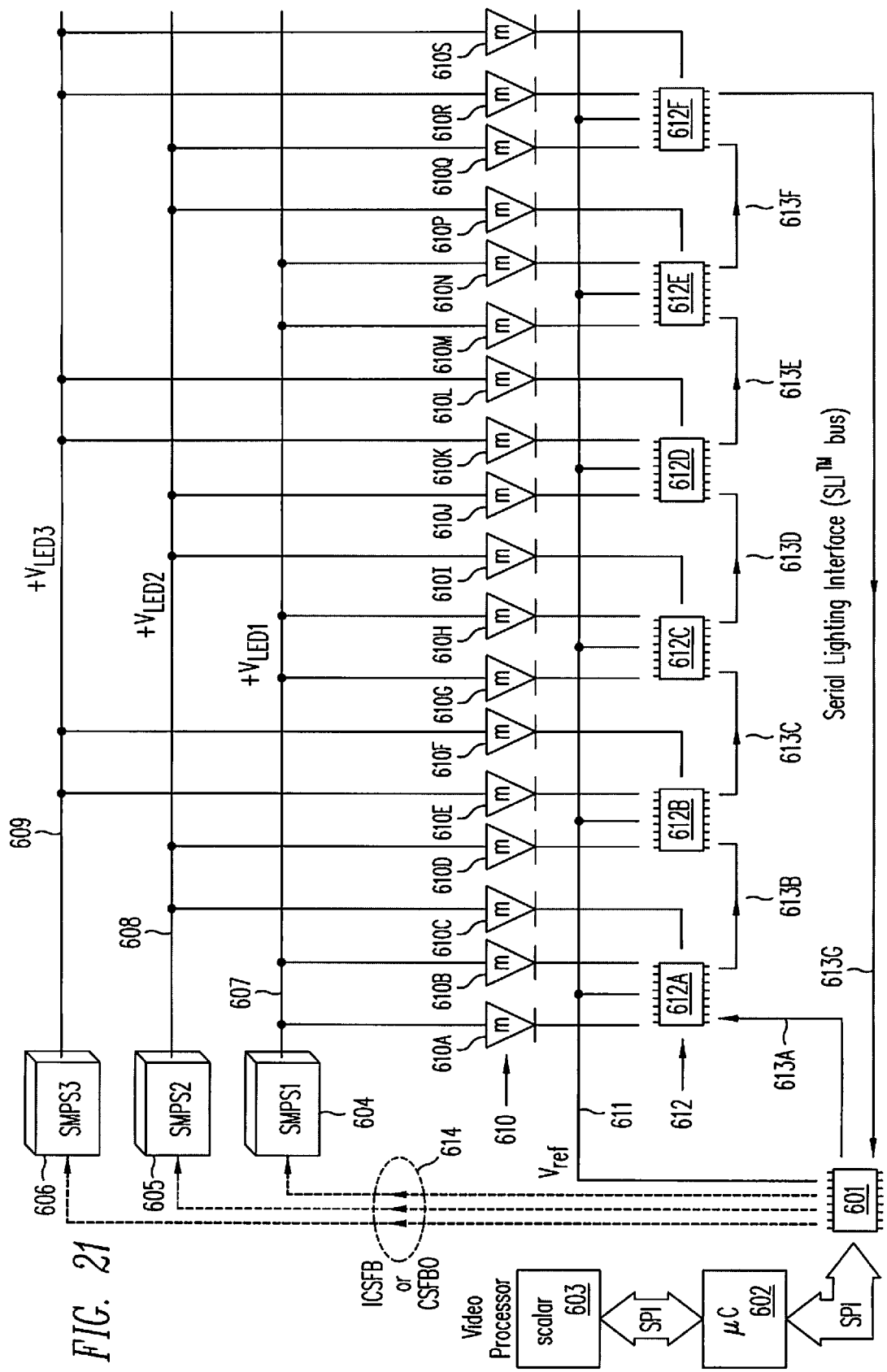
FIG. 21 is a schematic diagram illustrating SLI bus-based control of an intelligent RGB backlighting system with embedded SLI bus control for triple power supplies with three-color per driver IC partitioning.

In system 550 each LED driver IC drives two strings of LEDs having the same color and outputs a single CSFB value. In an alternative embodiment, shown in FIG. 21, each LED driver IC 612 controls three different LED strings, i.e. on red, one green and one blue, and outputs three distinct CSFB signals. Specifically, LED driver IC 612A controls red, green and blue LED strings 610A, 61B, and 610C respectively, LED driver IC 612B controls red, green and blue LED strings 610D, 610E, and 610F, respectively, and so on. The last LED driver IC in the daisy chain, driver 612F controls red, green and blue LED strings 610Q, 610R, and 610S respectively. Each driver IC 612 outputs its own CSFB3. CSFB2 and CSFB1 feedback values for red, green and blue feedback and power supply control embedded digitally in SLI bus 613.

Interface IC 601 interprets the embedded CSFB data carried by SLI bus daisy chain 613 and outputs three separate analog feedback signals 614 to dynamically control SMPS1 module 604, SMPS2 module 605, and SMPS3 module 606 to produce dynamically regulated outputs 607, 608 and 609 having corresponding voltages +$V_{LED1}$, +$V_{LED2}$, and +$V_{LED3}$. In this manner scalar IC 603, μC 602, interface IC 601 along with six driver-ICs 612 form a dynamically adjustable backlight system with independent dynamic control of eighteen LED strings using SLI bus control without the need for multiple analog feedback loops.

Figure 22:
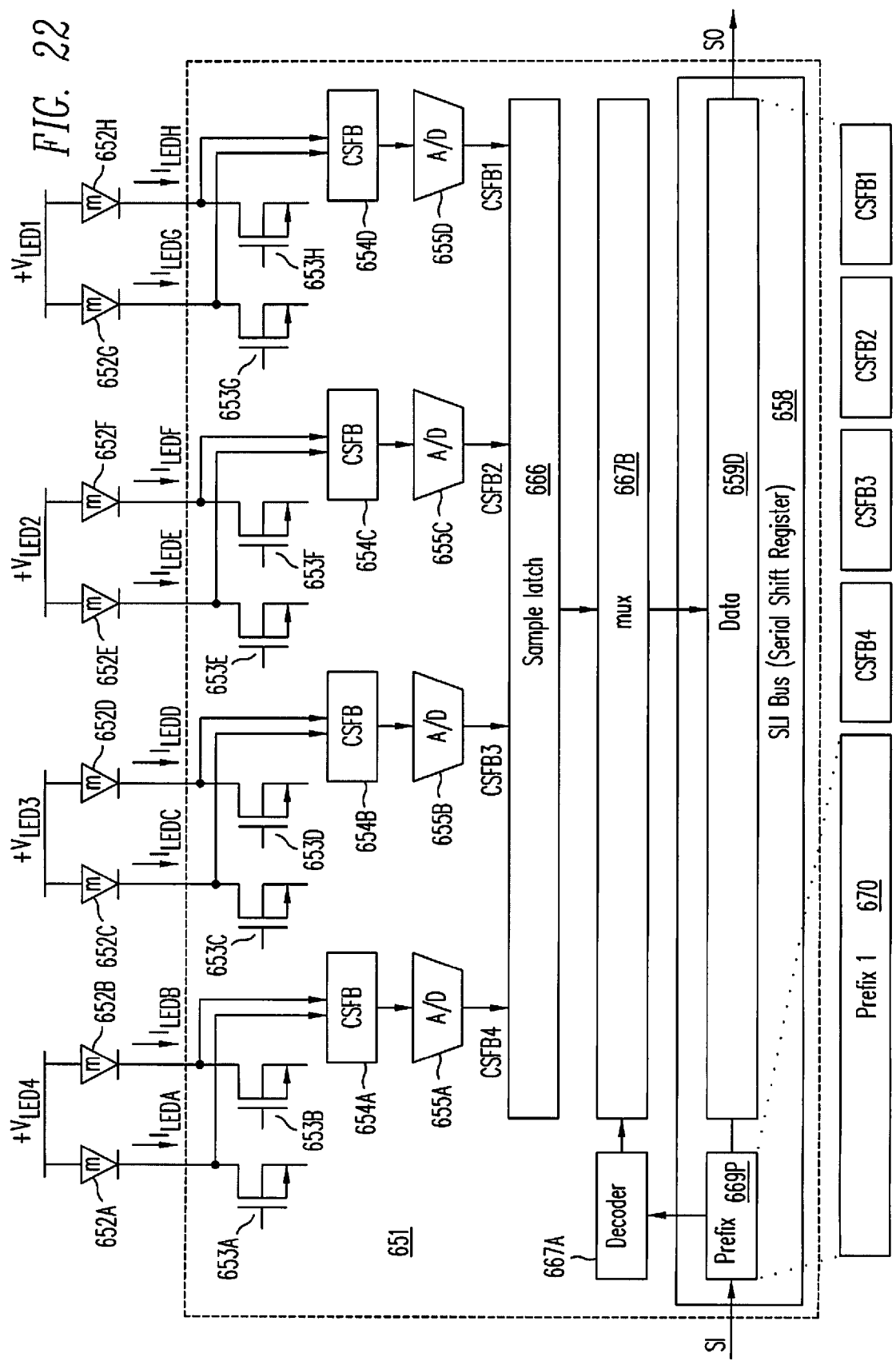
FIG. 22 illustrates an eight-channel LED driver integrating eight current sink DMOSFETs and four independent CSFB detect circuits for providing independent feedback control to generate four distinct supply voltages.

For more than one CSFB signal to be embedded inside a driver IC more than one CSFB signal must be generated within a LED driver IC. FIG. 22 illustrates an eight-channel LED driver IC 651 integrating eight current sink DMOSFETs 653A-653H, four independent CSFB detect circuits 654A-654D, four separate A/D converters resulting in a 16-bit SPI bus word 670 embedding four separate CSFB signals CSFB1-CSFB4 providing independent feedback control to four distinct SMPS output voltage +$V_{LED1}$-+$V_{LED4}$.

In operation, current in LED strings 652A and 652B produces sense voltages across current sink DMOSFETs 653A and 653B. CSFB circuit 654A then determines which ever of these two voltages are lower, and outputs the lower voltage to A/D converter 655A, converting the analog feedback data into a 4-bit digital word CSFB4. Similarly, current in LED strings 652C and 652D produces sense voltages across current sink DMOSFETs 653C and 653D. CSFB circuit 654B then determines which ever of these two voltages are lower, and outputs the lower voltage to A/D converter 655B, converting the analog feedback data into a 4-bit digital word CSFB3. Likewise, voltage feedback from LED strings 652E and 652F determine the digital value of CSFB2 output by A/D converter 655C and voltage feedback from LED strings 652G and 652H determine the digital value of CSFB1 output by A/D converter 655D.

The CSFB4 data is stored in the four most significant bits of sample latch 666, with CSFB3 occupying the next four lower significant bits, CSFB2 occupying the next four lower significant bits, and CSFB1 filling the lowest four significant bits of sample latch 666. When instructed to do so by prefix decoder 667A and prefix code 669P, all 16 bits of data from preload latch 666 is copied through multiplexer 667B into the data field 669D of SLI bus shift register 658. This data field thereby contains not one but four independent four-bit CSFB words CSFB4 through CSFB1, as shown by data set 670.

These CSFB signals after being shifted into the interface IC ultimately set the corresponding voltage outputs of $+V_{LED4}$ through $+V_{LED1}$ supplies in a manner described in FIG. 18. Four CSFB signals are useful in RGBG backlights where the two sets of green LED strings are powered by separate SMPS voltages. Alternatively, all 1.6 bits need not be used. For example, in RGB applications, A/D converter 655A can be removed and the 12 least significant bits of sample latch 666 can be used to control three separate power supplies, for example $+V_{LED3}$ for red LED strings, $+V_{LED2}$ for green LED strings, and $+V_{LED1}$ for blue LED strings. By eliminating unused CSFB 654A with current sink MOSFETs 652A and 652B, and also eliminating unneeded MOSFET current sinks 652D, 652F, and 652H to realize a three CSFB, three-channel LED driver IC, such an approach is consistent with the system example shown in FIG. 21.

We claim:

1. A light-emitting diode (LED) driver integrated circuit (IC) comprising:
    a first terminal to connect to a first LED string;
    a current sense feedback circuit connected to the first terminal, the current sense feedback circuit generating a current sense feedback signal based on a first voltage level at the first terminal;
    an analog-to-digital (A/D) converter connected to the current sense feedback circuit, the A/D converter generating a digital current sense feedback signal based on the current sense feedback signal and including a plurality of comparators each having a first input constructed to receive the current sense feedback signal and a second input constructed to receive a respective reference voltage of a plurality of reference voltages; and
    a sample latch connected to the A/D converter to store the digital current sense feedback signal.

2. The LED driver IC of claim 1 wherein the current sense feedback circuit includes an operational amplifier having a first input terminal connected to the first terminal of the LED driver IC, a second input terminal, and an output terminal connected to the second input terminal of the operational amplifier.

3. The LED driver IC of claim 1 further comprising a second terminal to connect to a second LED string.

4. The LED driver IC of claim 3 wherein the current sense feedback circuit is connected to the first terminal of the LED driver IC and the second terminal of the LED driver IC, the current sense feedback circuit generating the current sense feedback signal based on the first voltage level at the first terminal of the LED driver IC and a second voltage level at the second terminal of LED driver IC.

5. The LED driver IC of claim 4 wherein the current sense feedback circuit includes an operational amplifier having a first input terminal connected to the first terminal of the LED driver IC, a second input terminal connected to the second terminal of the LED driver IC, a third input terminal, and an output terminal connected to the third input terminal of the operational amplifier.

6. The LED driver IC of claim 4 wherein the current sense feedback circuit generates the current sense feedback signal based on a lower voltage value of the first voltage level and the second voltage level.

7. The LED driver IC of claim 1 wherein the A/D converter further includes an encoder to generate the digital current sense feedback signal, the encoder having a plurality of inputs, each of the plurality of inputs of the encoder being connected to an output of a respective comparator of the plurality of comparators.

8. A light-emitting diode (LED) drive system comprising:
    a plurality of LED driver integrated circuits (ICs), each respective LED driver IC of the plurality of LED driver ICs including a terminal constructed to connect to a first end of a respective LED string of a plurality of LED strings, a current sense feedback circuit connected to the terminal to generate a current sense feedback signal based on a voltage level at the terminal, an analog-to-digital (A/D) converter connected to the current sense feedback circuit and to generate a digital current sense feedback value based on the current sense feedback signal, a sample latch connected to the A/D converter to store the digital current sense feedback value, and a data register connected to the sample latch;
    a serial interface bus having an input and an output, the serial interface bus being constructed to serially shift data through the data register in each respective LED driver IC of the plurality of LED driver ICs; and
    an interface circuit coupled to the input of the serial interface bus and the output of the serial interface bus, the interface circuit including a digital magnitude comparator coupled between the output of the serial interface bus and a lowest current sense feedback register.

9. The LED drive system of claim 8 wherein the magnitude comparator compares a first digital current sense feedback value stored in the lowest current sense feedback register with a second digital current sense feedback value output from the serial interface bus and replaces the first digital current sense feedback value in the lowest current sense feedback register with the second digital current sense feedback value responsive to the second digital current sense feedback value being lower in value than the first digital current sense feedback value.

10. The LED drive system of claim 8 wherein the interface circuit further includes a digital-to-analog (D/A) converter connected to the lowest current sense feedback register, the D/A converter constructing a reconstructed current sense feedback signal based on a digital current sense feedback value stored in the lowest current sense feedback register.

11. The LED drive system of claim 10 wherein the D/A converter includes an operational amplifier having a first input connected to the lowest current sense feedback register, a second input, and an output connected to the second input of the operational amplifier.

12. The LED drive system of claim 10 wherein the interface circuit further includes an operational transconductance amplifier connected to the D/A converter.

13. The LED drive system of claim 10 further comprising a power supply connected to the interface circuit and a voltage supply line connected to a second end of each respective LED string of the plurality of LED strings.

14. The LED drive system of claim 13 wherein the power supply adjusts a voltage level of the voltage supply line based on the reconstructed current sense feedback signal.

15. The LED drive system of claim 13 wherein the power supply includes a switch mode power supply.

* * * * *

UNITED STATES PATENT AND TRADEMARK OFFICE
CERTIFICATE OF CORRECTION

PATENT NO. : 9,295,123 B2
APPLICATION NO. : 13/347668
DATED : March 22, 2016
INVENTOR(S) : Richard K. Williams et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 519 days.

Signed and Sealed this
Fourteenth Day of June, 2016

Michelle K. Lee
*Director of the United States Patent and Trademark Office*